US009875318B2

(12) United States Patent
Wellen et al.

(10) Patent No.: US 9,875,318 B2
(45) Date of Patent: Jan. 23, 2018

(54) CONCEPTS FOR PROVIDING AN ENHANCED MEDIA PRESENTATION

(71) Applicant: Turner Broadcasting System, Inc., Atlanta, GA (US)

(72) Inventors: Alex Wellen, Atlanta, GA (US); Marisa Gallagher, Atlanta, GA (US); Don Loheide, Atlanta, GA (US); Michael Wise, Ketchum, ID (US); Rajin Persaud, Atlanta, GA (US); Michael Koetter, Decatur, GA (US); KC Estenson, Atlanta, GA (US); Dave Ehlers, Atlanta, GA (US); Chris Hinton, Decatur, GA (US); Michael Quigley, Atlanta, GA (US); Jeremy Legg, Atlanta, GA (US); Scott Teissler, Atlanta, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 36 days.

(21) Appl. No.: 14/523,307

(22) Filed: Oct. 24, 2014

(65) Prior Publication Data

US 2015/0121420 A1 Apr. 30, 2015

Related U.S. Application Data

(63) Continuation of application No. 14/522,739, filed on Oct. 24, 2014.
(Continued)

(51) Int. Cl.
*G06F 17/00* (2006.01)
*G06F 17/30* (2006.01)
(Continued)

(52) U.S. Cl.
CPC ...... *G06F 17/30905* (2013.01); *G06F 3/0482* (2013.01); *G06F 3/04842* (2013.01);
(Continued)

(58) Field of Classification Search
CPC ............. G06F 17/248; G06F 17/30017; G06F 17/30056
See application file for complete search history.

(56) References Cited

U.S. PATENT DOCUMENTS 5,479,266 A 12/1995 Young et al.
5,751,282 A 5/1998 Girard et al.
(Continued)

FOREIGN PATENT DOCUMENTS

JP 10243365 A 9/1998

OTHER PUBLICATIONS

International Searching Authority, International Search Report and Written Opinion for International Application No. PCT/US2014/062171, dated Mar. 2, 2015, 13 pages, European Patent Office, The Netherlands.
(Continued)

*Primary Examiner* — Stephen Hong
*Assistant Examiner* — Gregory Vaughn
(74) *Attorney, Agent, or Firm* — Alston & Bird LLP

(57) ABSTRACT

Computer program products, methods, systems, apparatus, and computing entities are provided for providing an enhanced media presentation. In one embodiment, an enhanced media presentation is provided. To provide the enhanced media presentation, one or more content items associated with subject matter associated with a segment of an enhanced media presentation are identified. Each content item may be associated with at least one uniform resource identifier. Then, a content object based at least in part on at least one content item is created. The content object is an (Continued)

abstract representation of the content item. The content object can be associated with the segment and provided for simultaneous displayed simultaneously with at least a portion of the segment.

30 Claims, 33 Drawing Sheets

Related U.S. Application Data

(60) Provisional application No. 61/895,617, filed on Oct. 25, 2013.

(51) Int. Cl.

| | | |
|---|---|---|
| G06F 17/20 | (2006.01) | |
| G06F 3/0482 | (2013.01) | |
| G06F 3/0484 | (2013.01) | |
| H04N 21/643 | (2011.01) | |
| H04N 21/81 | (2011.01) | |
| H04N 21/8352 | (2011.01) | |
| H04N 21/858 | (2011.01) | |
| H04N 21/235 | (2011.01) | |
| H04N 21/4722 | (2011.01) | |
| H04N 21/488 | (2011.01) | |
| H04N 21/2343 | (2011.01) | |
| H04N 21/2665 | (2011.01) | |
| H04N 21/431 | (2011.01) | |
| H04N 21/435 | (2011.01) | |
| H04N 21/4402 | (2011.01) | |
| H04N 21/4545 | (2011.01) | |
| H04N 21/462 | (2011.01) | |
| H04N 21/4782 | (2011.01) | |
| H04N 21/482 | (2011.01) | |
| H04N 21/61 | (2011.01) | |
| H04N 21/84 | (2011.01) | |
| H04N 21/845 | (2011.01) | |
| H04N 21/266 | (2011.01) | |
| H04H 20/28 | (2008.01) | |
| H04H 20/93 | (2008.01) | |
| H04H 60/07 | (2008.01) | |
| H04L 29/08 | (2006.01) | |

(52) U.S. Cl.
CPC ......... *G06F 17/20* (2013.01); *G06F 17/3002* (2013.01); *G06F 17/30056* (2013.01); *G06F 17/30896* (2013.01); *H04H 20/28* (2013.01); *H04H 20/93* (2013.01); *H04H 60/07* (2013.01); *H04L 67/10* (2013.01); *H04N 21/2353* (2013.01); *H04N 21/234345* (2013.01); *H04N 21/266* (2013.01); *H04N 21/2665* (2013.01); *H04N 21/435* (2013.01); *H04N 21/4316* (2013.01); *H04N 21/440245* (2013.01); *H04N 21/45457* (2013.01); *H04N 21/4622* (2013.01); *H04N 21/4722* (2013.01); *H04N 21/4782* (2013.01); *H04N 21/482* (2013.01); *H04N 21/4886* (2013.01); *H04N 21/6125* (2013.01); *H04N 21/6175* (2013.01); *H04N 21/64322* (2013.01); *H04N 21/8133* (2013.01); *H04N 21/8352* (2013.01); *H04N 21/84* (2013.01); *H04N 21/8456* (2013.01); *H04N 21/858* (2013.01)

(56) References Cited

U.S. PATENT DOCUMENTS

| | | |
|---|---|---|
| 5,990,890 A | 11/1999 | Etheredge |
| 6,952,221 B1 | 10/2005 | Holtz et al. |
| 7,337,462 B2 | 2/2008 | Dukiewicz et al. |
| 7,549,128 B2 | 6/2009 | Snyder et al. |
| 7,801,910 B2 | 9/2010 | Houh et al. |
| 8,661,366 B2 | 2/2014 | Snyder et al. |
| 8,726,187 B2 | 5/2014 | Snyder et al. |
| 8,739,213 B2 | 5/2014 | Angiolillo et al. |
| 2002/0083468 A1 | 6/2002 | Dudkiewicz |
| 2003/0001880 A1* | 1/2003 | Holtz ............... G06F 17/30017 715/716 |
| 2003/0189588 A1 | 10/2003 | Girgensohn |
| 2004/0123321 A1* | 6/2004 | Striemer ............ G06Q 20/3674 725/62 |
| 2004/0210945 A1 | 10/2004 | Snyder et al. |
| 2004/0237120 A1* | 11/2004 | Lewin ...................... H04N 7/56 725/135 |
| 2005/0022237 A1 | 1/2005 | Nomura |
| 2006/0020966 A1 | 1/2006 | Poslinski |
| 2006/0149677 A1 | 7/2006 | Shahine et al. |
| 2007/0073767 A1 | 3/2007 | Springer et al. |
| 2007/0220419 A1 | 9/2007 | Stibel |
| 2008/0183806 A1* | 7/2008 | Cancel ................... G06Q 30/02 709/203 |
| 2008/0201225 A1 | 8/2008 | Maharajh |
| 2009/0226152 A1* | 9/2009 | Hanes ............... G06F 17/30056 386/248 |
| 2009/0288008 A1 | 11/2009 | Snyder et al. |
| 2009/0292991 A1 | 11/2009 | Snyder et al. |
| 2010/0269138 A1 | 10/2010 | Krikorian et al. |
| 2011/0196888 A1* | 8/2011 | Hanson ............ G06F 17/30265 707/769 |
| 2012/0166294 A1* | 6/2012 | Lieberman ......... G06Q 30/0276 705/14.72 |
| 2014/0122485 A1* | 5/2014 | Shyamsundar ... G06F 17/30286 707/737 |
| 2014/0232874 A1* | 8/2014 | Meyer .................... H04N 7/181 348/159 |
| 2015/0120768 A1 | 4/2015 | Wellen |
| 2015/0121221 A1 | 4/2015 | Wellen |
| 2015/0121223 A1 | 4/2015 | Wellen |
| 2015/0121417 A1* | 4/2015 | Vince ............... H04N 21/25816 725/31 |
| 2015/0121419 A1 | 4/2015 | Wellen |
| 2015/0121424 A1 | 4/2015 | Wellen |
| 2015/0121426 A1 | 4/2015 | Wellen |
| 2015/0121439 A1 | 4/2015 | Wellen |
| 2015/0155009 A1* | 6/2015 | Mate .................... G11B 27/036 386/278 |
| 2015/0256861 A1* | 9/2015 | Oyman .............. H04N 21/2343 725/62 |
| 2015/0294025 A1 | 10/2015 | Wellen |

OTHER PUBLICATIONS

Rean, "3rd Party "Related Links" Widgets for Websites—Best of", Hongkiat.com, published prior to Jan. 9, 2012, <https://web.archive.org/web/20120109081506/ http://www.hongkiat.com/blog/3rd-party-related-links-widgets/>, 6 page.

The International Bureau of WIPO, International Preliminary Report on Patentability for International Application No. PCT/US2014/062171, dated May 6, 2016, 9 pages, Switzerland.

United States Patent and Trademark Office, Office Action for U.S. Appl. No. 14/523,459, dated May 20, 2016, 27 pages, U.S.A.

United States Patent and Trademark Office, Office Action for U.S Appl. No. 14/523,390, dated Jun. 3, 2016, 23 pages, U.S.A.

United States Patent and Trademark Office, Office Action for U.S. Appl. No. 14/523,190, dated Jul. 1, 2016, 11 pages, U.S.A.

United States Patent and Trademark Office, Office Action for U.S. Appl. No. 14/523,092, dated Aug. 26, 2016, 11 pages, U.S.A.

United States Patent and Trademark Office, Office Action for U.S. Appl. No. 14/522,998, dated Jul. 28, 2016, 10 pages, U.S.A.

(56) References Cited

OTHER PUBLICATIONS

United States Patent and Trademark Office, Office Action for U.S. Appl. No. 14/522,955, dated Jul. 15, 2016, 10 pages, U.S.A.
United States Patent and Trademark Office, Office Action for U.S. Appl. No. 14/522,739, dated Jul. 1, 2016, 10 pages, U.S.A.
Lancet, Yaara, "Two Ways to Sneak a Peek at Videos While You're Working"; makeuseof.com, Aug. 30, 2011, retrieved from the Internet Archive <http://www.makeuseof.com/tag/ways-sneak-peek-videos-working/>, Sep. 24, 2011 to Feb. 18, 2017, 9 pages.
United States Patent and Trademark Office, Office Action for U.S. Appl. No. 14/523,092, dated Feb. 23, 2017, 11 pages, U.S.A.
United States Patent and Trademark Office, Office Action for U.S. Appl. No. 14/522,739, dated Apr. 21, 2017, 11 pages, U.S.A.
United States Patent and Trademark Office, Office Action for U.S. Appl. No. 14/523,390, dated May 19, 2017, 14 pages, U.S.A.
United States Patent and Trademark Office, Office Action for U.S. Appl. No. 14/522,884, dated May 26, 2017, 42 pages, U.S.A.
United States Patent and Trademark Office, Office Action for U.S. Appl. No. 14/523,459, dated Jun. 2, 2017, 17 pages, U.S.A.
United States Patent and Trademark Office, Office Action for U.S. Appl. No. 14/523,190, dated Jun. 14, 2017, 12 pages, U.S.A.
United States Patent and Trademark Office, Notice of Allowance for U.S. Appl. No. 14/522,998, dated Jun. 16, 2017, 11 pages, U.S.A.
United States Patent and Trademark Office, Office Action for U.S. Appl. No. 14/522,955, dated Jul. 13, 2017, 12 pages, U.S.A.
United States Patent and Trademark Office, Supplemental Notice of Allowability for U.S. Appl. No. 14/522,998, dated Jul. 27, 2017, 3 pages, U.S.A.
United States Patent and Trademark Office, Notice of Allowance for U.S. Appl. No. 14/523,092, dated Jul. 27, 2017, 11 pages, U.S.A.
United States Patent and Trademark Office, Office Action for U.S. Appl. No. 14/523,190, dated Jan. 13, 2017, 12 pages, U.S.A.
United States Patent and Trademark Office, Office Action for U.S. Appl. No. 14/523,390, dated Nov. 25, 2016, 27 pages, U.S.A.
United States Patent and Trademark Office, Office Action for U.S. Appl. No. 14/523,459, dated Nov. 22, 2016, 33 pages, U.S.A.
United States Patent and Trademark Office, Office Action for U.S. Appl. No. 14/522,998, dated Feb. 10, 2017, 11 pages, U.S.A.
United States Patent and Trademark Office, Office Action for U.S. Appl. No. 14/522,955, dated Jan. 17, 2017, 12 pages, U.S.A.
United States Patent and Trademark Office, Office Action for U.S. Appl. No. 14/522,739, dated Dec. 29, 2016, 12 pages, U.S.A.
United States Patent and Trademark Office, Office Action for U.S. Appl. No. 14/522,884, dated Oct. 26, 2017, 48 pages, U.S.A.
United States Patent and Trademark Office, Office Action for U.S. Appl. No. 14/522,739, dated Nov. 3, 2017, 13 pages, U.S.A.
United States Patent and Trademark Office, Notice of Allowance for U.S. Appl. No. 14/522,955, dated Nov. 17, 2017, 9 pages, U.S.A.
United States Patent and Trademark Office, Office Action for U.S. Appl. No. 14/523,390, dated Dec. 4, 2017, 16 pages, U.S.A.

\* cited by examiner

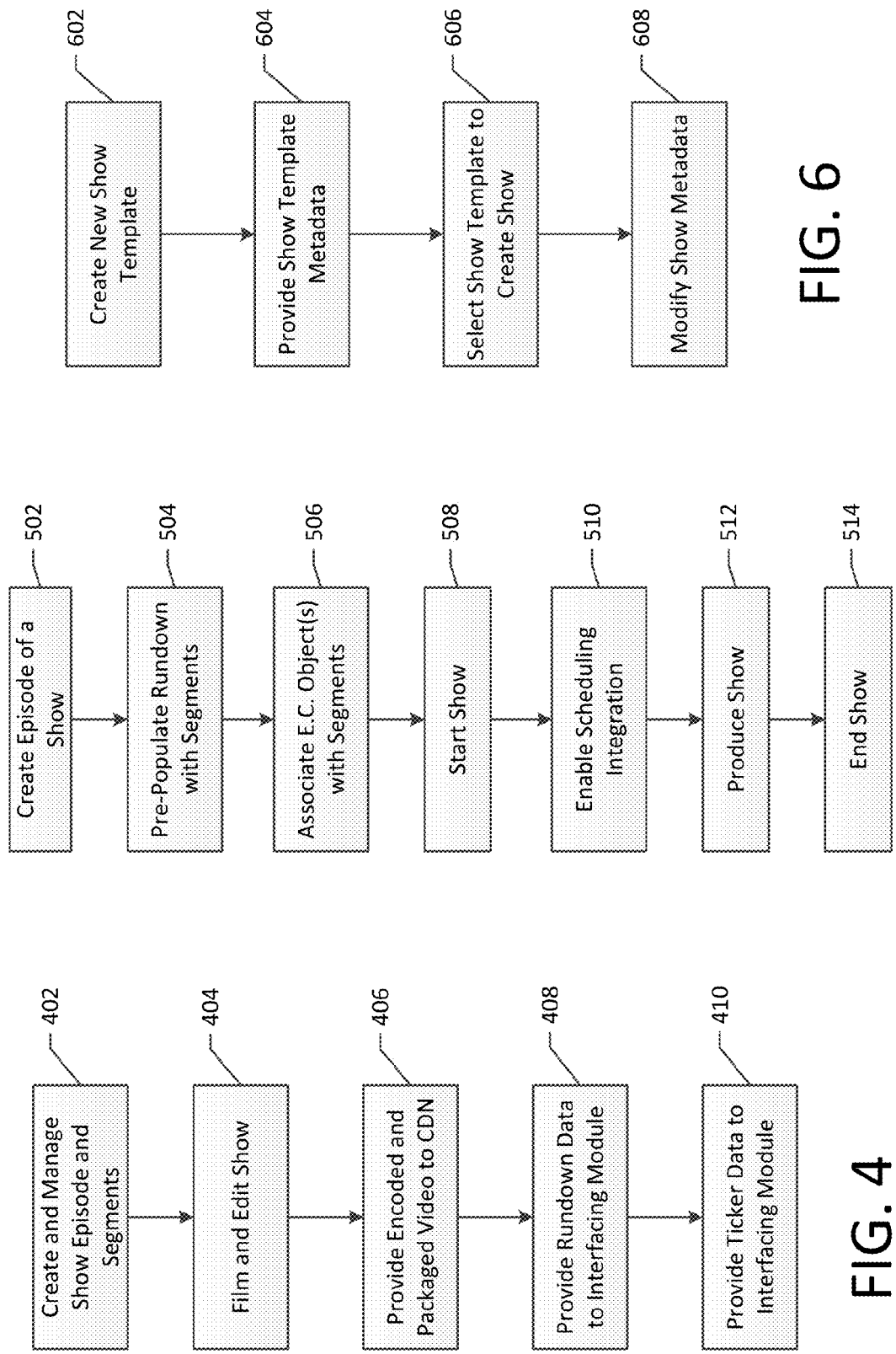

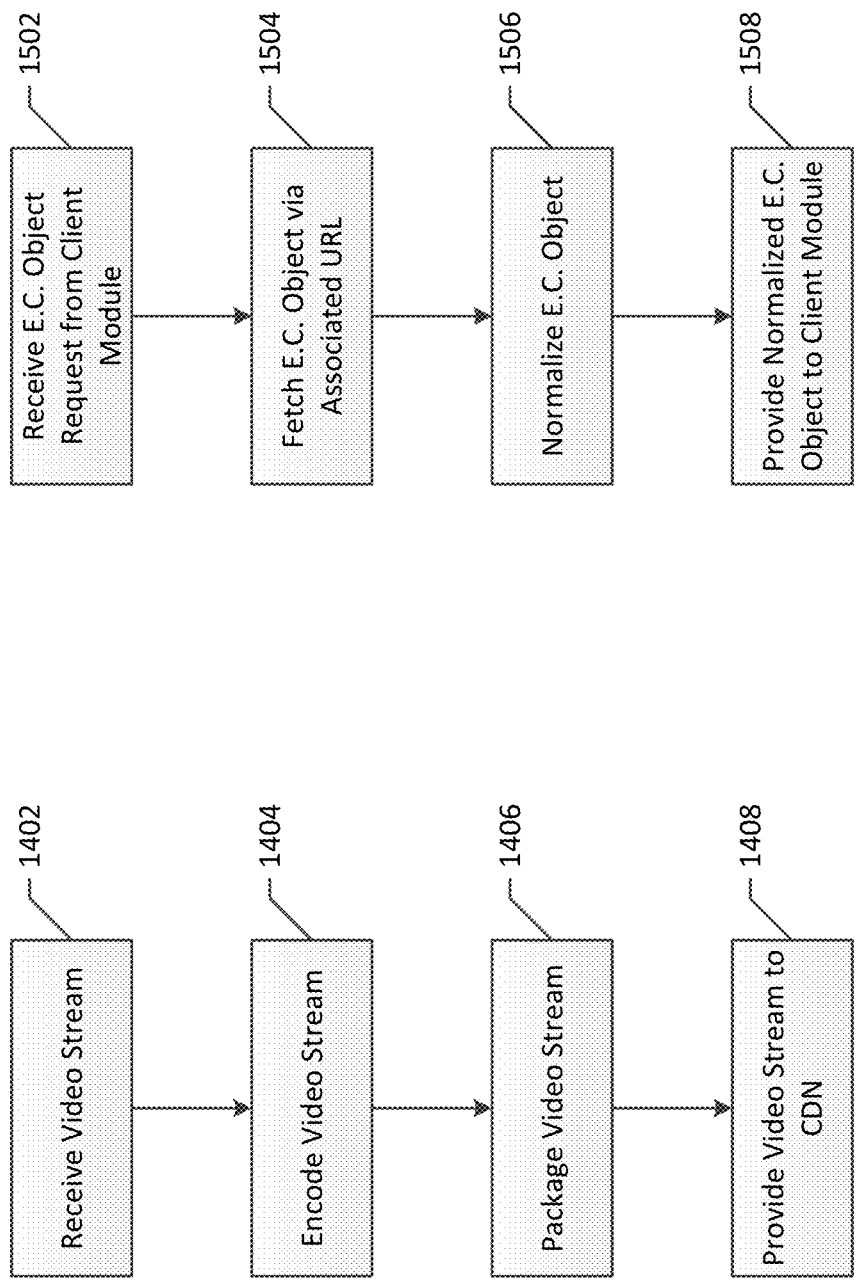

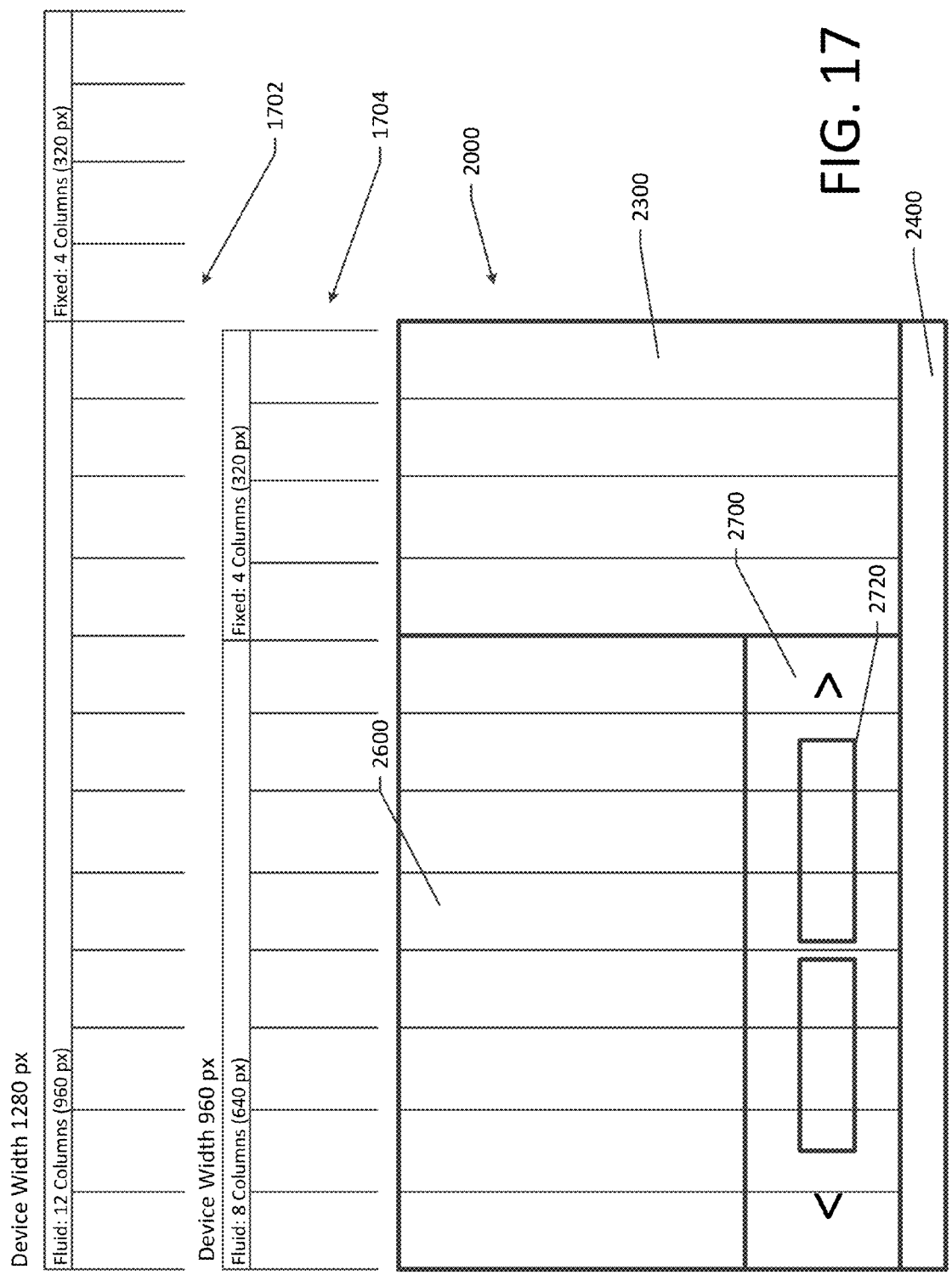

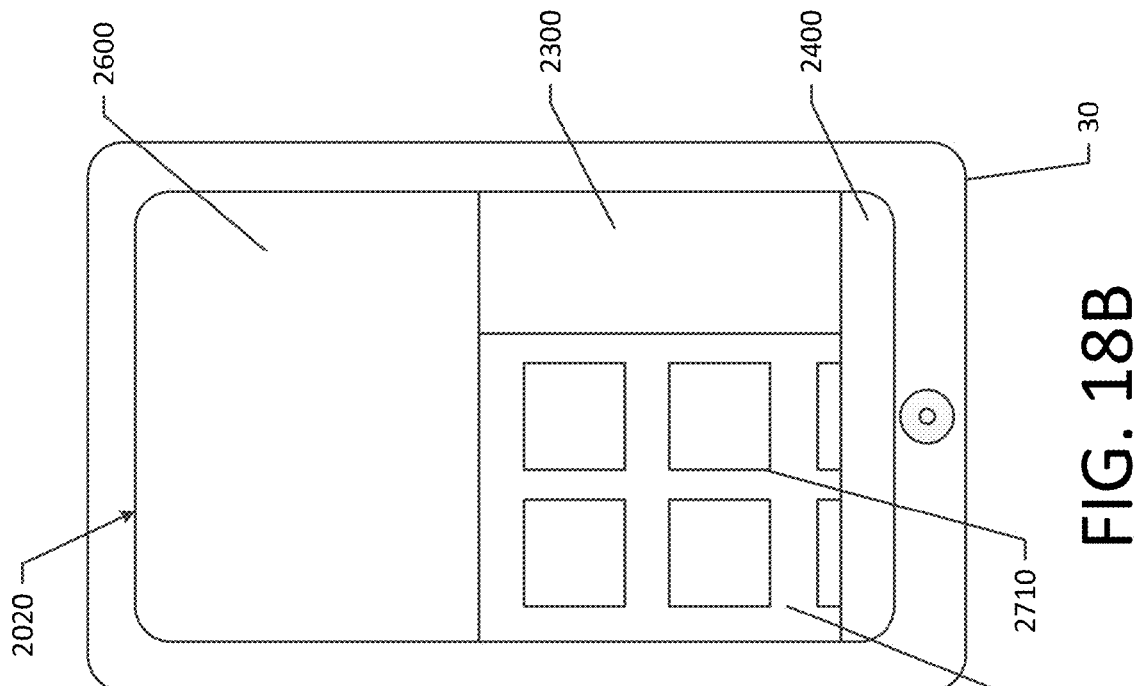
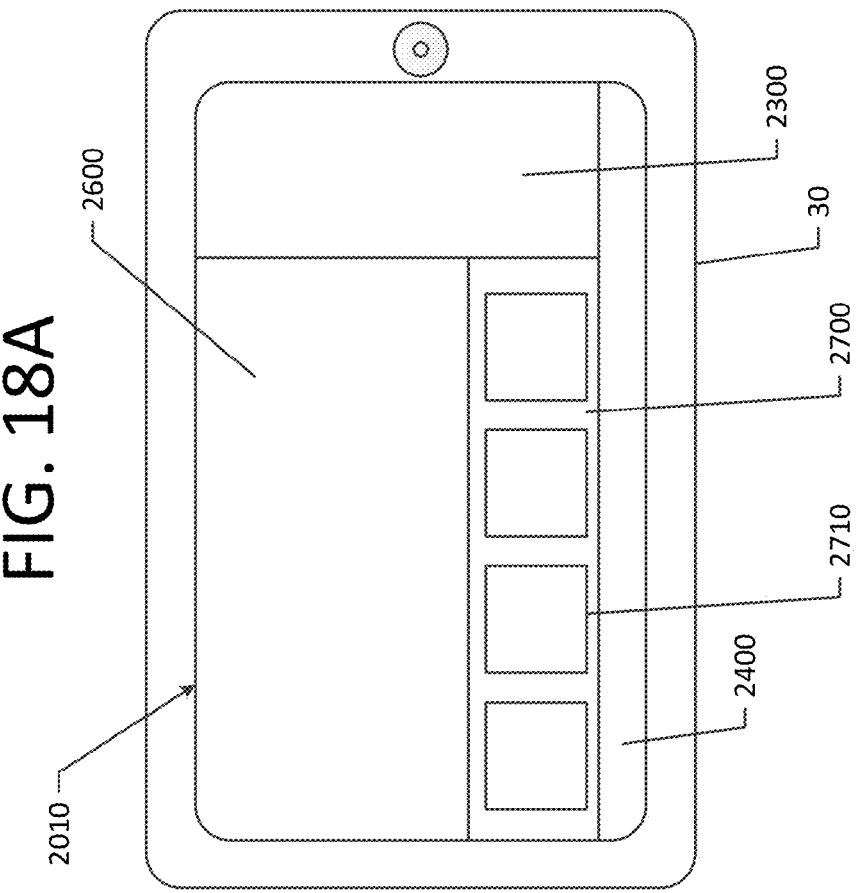
FIG. 18A
FIG. 18B

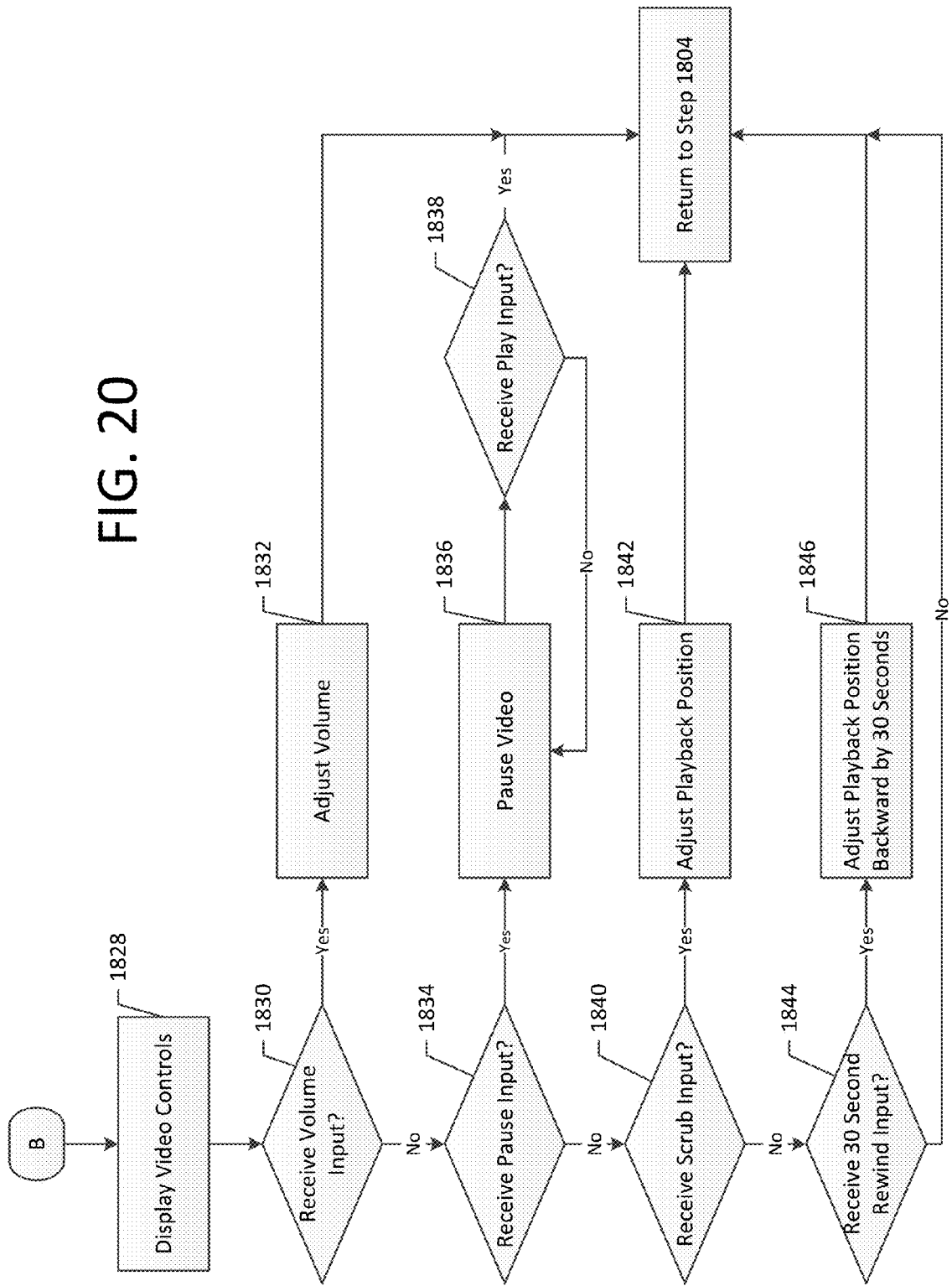

CONCEPTS FOR PROVIDING AN ENHANCED MEDIA PRESENTATION

CROSS-REFERENCE TO RELATED APPLICATIONS

This application is a continuation of U.S. application Ser. No. 14/522,739 filed Oct. 24, 2014, which claims priority to U.S. Provisional Application No. 61/895,617, filed Oct. 25, 2013, which are incorporated by reference herein in their entireties.

TECHNOLOGICAL FIELD

Embodiments of the present invention are generally related to producing and providing users with an enhanced/extended media presentation.

BACKGROUND

The majority of users receive and experience media presentations via live linear broadcast television, live broadcast radio, printed publications (e.g., newspapers, magazines, books, etc.), and/or other non-interactive media presentations. However, the Internet and related technologies allow users to access media presentations via video-on-demand (VOD), podcasts, internet publications, and/or the like. As a result, new behaviors have emerged regarding, for example, control, ubiquity, and personalization of media presentations, that have profoundly changed the way users want, need, and expect to experience media presentations.

Therefore, a need exists for improved methods, apparatus, systems, computer program products, computing devices, computing entities, and/or the like for producing and/or providing users with an enhanced media presentation.

BRIEF SUMMARY

In general, embodiments of the present invention provide methods, apparatus, systems, computer program products, computing devices, computing entities, and/or the like for producing and providing one or more users with at least one enhanced/extended media presentation, object, file, product, display, and/or similar words used herein interchangeably.

In accordance with one aspect, a method for providing an enhanced media presentation is provided. In one embodiment, the method comprises (a) identifying one or more content items associated with subject matter associated with a segment of an enhanced media presentation; (b) creating a content object based at least in part on at least one content item, the content object being an abstract representation of the content item; (c) associating the content object with the segment; and (d) providing the content object associated with the segment in association with the segment. Each content item is associated with at least one uniform resource identifier and the content object is configured to be displayed simultaneously with at least a portion of the segment.

In accordance with another aspect, a computer program product for providing an enhanced media presentation is provided. The computer program product may comprise at least one computer-readable storage medium having computer-readable program code portions stored therein, the computer-readable program code portions comprising executable portions configured to (a) identify one or more content items associated with subject matter associated with a segment of an enhanced media presentation; (b) create a content object based at least in part on at least one content item, the content object being an abstract representation of the content item; (c) associate the content object with the segment; and (d) provide the content object associated with the segment in association with the segment. Each content item is associated with at least one uniform resource identifier and the content object is configured to be displayed simultaneously with at least a portion of the segment.

In accordance with yet another aspect, a system for providing an enhanced media presentation is provided. In one embodiment the system comprises at least one memory device and at least one processor and the system is configured to at least (a) identify one or more content items associated with subject matter associated with a segment of an enhanced media presentation; (b) create a content object based at least in part on at least one content item, the content object being an abstract representation of the content item; (c) associate the content object with the segment; and (d) provide the content object associated with the segment in association with the segment. Each content item is associated with at least one uniform resource identifier and the content object is configured to be displayed simultaneously with at least a portion of the segment.

In accordance with another aspect of the present invention, a method for providing an enhanced media presentation is provided. In one embodiment the method comprises (a) identifying subject matter associated with a segment of an enhanced media presentation; (b) identifying one or more content key words associated with each of one or more content objects; (c) determining whether one or more content objects are related to a segment based at least in part on the subject matter associated with the segment and the one or more content key words associated with each content object; and (d) responsive to determining that one of the one or more content objects is related to the segment, linking the related content object with the segment.

In accordance with still another aspect, a computer program product for providing an enhanced media presentation is provided. The computer program product may comprise at least one computer-readable storage medium having computer-readable program code portions stored therein, the computer-readable program code portions comprising executable portions configured to (a) identify subject matter associated with a segment of an enhanced media presentation; (b) to identify one or more content key words associated with each of one or more content objects; (c) determine whether one or more content objects are related to a segment based at least in part on the subject matter associated with the segment and the one or more content key words associated with each content object; and (d) an executable portion configured to responsive to determining that one of the one or more content objects is related to the segment, link the related content object with the segment.

In accordance with yet another aspect, a system for providing an enhanced media presentation is provided. In one embodiment, the system comprises at least one memory and at least one processor and the system is configured to at least (a) identify subject matter associated with a segment of an enhanced media presentation; (b) identify one or more content key words associated with each of one or more content objects; (c) determine whether one or more content objects are related to a segment based at least in part on the subject matter associated with the segment and the one or more content key words associated with each content object; and (d) responsive to determining that one of the one or more content objects is related to the segment, link the related content object with the segment.

In accordance with another aspect of the present invention, a method for providing an enhanced media presentation is provided. In one embodiment, the method comprises (i) automatically generating rundown data based at least on an enhanced media presentation template, the rundown data comprising metadata associated with one or more segments of the enhanced media presentation and identifying video data for each segment; (ii) providing the rundown data, at least a portion of the rundown data configured to be displayed to a user; and (iii) providing video data, the video data comprising (a) video data for one of the one or more segments, at least a portion of the video data configured to be displayed to a user, and (b) one or more tags detectable by a user computing entity and comprising tag data corresponding to at least a portion of the metadata associated with the one or more segments.

In accordance with still another aspect, a computer program product for providing an enhanced media presentation is provided. The computer program product may comprise at least one computer-readable storage medium having computer-readable program code portions stored therein, the computer-readable program code portions comprising executable portions configured to (i) automatically generate rundown data based at least on an enhanced media presentation template, the rundown data comprising metadata associated with one or more segments of the enhanced media presentation and identifying video data for each segment; (ii) to provide the rundown data, at least a portion of the rundown data configured to be displayed to a user; and (iii) provide video data, the video data comprising (a) video data for one of the one or more segments, at least a portion of the video data configured to be displayed to a user, and (b) one or more tags detectable by a user computing entity and comprising tag data corresponding to at least a portion of the metadata associated with the one or more segments.

In accordance with yet another aspect, a system is provided for providing an enhanced media presentation. In one embodiment the system comprises at least one memory and at least one processor. The system is configured to at least (i) automatically generate rundown data based at least on an enhanced media presentation template, the rundown data comprising metadata associated with one or more segments of the enhanced media presentation and identifying video data for each segment; (ii) provide the rundown data, at least a portion of the rundown data configured to be displayed to a user; and (iii) provide video data, the video data comprising (a) video data for one of the one or more segments, at least a portion of the video data configured to be displayed to a user, and (b) one or more tags detectable by a user computing entity and comprising tag data corresponding to at least a portion of the metadata associated with the one or more segments.

In accordance with another aspect of the present invention, a method for providing an enhanced media presentation is provided. In one embodiment, the method comprises (i) receiving rundown data associated with one or more segments of an enhanced media presentation, the rundown data identifying (a) a video data identifier for each segment configured to identify the video data associated with the segment and (b) one or more content objects associated with each segment; (ii) receiving video data associated with the segment, the video data comprising at least one tag identifying a first segment; (iii) identifying the first segment of the one or more segments and the rundown data associated with the first segment based at least in part on at least one of the video data identifier and the at least one tag; and (iv) causing simultaneous display of (a) at least a portion of the video data for the first segment, (b) at least a portion of the rundown data for the first segment configured to indicate that the video data for the first segment is being displayed, and (c) at least one content tile configured to represent at least one content object associated with the first segment.

In accordance with still another aspect, a computer program product for providing an enhanced media presentation is provided. The computer program product may comprise at least one computer-readable storage medium having computer-readable program code portions stored therein, the computer-readable program code portions comprising executable portions configured to (i) receive rundown data associated with one or more segments of an enhanced media presentation, the rundown data identifying (a) a video data identifier for each segment configured to identify the video data associated with the segment and (b) one or more content objects associated with each segment; (ii) receive video data associated with the segment, the video data comprising at least one tag identifying a first segment; (iii) identify the first segment of the one or more segments and the rundown data associated with the first segment based at least in part on at least one of the video data identifier and the at least one tag; and (iv) an executable portion configured to cause simultaneous display of (a) at least a portion of the video data for the first segment, (b) at least a portion of the rundown data for the first segment configured to indicate that the video data for the first segment is being displayed, and (c) at least one content tile configured to represent at least one content object associated with the first segment.

In accordance with yet another aspect, an apparatus comprising at least one processor and at least one memory including computer program code is provided. In one embodiment, the at least one memory and the computer program code may be configured to, with the processor, cause the apparatus to (i) receive rundown data associated with one or more segments of an enhanced media presentation, the rundown data identifying (a) a video data identifier for each segment configured to identify the video data associated with the segment and (b) one or more content objects associated with each segment; (ii) receive video data associated with the segment, the video data comprising at least one tag identifying a first segment; (iii) identify the first segment of the one or more segments and the rundown data associated with the first segment based at least in part on at least one of the video data identifier and the at least one tag; and (iv) cause simultaneous display of (a) at least a portion of the video data for the first segment, (b) at least a portion of the rundown data for the first segment configured to indicate that the video data for the first segment is being displayed, and (c) at least one content tile configured to represent at least one content object associated with the first segment.

In accordance with another aspect of the present invention, a method is provided for providing an enhanced media presentation. In one embodiment, the method comprises (i) automatically generating rundown data for an enhanced media presentation episode, the rundown data (a) comprising presentation metadata and one or more sets of segment data each associated with one or more segments, each segment comprising a portion of the enhanced media presentation episode and (b) generated based at least in part on a show template; (ii) associating at least one content object identifier with at least one of the one or more sets of segment data; (iii) automatically updating the rundown data based at least in part on one or more directory listings associated with the enhanced media presentation episode, wherein updating the rundown data comprises (a) updating the at least one of the one or more sets of segment data, (b) the presentation metadata, or (c) both; (iv) receiving input indicating the start of the enhanced media presentation episode; and (v) providing the rundown data.

In accordance with still another aspect, a computer program product for providing an enhanced media presentation is provided. The computer program product may comprise at least one computer-readable storage medium having computer-readable program code portions stored therein, the computer-readable program code portions comprising executable portions configured to (i) automatically generate rundown data for an enhanced media presentation episode, the rundown data (a) comprising presentation metadata and one or more sets of segment data each associated with one or more segments, each segment comprising a portion of the enhanced media presentation episode and (b) generated based at least in part on a show template; (ii) associate at least one content object identifier with at least one of the one or more sets of segment data; (iii) automatically update the rundown data based at least in part on one or more directory listings associated with the enhanced media presentation episode, wherein updating the rundown data comprises (a) updating the at least one of the one or more sets of segment data, (b) the presentation metadata, or (c) both; (iv) receive input indicating the start of the enhanced media presentation episode; and (v) provide the rundown data.

In accordance with yet another aspect, a system for providing an enhanced media presentation is provided. In one embodiment, the system comprises at least one memory and at least one processor and the system is configured to at least (i) automatically generate rundown data for an enhanced media presentation episode, the rundown data (a) comprising presentation metadata and one or more sets of segment data each associated with one or more segments, each segment comprising a portion of the enhanced media presentation episode and (b) generated based at least in part on a show template; (ii) associate at least one content object identifier with at least one of the one or more sets of segment data; (iii) automatically update the rundown data based at least in part on one or more directory listings associated with the enhanced media presentation episode, wherein updating the rundown data comprises (a) updating the at least one of the one or more sets of segment data, (b) the presentation metadata, or (c) both; (iv) receive input indicating the start of the enhanced media presentation episode; and (v) provide the rundown data.

In accordance with yet another aspect of the present invention, a method for providing an enhanced media presentation is provided. In one embodiment the method comprises (a) generating rundown data associated with one or more segments of an enhanced media presentation; (b) tagging video data associated with at least one of the one or more segments, the video data being tagged with linking data configured to identify the associated one or more segments; and (c) providing the rundown data via an Internet Protocol (IP) based network and providing the video data via at least one of an over the air content distribution network, a linear content distribution network, a cable content distribution network, a satellite content distribution network, or an IP based content distribution network.

In accordance with still another aspect, a computer program product for providing an enhanced media presentation is provided. The computer program product may comprise at least one computer-readable storage medium having computer-readable program code portions stored therein, the computer-readable program code portions comprising executable portions configured to (a) generate rundown data associated with one or more segments of an enhanced media presentation; (b) tag video data associated with at least one of the one or more segments, the video data being tagged with linking data configured to identify the associated one or more segments; and (c) provide the rundown data via an Internet Protocol (IP) based network and providing the video data via at least one of an over the air content distribution network, a linear content distribution network, a cable content distribution network, a satellite content distribution network, or an IP based content distribution network.

In accordance with yet another aspect, a system for providing an enhanced media presentation is provided. In one embodiment, the system comprises at least one memory and at least one processor and the system is configured to at least: (a) generate rundown data associated with one or more segments of an enhanced media presentation; (b) tag video data associated with at least one of the one or more segments, the video data being tagged with linking data configured to identify the associated one or more segments; and (c) provide the rundown data via an Internet Protocol (IP) based network and providing the video data via at least one of an over the air content distribution network, a linear content distribution network, a cable content distribution network, a satellite content distribution network, or an IP based content distribution network.

In accordance with another aspect of the present invention, a method for providing an enhanced media presentation is provided. In one embodiment, the method comprises (A) receiving rundown data associated with one or more segments of an enhanced media presentation, the rundown data identifying (a) a segment identifier for each segment configured to identify (i) the segment and (ii) the video data associated with the segment and (b) content object data associated with one or more content objects associated with each segment; (B) receiving video data associated with a first segment, the video data comprising at least one tag identifying the first segment; and (C) causing display of (a) at least a portion of the rundown data in a rundown portion of a display, (b) at least a portion of the video data in a video portion of the display, and (c) at least a portion of the content object data in a content portion of the display. The at least a portion of the rundown data, the at least a portion of the video data, and the at least a portion of the object data are displayed simultaneously and the at least a portion of the rundown data for the first segment is configured to indicate that the video data for the first segment is being displayed.

In accordance with still another aspect, a computer program product for providing an enhanced media presentation is provided. The computer program product may comprise at least one computer-readable storage medium having computer-readable program code portions stored therein, the computer-readable program code portions comprising executable portions configured to (A) receive rundown data associated with one or more segments of an enhanced media presentation, the rundown data identifying (a) a segment identifier for each segment configured to identify (i) the segment and (ii) the video data associated with the segment and (b) content object data associated with one or more content objects associated with each segment; (B) receive video data associated with a first segment, the video data comprising at least one tag identifying the first segment; and (C) cause display of (a) at least a portion of the rundown data in a rundown portion of a display, (b) at least a portion of the video data in a video portion of the display, and (c) at least a portion of the content object data in a content portion of the display. The at least a portion of the rundown data, the at least a portion of the video data, and the at least a portion of the object data are displayed simultaneously and the at least a portion of the rundown data for the first segment is configured to indicate that the video data for the first segment is being displayed.

In accordance with yet another aspect, an apparatus comprising at least one processor and at least one memory including computer program code is provided. In one embodiment, the at least one memory and the computer program code may be configured to, with the processor, cause the apparatus to (A) receive rundown data associated with one or more segments of an enhanced media presentation, the rundown data identifying (a) a segment identifier for each segment configured to identify (i) the segment and (ii) the video data associated with the segment and (b) content object data associated with one or more content objects associated with each segment; (B) receive video data associated with a first segment, the video data comprising at least one tag identifying the first segment; and (C) cause display of (a) at least a portion of the rundown data in a rundown portion of a display, (b) at least a portion of the video data in a video portion of the display, and (c) at least a portion of the content object data in a content portion of the display. The at least a portion of the rundown data, the at least a portion of the video data, and the at least a portion of the object data are displayed simultaneously and the at least a portion of the rundown data for the first segment is configured to indicate that the video data for the first segment is being displayed.

In accordance with another aspect of the present invention, a method for providing an enhanced media presentation is provided. In one embodiment, the method comprises (A) receiving rundown data associated with one or more rundown tiles, each rundown tile associated with (i) a segment of the enhanced media presentation and (ii) a status configured to indicate at least one of (a) the segment associated with the rundown tile was previously aired, (b) the segment associated with the rundown tile is currently being aired, or (c) the segment associated with the rundown tile has not been aired, wherein only one of the one or more rundown tiles is associated with a status indicating the segment associated with the rundown tile is currently being aired at a given time; (B) causing display of the one or more rundown tiles, wherein the one or more rundown tiles are displayed such that the status associated with each rundown tile is indicated; (C) receiving updated rundown data associated with at least a first rundown tile of the one or more rundown tiles, the updated rundown data indicating that the status associated with the first rundown tile has changed from currently being aired to previously aired; (D) updating the status of the first rundown tile; and (E) causing display of the one or more rundown tiles reflecting the updated status of the first rundown tile.

In accordance with still another aspect, a computer program product for providing an enhanced media presentation is provided. The computer program product may comprise at least one computer-readable storage medium having computer-readable program code portions stored therein, the computer-readable program code portions comprising executable portions configured to (A) receive rundown data associated with one or more rundown tiles, each rundown tile associated with (i) a segment of the enhanced media presentation and (ii) a status configured to indicate at least one of (a) the segment associated with the rundown tile was previously aired, (b) the segment associated with the rundown tile is currently being aired, or (c) the segment associated with the rundown tile has not been aired, wherein only one of the one or more rundown tiles is associated with a status indicating the segment associated with the rundown tile is currently being aired at a given time; (B) cause display of the one or more rundown tiles, wherein the one or more rundown tiles are displayed such that the status associated with each rundown tile is indicated; (C) receive updated rundown data associated with at least a first rundown tile of the one or more rundown tiles, the updated rundown data indicating that the status associated with the first rundown tile has changed from currently being aired to previously aired; (D) update the status of the first rundown tile; and (E) cause display of the one or more rundown tiles reflecting the updated status of the first rundown tile.

In accordance with yet another aspect, an apparatus comprising at least one processor and at least one memory including computer program code is provided. In one embodiment, the at least one memory and the computer program code may be configured to, with the processor, cause the apparatus to (A) receive rundown data associated with one or more rundown tiles, each rundown tile associated with (i) a segment of the enhanced media presentation and (ii) a status configured to indicate at least one of (a) the segment associated with the rundown tile was previously aired, (b) the segment associated with the rundown tile is currently being aired, or (c) the segment associated with the rundown tile has not been aired, wherein only one of the one or more rundown tiles is associated with a status indicating the segment associated with the rundown tile is currently being aired at a given time; (B) cause display of the one or more rundown tiles, wherein the one or more rundown tiles are displayed such that the status associated with each rundown tile is indicated; (C) receive updated rundown data associated with at least a first rundown tile of the one or more rundown tiles, the updated rundown data indicating that the status associated with the first rundown tile has changed from currently being aired to previously aired; (D) update the status of the first rundown tile; and (E) cause display of the one or more rundown tiles reflecting the updated status of the first rundown tile.

In accordance with another aspect of the present invention, a method for providing an enhanced media presentation is provided. In one embodiment, the method comprises (a) receiving segment data for a segment, the segment data identifying one or more content objects; (b) receiving input indicating user selection of one of the one or more content objects; (c) requesting the user-selected content object; (d) receiving a normalized content object corresponding to the user-selected content object, the normalized content object representing a content item associated with at least one unique resource identifier (URI) and normalized based at least in part on a content object template; and (e) causing display of the normalized content object.

In accordance with still another aspect, a computer program product for providing an enhanced media presentation is provided. The computer program product may comprise at least one computer-readable storage medium having computer-readable program code portions stored therein, the computer-readable program code portions comprising executable portions configured to (a) receive segment data for a segment, the segment data identifying one or more content objects; (b) receive input indicating user selection of one of the one or more content objects; (c) request the user-selected content object; (d) receive a normalized content object corresponding to the user-selected content object, the normalized content object representing a content item associated with at least one unique resource identifier (URI)

and normalized based at least in part on a content object template; and (e) cause display of the normalized content object.

In accordance with yet another aspect, an apparatus comprising at least one processor and at least one memory including computer program code is provided. In one embodiment, the at least one memory and the computer program code may be configured to, with the processor, cause the apparatus to (a) receive segment data for a segment, the segment data identifying one or more content objects; (b) receive input indicating user selection of one of the one or more content objects; (c) request the user-selected content object; (d) receive a normalized content object corresponding to the user-selected content object, the normalized content object representing a content item associated with at least one unique resource identifier (URI) and normalized based at least in part on a content object template; and (e) cause display of the normalized content object.

In accordance with another aspect of the present invention, a method for providing an enhanced media presentation is provided. In one embodiment, the method comprises (a) receiving a request for a content object, the request comprising an object identifier; (b) identifying the content object based at least in part on the object identifier; (c) normalizing the content object; and (d) providing the normalized content object.

In accordance with still another aspect, a computer program product for providing an enhanced media presentation is provided. The computer program product may comprise at least one computer-readable storage medium having computer-readable program code portions stored therein, the computer-readable program code portions comprising executable portions configured to (a) receive a request for a content object, the request comprising an object identifier; (b) identify the content object based at least in part on the object identifier; (c) normalize the content object; and (d) provide the normalized content object.

In accordance with yet another aspect, a system for providing an enhanced media presentation is provided. In one embodiment the system comprises at least one memory and at least one processor and the system is configured to at least (a) receive a request for a content object, the request comprising an object identifier; (b) identify the content object based at least in part on the object identifier; (c) normalize the content object; and (d) provide the normalized content object.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 16:
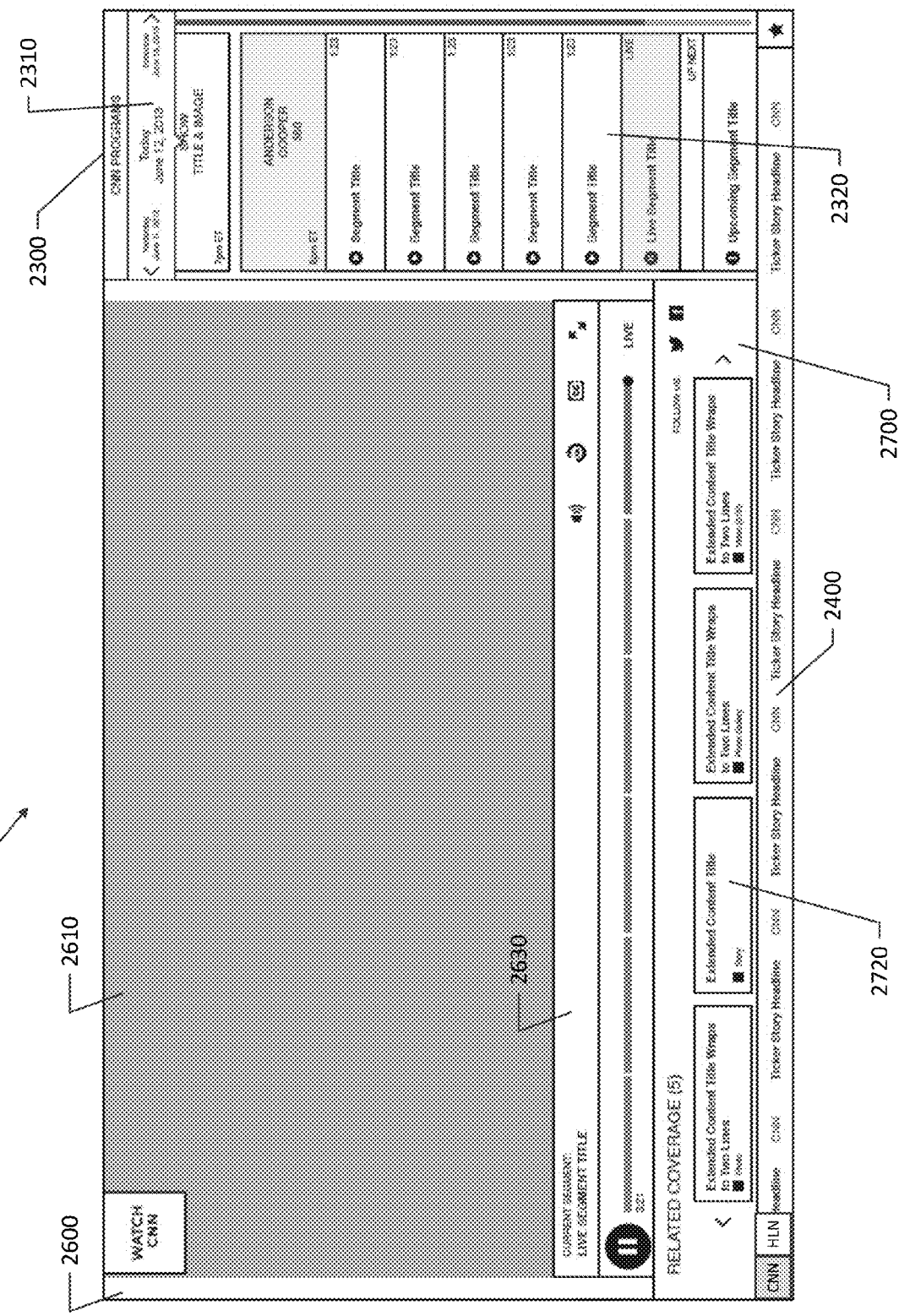
Figure 27:
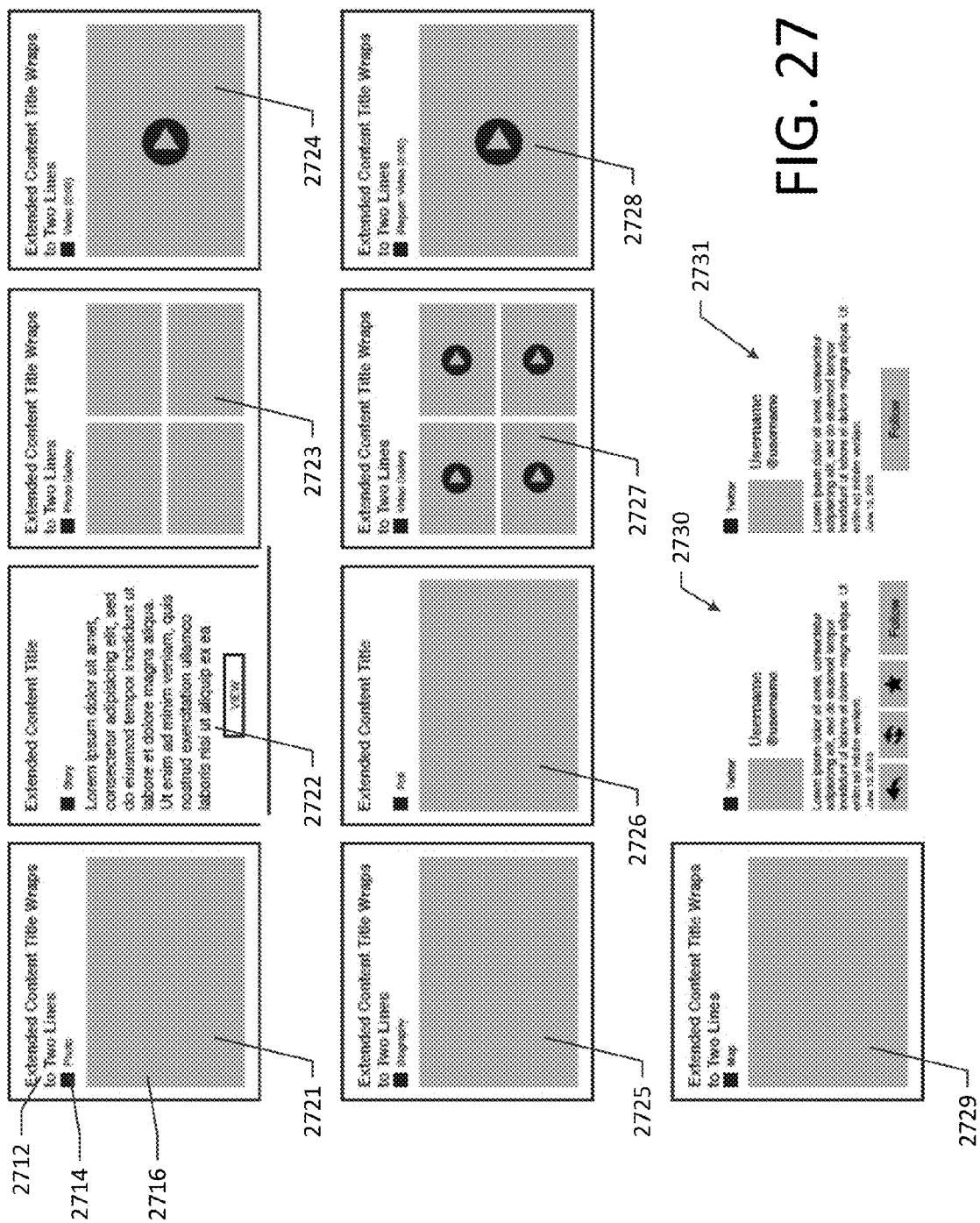

FIGS. 4-15 each provide a flowchart illustrating process and operations related to producing an enhanced media presentation, in accordance with an embodiment of the present invention;

FIG. 16 is a schematic diagram showing the layout of an interactive user interface for experiencing an enhanced media presentation, in accordance with an embodiment of the present invention;

FIGS. 17, 18A, and 18B illustrate various layouts of an interactive user interface for experiencing an enhanced media presentation, in accordance with an embodiment of the present invention;

FIGS. 19, 20, 22, 23, 25, 29, 31, 33, 35, and 37 together comprise a flowchart illustrating processes and operations related to providing a user with an enhanced media presentation, in accordance with an embodiment of the present invention;

FIGS. 21A, 21B, 24, 26, and 30 are partial views of an example interactive user interface for experiencing an enhanced media presentation, in accordance with an embodiment of the present invention;

FIG. 27 illustrates a variety of example enhanced content tiles, in accordance with an embodiment of the present invention; and FIGS. 28, 32, 34, 36, and 38 show various views of an example interactive user interface for experiencing an enhanced media presentation, in accordance with an embodiment of the present invention.

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Methods, Apparatus, Systems, and Computer Program Products

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like. In some embodiments, the non-volatile storage medium may be accessed remotely (e.g., via "the cloud").

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. General Overview

Embodiments of the present invention provide methods, apparatus, systems, computer program products, computing devices, computing entities, and/or the like for producing and/or providing users with an enhanced/extended media presentation. The disclosure provided herein relates to a wide variety of enhanced media presentations, however, the concepts disclosed herein will be exemplified via discussion of providing an enhanced television show/program media presentation. Particularly, the example of an enhanced news show media presentation will be discussed in detail below. However, as will be recognized, such concepts can be applied to a variety of formats and environments.

In various embodiments, an enhanced media presentation, such as an enhanced news show, may be provided to a user live or via on demand programming. The enhanced news show may be divided into segments, wherein each segment represents a period of time in the show. When a user is viewing the enhanced news show/program via the provided user interface, a rundown may be displayed via the user interface. The rundown may be populated by segment tiles representing the segments of the enhanced news show being watched. Segment tiles for other enhanced news shows may also be displayed in a rundown viewer. Thus, the rundown may be configured to provide the user with a visual and/or interactive mechanism of selecting segments for viewing. One or more enhanced, extended, and/or extra content (E.C.) objects may be associated with each segment. E.C. object may be any type of media, including audio, videos, text, images, graphics, articles, photos, photo galleries, video galleries, infographics, maps, polls, guest biographies, tweets or other social media, blog posts, and/or the like. Each E.C. object associated with a segment may be configured to enhance a user's experience of the segment by providing additional information related to the segment thereby facilitating user interaction with a show and/or the like. In various embodiments, a ticker may also be provided that may be configured to provide the user with an interactive streaming of current news headlines, for example, and/or the like.

Various system architectures that may be used in accordance with the present invention will now be described herein.

III. Exemplary System Architecture

Figure 1:
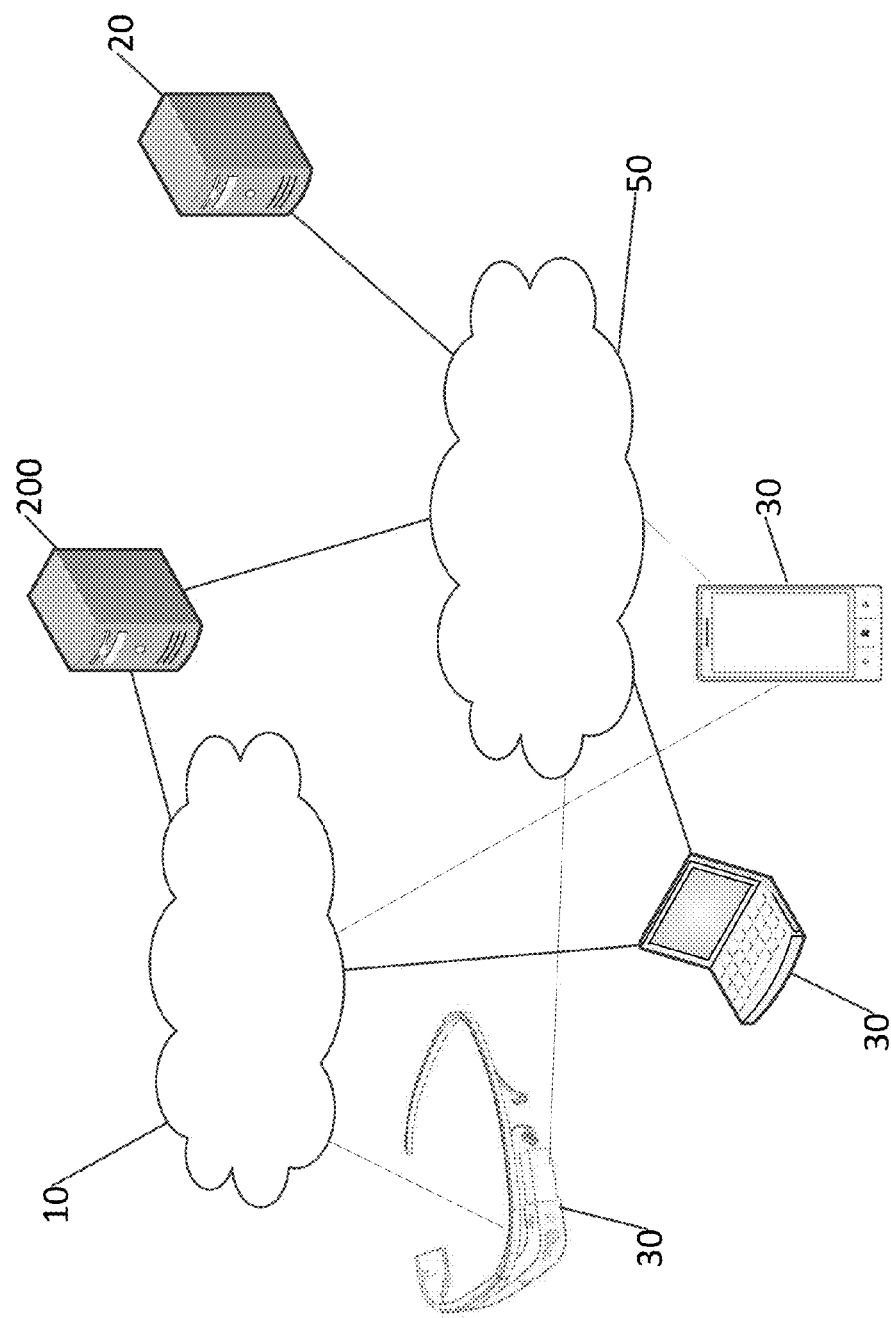
FIG. 1 illustrates one embodiment of a system for producing and providing a user with an enhanced media presentation, in accordance with one embodiment the present invention.

FIG. 1 illustrates one embodiment of a system that may implement the present invention. In this particular embodiment, the illustrated system may include one or more content distribution/delivery networks (CDNs) 10, one or more E.C. systems 20, one or more user computing entities 30, and one or more provider networks/systems 200. The one or more CDNs 10, one or more E.C. systems 20, the one or more user computing entities 30, and the one or more provider networks/systems 200 may communicate with each other and/or a variety of other computing entities via one or more wired or wireless networks. Although described separately, it will be recognized that two or more of the above entities can be combined or included in a single platform.

Content Distribution/Delivery Networks 10

In various embodiments, the one or more CDNs 10 may comprise networks configured for distributing media content. Generally, the term "content" may refer to any type of media—audio, videos, datacasts, music, text, images, graphics, articles, photos, photo galleries, video galleries, infographics, maps, polls, guest biographies, tweets or other social media, blog posts, and/or the like. For example, content may include television broadcasts (e.g., live local newscasts), television programs (e.g., The Office), sporting events, movies (e.g., video-on-demand (VOD)), datacasts, music, images, videos, text, webpages, and/or the like. Thus, the CDN 10 may be configured for providing a user with media content via a broadcast, such as via an over-the-air content delivery/distribution network, a linear content delivery/distribution network, a cable content delivery/distribution network, a satellite content delivery/distribution network, an Internet Protocol (IP) based content delivery/distribution network, and/or the like.

Over-the-Air Content Delivery/Distribution Network

An over-the-air (OTA) CDN 10 can be used in conjunction with embodiments of the present invention. The OTA CDN 10 may be owned and/or operated by a broadcaster (e.g., KCRG, KFXA, KFXB, KGAN, KIIN, KPXR, KRIN, KWKB, KWWF, and/or KWWL) and associated with a broadcast area (e.g., Cedar Rapids-Waterloo-Iowa City-Dubuque broadcast area). Broadcast areas may be designated market areas (DMAs), zip codes, block groups, census tracts, cartographic levels, government-established areas/zones, geographic areas, and/or the like. As will be recognized, a broadcaster may have one or more OTA CDNs 10 depending on the geographic area (e.g., DMA, zip code, block group, census tract, cartographic level, government-established area/zone, geographic area, and/or the like) the broadcast area includes.

An OTA CDN 10 may include various components to transmit/broadcast content and/or data/information via an OTA broadcast (e.g., an OTA broadcast signal) to be received by one or more distribution devices 105. In one embodiment, the OTA CDN 10 may include one or more channel coding elements, one or more modulation elements, and one or more transmitters. Although not shown, the OTA CDN 10 may also include various other components, such as audio subsystems, video subsystems, multiplexers, exciters, drivers, amplifiers, network interfaces, processing elements, and/or the like. Via these elements, for instance, the OTA CDN 10 can transmit/broadcast OTA broadcasts (comprising content and/or data) within a broadcast area. The OTA CDN 10 may transmit/broadcast the broadcast (e.g., OTA broadcast) using a variety of standards and protocols, such as Advanced Television Systems Committee (ATSC), Terrestrial Integrated Services Digital Broadcasting (ISDB-T), Terrestrial Digital Multimedia Broadcasting (T-DMB), Digital Video Broadcasting-Terrestrial (DVB-T), Digital Video Broadcasting-Handheld (DVB-H), Digital Terrestrial Multimedia Broadcast (DTMB), Satellite Terrestrial Interactive Multi-service Infrastructure (STiMi), National Television System Committee (NTSC) standards and protocols, and/or the like.

It will be appreciated that one or more of a CDN's 10 components and other broadcaster components may be located remotely from one another. Furthermore, one or more of the components may be combined and additional components performing functions described herein may be included.

Cable Content Delivery/Distribution Network

Although not shown, a cable CDN 10 (also referred to as a CDN 10) may be used with embodiments of the present invention. A cable CDN 10 may include various components to transmit/broadcast content and/or data/information via the cable provider's CDN 10 to the cable provider's subscribers. For example, in various embodiments, the cable CDN 10 may include a network operations center, a cable modem termination system, and a headend to transmit cable broadcasts (e.g., digital cable signals) through the cable provider's CDN 10 to user computing entities 30. Thus, user computing entities 30 may communicate with a headend over a distribution network.

To perform such functions, the cable CDN 10 may include various components, such as audio subsystems, video subsystems, multiplexers, switches, encoders, satellite receivers and antennae, network interfaces, decoding elements, encoding elements, processing elements, transmitting elements, modulation elements, and/or the like. The cable CDN 10 may be capable of receiving content and/or data/information and/or transmitting content and/or data/information (e.g., transmit broadcast signals in a one-to-many or broadcast configuration) using a variety of standards and protocols to user computing entities 30, including those described with regard to the OTA CDN 10 and/or further including various versions of data/information over cable service interface specification (DOCSIS).

Satellite Content Delivery/Distribution Network

Although not shown, a satellite CDN 10 (also referred to as a CDN 10) may be used with embodiments of the present invention. A satellite CDN 10 may include various components to transmit/broadcast content and/or data/information (e.g., transmit broadcast signals in a one-to-many or broadcast configuration) via the satellite provider's CDN 10 to user computing entities 30 (e.g., subscribers). For example, in various embodiments, the satellite CDN 10 may include uplink facilities (with transmitting antennae), satellites (with transponders), receiving satellite dishes, and/or user computing entities 30. Thus, the satellite CDN 10 can transmit/broadcast satellite broadcasts (comprising content and/or data) to user computing entities 30 using a variety of standards and protocols, such as those described with regard to the OTA CDN 10 and/or further including direct broadcast satellite (DBS), television receive only (TVRO), and/or the like.

IP-Based Delivery/Distribution Network

Although not shown, an IP-based CDN 10 (also referred to as a CDN 10) may be used with embodiments of the present invention. An IP-based CDN 10 may include various components to transmit/broadcast content and/or data/information (e.g., transmit broadcast signals in a one-to-many or broadcast configuration) via the provider's CDN 10 to user computing entities 30 (e.g., subscribers). Thus, the IP-based CDN 10 can transmit/broadcast broadcasts (comprising content and/or data) to user computing entities 30 using a variety of standards and protocols, such as those described previously.

Provider System 200

Herein the term "provider" is used to indicate any entity, individual, organization, company, group or the like that provides or assists in providing one or more users with at least one media presentation. The term "production staff" is used to indicate any individual involved with the production of at least one media presentation. The term "user" is used herein to indicate any individual, family, entity, organization, company, group, or the like that accesses, receives, views, and/or experiences at least one media presentation provided by the provider. In some embodiments, the user may access, receive, view, and/or experience at least one media presentation from the provider via a paid or unpaid subscription service for example.

In various embodiments, a provider system 200 may be configured to provide production staff (e.g., operating an appropriate computing entity) with an interactive user interface configured for producing at least one enhanced media content. The provider system 200 may be further configured to provide at least one enhanced media presentation to at least one user. The enhanced media presentation may be in the form of a live stream of the enhanced media presentation or an on demand stream of the enhanced media presentation (e.g., Video on Demand (VOD) or the like).

In various embodiments, the provider system 200 is a system operated by, on behalf of, or in association with a media presentation provider to provide at least one enhanced media presentation to one or more users. In general, the terms computing entity, network, network entity, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data/information, content, information, and/or similar terms used herein interchangeably.

Figure 2:
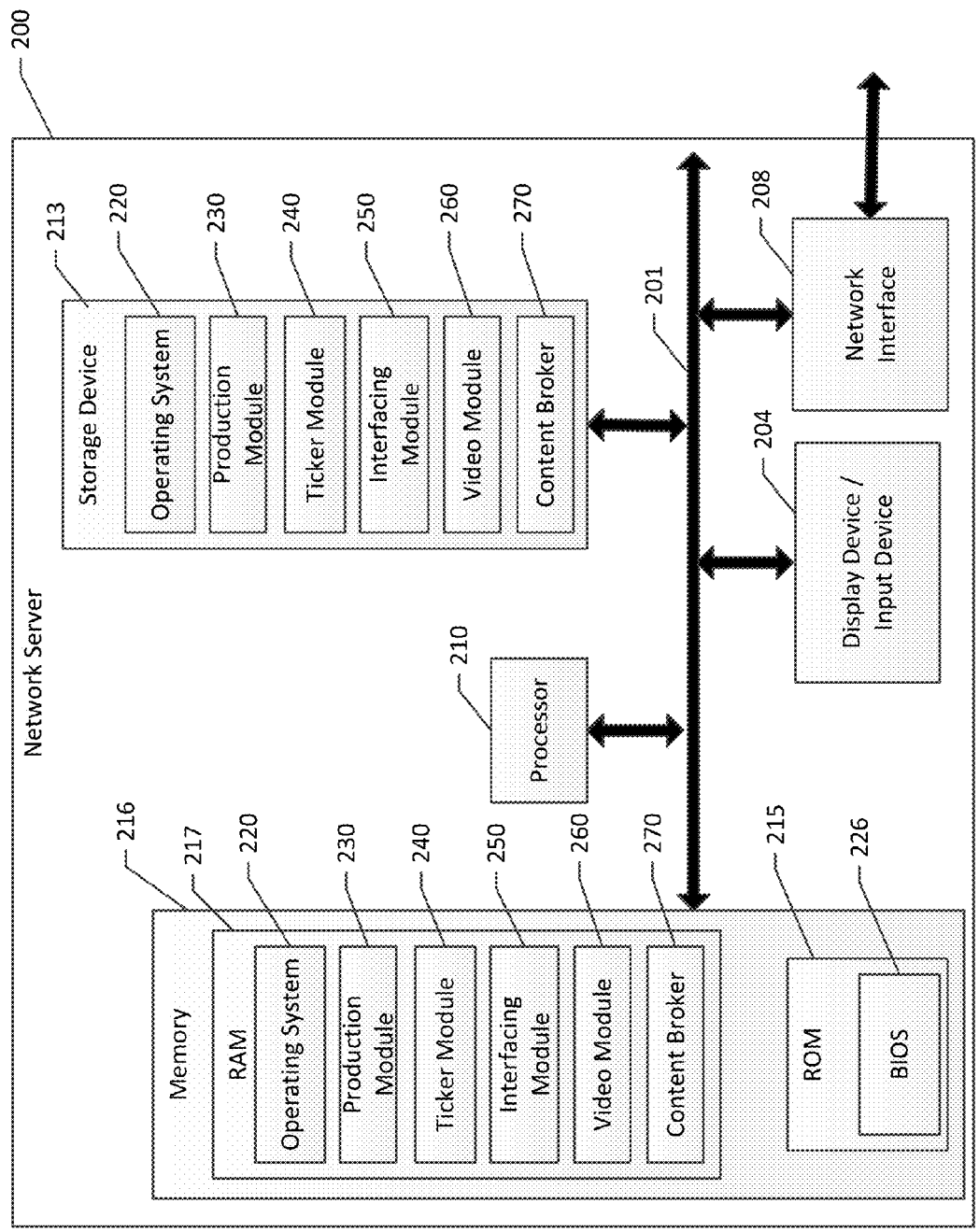
FIG. 2 is a schematic diagram of a provider system, in accordance with one embodiment of the present invention.

FIG. 2 provides a schematic diagram of an example provider system 200. The provider system 200 comprises a processor 210, such as one or more processing elements, which may include complex programmable logic devices (CPLDs), microprocessors, multi-core processors, coprocessing entities, application-specific instruction-set processors (ASIPs), and/or controllers or other processing devices or circuitry. The term circuitry may refer to an entirely hardware embodiment or a combination of hardware and computer program products. Thus, the processor 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor 210 may be configured for a particular use or configured to execute instructions stored in volatile or non-volatile media or otherwise accessible to the processor 210. As such, whether configured by hardware or computer program products, or by a combination thereof, the processor 210 may be capable of performing steps or operations according to embodiments of the present invention, such as the embodiments illustrated in FIG. 4, when configured accordingly. The processor 210 is used to execute software instructions for carrying out the defined steps of the method of the various embodiments of the present invention. The processor 210 communicates using a data/information bus 201 that is used to convey data/information and program instructions, typically, between the processor and memory 216.

The provider system 200 further includes memory 216, which may comprise non-volatile media (also referred to as non-volatile storage, memory, memory storage, memory circuitry and/or similar terms used herein interchangeably). In one embodiment, the non-volatile storage or memory may include one or more non-volatile storage or memory media as described above, such as hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data/information, applications, programs, program modules, scripts, source code, object code, byte code, compiled code, interpreted code, machine code, executable instructions, and/or the like. Such code may include the production module 230, ticker module 240, interfacing module 250, video module 260, content broker module 270, and/or client module 35 (shown in FIG. 3). The terms database, database instance, database management system, and/or similar terms used herein interchangeably may refer to a structured collection of records or data/information that is stored in a computer-readable storage medium, such as via a relational database, hierarchical database, and/or network database.

In at least one embodiment, the provider system 200 may further include or be in communication with volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management systems, data/information, applications, programs, program modules, scripts, source code, object code, byte code, compiled code, interpreted code, machine code, executable instructions, and/or the like being executed by, for example, the processor 210. Thus, the databases, database instances, database management systems, data/information, applications, programs, program modules, scripts, source code, object code, byte code, compiled code, interpreted code, machine code, executable instructions, and/or the like may be used to control certain aspects of the operation of the provider system 200 with the assistance of the processor 210 and operating system 220, production module 230, ticker module 240, interfacing module 250, video module 260, content broker module 270, and/or client module 35.

As indicated, a number of program modules may be stored by the non-volatile and/or volatile memory. Such program modules may include the production module 230, ticker module 240, interfacing module 250, video module 260, content broker module 270, and/or client module 35. Those skilled in the art will appreciate that other modules may be present in RAM 217 to effectuate the various embodiments of the present invention. Furthermore, rather than described modules, other modules may be used or embodiments may not be modular.

As indicated, in one embodiment, the provider system 200 may also include one or more communications interfaces 208 for communicating with various computing entities, such as by communicating data/information, content, information, and/or similar terms used herein interchangeably that can be transmitted, received, operated on, processed, displayed, stored, and/or the like. For instance, the provider system 200 may be in communication with one or more E.C. host systems 20 and/or one or more user computing entities 30 via various wired or wireless network 50. Such communication may be executed using a wired data/information transmission protocol, such as fiber distributed data/information interface (FDDI), digital subscriber line (DSL), Ethernet, asynchronous transfer mode (ATM), frame relay, DOCSIS, Programming Metadata Communication Protocol (PMCP), or any other wired transmission protocol. Similarly, the provider system 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols, wireless universal serial bus (USB) protocols, any other wireless protocol, and/or any other appropriate communications protocol. In various embodiments, the provider system 200 may be configured to communicate with various computing entities to provide at least one enhanced media presentation to a user computing entity 30.

Various information is input by a user or production staff member (e.g., operating an appropriate computing entity) to the provider system 200 via the network interface 208 and/or input/output device 204. This input information may include information related to a media presentation, enhanced content associated with a media presentation, metadata or other data/information associated with a media presentation, data/information associated with one or more users, or other information. This input information may vary, however, depending on the configuration and informational requirements of the provider system 200.

As mentioned above, the provider system 200 also includes an input/output device 204 for receiving and displaying data/information. The provider system 200 may include or be in communication with one or more input elements, such as a keyboard input, a mouse input, a touch screen/display input, audio input, pointing device input, joystick input, keypad input, and/or the like, as indicated by input/output device 204. The provider system 200 may also include or be in communication with one or more output elements, as indicated by input/output device 204, such as audio output, video output, screen/display output, motion output, movement output, and/or the like.

The provider system 200 may be configured to facilitate production and provide users with an enhanced media presentation. The provider system 200 may further be configured to receive one or more E.C. objects from one or more E.C. host systems 20, and provide an enhanced media presentation to one or more user computing entities 30 such that they enhanced media presentation may be displayed via a user interface that may be provided by client module 35. The provider system 200 may be further configured to provide production staff (e.g., operating an appropriate computing entity) with an interactive production interface for use in producing the enhanced media presentation. The provider system 200 may be further configured to complete processes related to producing the enhanced media presentation.

Those skilled in the art will recognize that many other alternatives and architectures are possible and can be used to practice various embodiments of the invention. The embodiment illustrated in FIG. 2 can be modified in different ways or incorporated within a network and be within the scope of the invention. For example, one or more components of the provider system 200 may be located remotely from other provider system 200 components, such as in a distributed system. Furthermore, one or more of the components may be combined and additional components performing functions described herein may be included in the provider system 200. Thus, the provider system 200 can be adapted to accommodate a variety of needs and circumstances.

E.C. System 20

In various embodiments, the E.C. host system 20 may be configured for storing, hosting and/or providing one or more E.C. objects and/or data/information related to one or more E.C. objects that can each be associated with one or more enhanced media presentations. In various embodiments, an E.C. host system 20 is any system hosting one or more E.C. objects and/or data/information associated with one or more E.C. objects that each can be associated with one or more enhanced media presentations. In one embodiment, the E.C. host system 20 may include one or more components that are functionally similar to those of the provider system 200 or the CDNs 10. For example, in one embodiment, the E.C. host system 20 may include one or more processing elements, one or more display device/input devices, volatile and non-volatile storage or memory, and/or one or more communications interfaces. The E.C. host system 20 may also comprise various other systems. In particular, the E.C. host system 20 may include components configured to store and/or host one or more E.C. objects and/or associated data/information, provide one or more E.C. objects and/or associated data/information to the provider system 200, and/or the like. The E.C. host system 20 may be in communication with the provider system 200, and/or other computing devices, via one or more wireless or wired networks 50.

User Computing Entity 30

In various embodiments, the user computing entity 30 may be configured to receive at least one enhanced media presentation and/or data/information associated with at least one enhanced media presentation and provide the user with the enhanced media presentation. The user computing entity 30 is any system used by a user to receive, view, and/or experience at least one enhanced media presentation. For example, as described above, a user computing entity 30 may be one or more computers, mobile phones, gaming consoles (e.g., Xbox, Play Station, Wii), desktops, tablets, notebooks, phablets, set-top devices in communication with a television or other display device (e.g., projector or the like), smart televisions, laptops, wearable computer, and/or any combination of devices or entities adapted to perform the functions, operations, and/or processes described herein. In one embodiment, the user computing entity 30 may comprise a combination of two or more computing devices noted above and/or other computing devices. For example, a user computing entity 30 may comprise a set top box "paired" with a tablet.

In one embodiment, the user computing entity 30 may include one or more components that are functionally similar to those of the provider system 200. In one embodiment, the user computing entity 30 may include one or more processing elements, one or more display device/input devices, volatile and non-volatile storage or memory, and/or one or more communications interfaces. The user computing entity 30 may also comprise various other systems. In particular, the user computing entity 30 may include components configured to receive an enhanced media presentation and/or related data/information with audio, visual, and/or other output for experiencing the enhanced media presentation, and/or the like. The user computing entity 30 may also be in communication with a variety of computing entities.

In various embodiments, the user computing entity 30 may include or otherwise be in communication with a variety of input devices that may be configured to receive input from a user such that a user may control his/her experience of an enhanced media presentation. For example, in some embodiments, the user computing entity 30 may include or be in communication with a pointing device such as a computer mouse, infrared pointing device, motion detecting device, and/or the like. In other embodiments, the user computing entity 30 may include or be in communication with a joy stick, remote control, handheld controller which may include a d-pad, and/or the like. Thus, the user computing entity 30 may be configured to receive user input through a variety of input approaches and techniques.

IV. Exemplary System Operation

Figure 3:
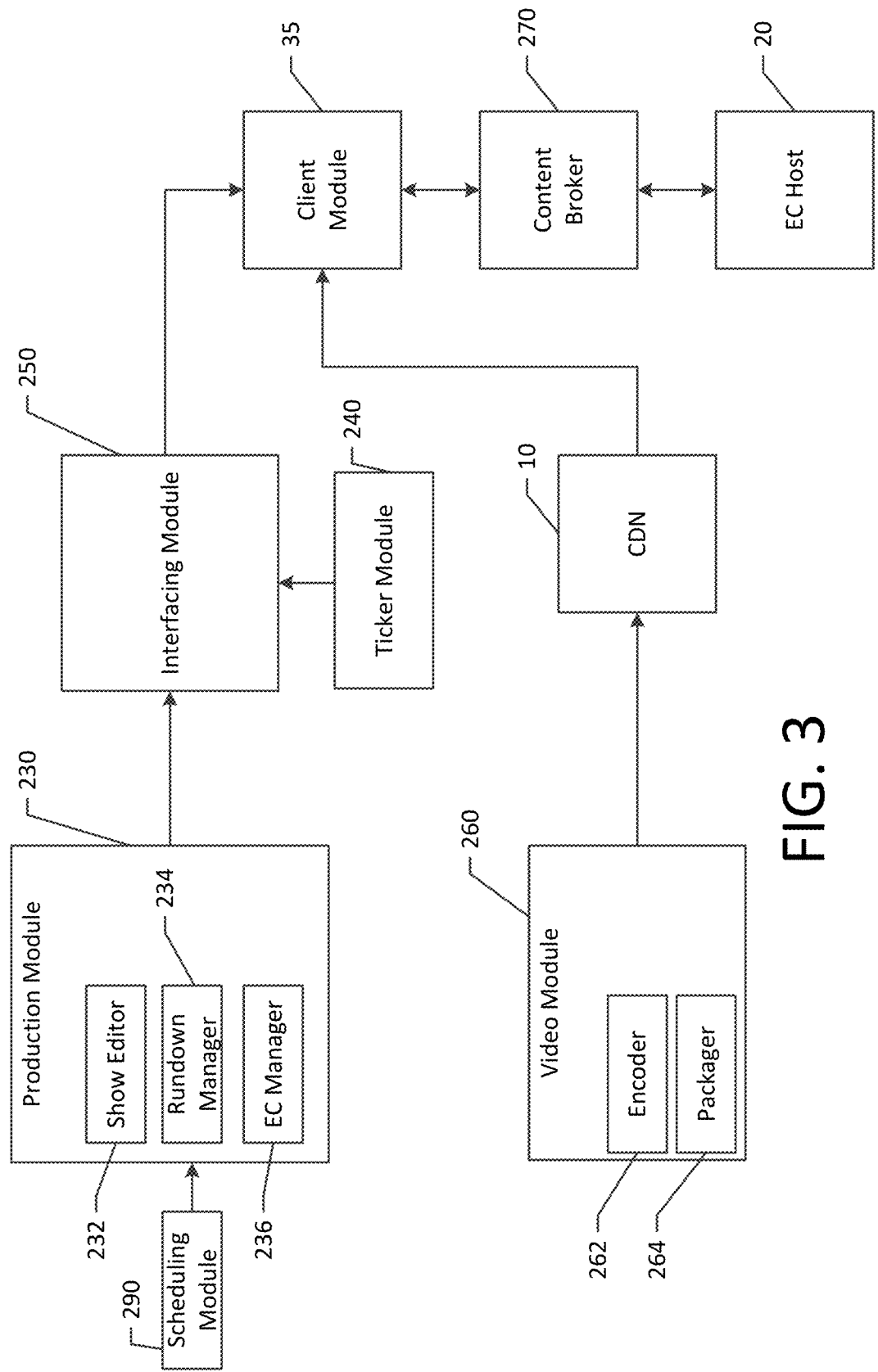
FIG. 3 is a system flow diagram illustrating the workflow in an example enhanced media presentation system, in accordance with one embodiment of the present invention.
Figure 7:
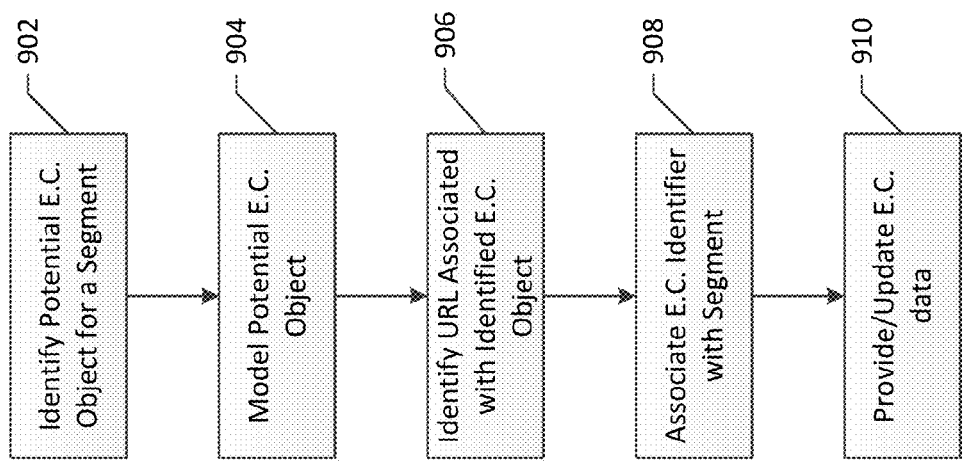

Reference will now be made to FIGS. 3-17, 18A, and 18B-38. FIG. 3 is a system flow diagram illustrating the workflow in an example enhanced media presentation system, in accordance with one embodiment of the present invention. FIGS. 4-15 each provide a flowchart illustrating process and operations related to producing an enhanced media presentation, in accordance with an embodiment of the present invention. FIG. 16 is a schematic diagram showing the layout of an interactive user interface for experiencing an enhanced media presentation, in accordance with an embodiment of the present invention. FIGS. 17, 18A, and 18B illustrate various layouts of an interactive user interface for experiencing an enhanced media presentation, in accordance with an embodiment of the present invention. FIGS. 19, 20, 22, 23, 25, 29, 31, 33, 35, and 37 together comprise flowcharts illustrating processes and operations related to providing a user with an enhanced media presentation, in accordance with an embodiment of the present invention. FIGS. 21A, 21B, 24, 26, and 30 are partial views of an example interactive user interface for experiencing an enhanced media presentation, in accordance with an embodiment of the present invention. FIG. 27 illustrates a variety of example E.C. tiles, buttons, fields, icons, images, indicators, controls, functions, and/or similar words used herein interchangeably, in accordance with an embodiment of the present invention. And FIGS. 28, 32, 34, 36, and 38 show various views of an example interactive user interface for experiencing an enhanced media presentation, in accordance with an embodiment of the present invention. Although the following is described in the context of providing one or more enhanced news shows/programs, embodiments of the present invention are not limited to this particular context.

In one embodiment, the production module 230 may be configured to provide production staff (e.g., operating an appropriate computing entity) with an interactive interface for producing an enhanced new show. Further, although the following is described in the context of production staff and/or users manually performing certain tasks by operating computing entities, such tasks may be performed in a semi-automatic or fully-automatic manner. Thus, in instances where the following describes production staff or users performing tasks, it will be recognized that appropriate computing entities can perform the same in a semi-automatic or fully-automatic manner. In the illustrated embodiment, the production module 230 may comprises a show editor 232, a rundown manager 234, and an E.C. manager 236. The show editor 232 may be configured to manage the metadata related to a show (e.g., show title, show description, show logo, etc.). The rundown manager 234 may provide the production staff (e.g., operating an appropriate computing entity) with a tool for pre-populating a rundown with show segments, managing metadata associated with each segment, and/or the like. In various embodiments, the rundown manager 234 may be configured to integrate the enhanced news show rundown with information from the traditional news show schedule via information received from the scheduling module 290. The E.C. manager 236 may be configured to associate one or more E.C. objects and/or data/information associated with one or more E.C. objects each with one or more segments.

The show and/or sets of segment data/information managed via the production module 230 may be passed to the interfacing module 250 configured to provide an interface between the provider system 200 and the user computing entity 30. Particularly, the interfacing module 250 provides an application programming interface (API) between the production module 230 and the client module 35. The interfacing module 250 may also serve as an API between the ticker module 240 and the client module 35. The ticker module 240 may be configured to receive, aggregate, and/or manage ticker data/information (e.g., a set of current headlines and/or the like).

The video module 260 may be configured to receive live or pre-filmed video data/information (e.g., video, slide show, sound track, collection of image data/information, and/or the like). In various embodiments the video module 260 may be configured to receive video data/information that has already been edited. The video module 260 may comprise an encoder 262 and a packager 264. The encoder 262 may be configured to encode the video data/information in accordance with one of various formats, such as those described above. The packager 264 may be configured to provide tags comprising metadata to each video segment (e.g., the video data/information associated with a particular segment) and otherwise package each video segment in preparation for providing the video segment to the CDN 10. The CDN 10 may be configured to provide the video segments to the user computing entity 30 (e.g., client module 35).

In various embodiments, a user may provide input indicating the user would like to view an E.C. object that is part of an enhanced media presentation. For example, the user may select an E.C. tile that is part of an enhanced media presentation via the enhanced media presentation interface, as will be discussed in greater detail below. The client module 35 may pass the request for the E.C. object to the content broker module 270. The content broker module 270 may then request the E.C. object from the E.C. host system 20. In various embodiments, upon receiving the E.C. object, the content broker module 270 may normalize the E.C. object, as discussed in greater detail below, and pass the normalized E.C. object to the client module 35 of the user computing entity 30. The client module 35 may then provide, present, display, and/or similar words used herein interchangeably the E.C. object to the user (e.g., via an appropriate computing entity).

FIG. 4 provides a high level flowchart of operations performed to produce and provide a user with an enhanced media presentation, such as an enhanced news show. Particularly, FIG. 4 illustrates operations performed to produce an episode of an enhanced news show. At step 402, one or more members of the production staff (e.g., operating an appropriate computing entity) may use the production module 230 to create and manage a show episode and the segments that make up the show episode. At step 404, the show episode may be filmed and edited or such may be performed via a live or delayed live feed of a show. The video data/information may then be provided to the video module 260 to be encoded, packaged, and/or processed using a variety of other processing steps. At step 406, the video data/information is provided to the CDN 10 for broadcasting, streaming, and/or the like such that a user computing entity 30 may be provided with the video data/information associated with the show episode. At step 408, the rundown data/information is provided to the interfacing module 250 such that client module 35 may populate the rundown viewer/portion and E.C. viewer/portion of the user interface 2000 (shown in FIG. 16), wherein the rundown data/information is a set of data/information comprising at least the data/information needed to populate the rundown for a particular show episode. At step 410, the ticker data/information is provided to the interfacing module 250 such that the client module 35 may populate the ticker viewer/portion of the user interface 2000 (e.g., of the user computing entity 30).

As should be appreciated, various embodiments may combine the functionality of the modules 230, 240, 250, 260, 270 and/or 35 or may substitute the one or more modules for other methods to incorporate the functionality described herein with respect to the modules 230, 240, 250, 260, 270 and/or 35. Modules 230, 240, 250, 260, 270, and 35 will now be discussed in more detail with respect to FIGS. 5-17, 18A, and 18B-38.

Scheduling Module 290

In various embodiments, the scheduling module 290 may be configured to assist in the creation and execution of a rundown. A rundown, for example, may be a detailed breakdown of elements (e.g., segments or the like) in a show that will or may air. The scheduling module 290 may be configured to allow a production staff member (e.g., via an appropriate computing entity), for instance, to develop and write scripts, queue video data/information, prepare and code on air graphics, and sequence a show prior to airing. As such, the scheduling module may be central to the production of a non-enhanced news show. The scheduling module 290 may function as a helpful guide for the timing of shows and commercial breaks. With respect to embodiments the present invention, the scheduling module 290 is generally related to the production of a show episode that is to be aired live.

Production Module 230

In various embodiments, the production module 230 may operate on the provider system 200. The production module 230 may be configured to provide production staff (e.g., operating an appropriate computing entity) with an interactive production interface for managing rundown data/information. As noted, such concepts may also be implemented in an automatic or semi-automatic nature. In various embodiments, rundown data/information may comprise metadata associated with a show or show episode, one or more sets of segment data/information each associated with one of the one or more segments of a show episode, data/information associated with one or more E.C. objects each associated with a segment of a show episode, and/or the like. In some embodiments, rundown data/information may further include one or more sets of segment data/information associated with bonus segments and/or segments which did not air on television. For example, if a show is running long or is interrupted by breaking news, the final segment of the show may not fit within the time allotted for the show to be broadcast. The final segment may be produced and provided to one or more users as a bonus segment or the like via the user interface 2000. The production module 230 may comprise the show editor 232, rundown manager 234, and E.C. manager 236. FIG. 5 provides a high level flow chart of processes and operations that can be performed via the production module 230 to produce an enhanced news show, in one embodiment. The various functions of the production module 230 will now be described in detail with respect to FIG. 5 and FIGS. 6-10, as they relates to the production of a live episode of an enhanced news show.

At step 502, a production staff member (e.g., operating an appropriate computing entity) may use the show editor 232 to create a show. FIG. 6 provides a flowchart of the processes performed via the show editor 232 to create a show. At step 602, a new show template is created. In one embodiment, a new show template may only be created once for each particular show, one or more seasons of a show, and/or the like. The show template may then be used to prepopulate the metadata for each show episode. Thus, at step 604, the new show template is populated with metadata associated with the show. For example, the metadata associated with a show may comprise textual titles and/or subtitles, descriptions, synopses, graphics and/or imagery associated with the show, uniform resource identifiers (URIs), such as uniform resource locators (URLs), pointing to graphics and/or imagery associated with the show, a link page, administrative information such as estimated start time and airing days, status, and/or the like. The metadata may be provided via input from production staff operating an appropriate computing entity or obtained in an automatic or semi-automatic manner.

To create a show episode, a production staff member (e.g., operating an appropriate computing entity) uses the interactive production interface provided by the production module 230 to select a show template, at step 606. The metadata stored in the show template is then used to populate the metadata and therefore the rundown data/information associated with the show episode. At step 608, the rundown data/information for the show episode may be modified for that instance of the show without affecting the show template. For example, the title and/or subtitle associated with the show episode may be modified to reflect the title and/or subtitle of that particular show episode. The airing date, guests on that show episode, a special graphic associated with that show episode (e.g., for a holiday, special event, or themed episode, etc.), and/or the like. In various embodiments, the rundown data/information for the show episode may further comprise an E.C. array comprising zero, one, or a plurality of E.C. identifiers each configured to determine/identify one or more E.C. objects associated with the show episode.

Returning to FIG. 5, once a show episode has been created, one or more segments of the show episode may be created, at step 504. As noted above, a segment may represent a period of time within a show. For example, in one embodiment, a show episode may be associated with a segment array populated by one or more segment identifiers, each determining/identifying a segment. Each segment may be associated with a set of segment data/information. In various embodiments, each set of segment data/information may comprise a segment identifier, segment title, and/or the like, as described in detail below. The segment data/information may comprise at least a portion of the rundown data/information associated with the show episode.

As noted above, each segment may be associated with a set of segment data/information. In various embodiments, a set of segment data/information may comprise a segment state. In one embodiment, each segment may be associated with a state selected from the group of estimated, floated, current, actual, and killed. As noted in Table 1, an estimated segment is one which has not yet been produced and therefore does not have an actual start time and duration, but rather has an estimated start time and duration. A segment in the estimated state is one that is likely to change its start time and duration. Within the production interface, an estimated segment can be floated and/or taken, and the start time may change automatically based on segments around it. An actual segment is one which has been produced and did, or will, air at the start time identified. This state also indicates that the duration is known. Segments in the actual state can change if a mistake was made in programming, but would not normally change frequently. A floated segment is an estimated segment that is not currently being used in a rundown. Particularly, the interfacing module 250 may be configured to ignore floated segments. The start time and duration of a floated segment are estimated and are not used to calculate the start times of segments around it. In some embodiments, once a segment is floated it may not be displayed in various views of the production interface. A current segment is a segment that was an estimated segment but has been "taken;" thus, the segment that is currently being produced live. This state means that the start time is correct but the duration is still an estimate. A current segment may be changed back to an estimated segment if the segment is "un-taken" via the production interface. In one embodiment, only one segment may be a current segment at any given time. A killed segment is treated like an actual segment by the production module 230 but is ignored by the interfacing module 250. Thus, a killed segment will not be aired when the show is broadcast. Thus, a killed segment is an actual segment that will not be accessible to a user. Table 1 summarizes exemplary functionality of various segment states for content segments (top portion) and for commercial segments (bottom portion). The functionality of a killed segment may be the same as an actual segment; however, the killed segment is not accessible to a user via the user computing entity 30.

TABLE 1

| Content | Estimated | Floated | Current | Actual |
|---|---|---|---|---|
| Start Time | Estimated | Estimated | Actual | Actual |
| Duration | Estimated | Estimated | Estimated | Actual |
| Take | Yes | No | No | No |
| Float | Yes | No | No | No |
| Un-Float | No | Yes | No | No |
| Un-Take | No | No | Yes [3] | No |
| Edit Duration | Yes | Yes | No | Yes [1, 2] |
| Edit Title | Yes | Yes | Yes | Yes |
| Reorderable | Yes [6] | Yes [6] | No | Yes [1, 2] |
| Expand E.C. | Yes | Yes | Yes | Yes |
| Edit E.C. Titles | Yes | Yes | Yes | Yes |
| Edit E.C. Thumbnail | Yes | Yes | Yes | Yes |
| Reorder E.C. Items | Yes | Yes | Yes | Yes |
| Associate E.C. | Yes | Yes | Yes | Yes |
| Copyable | Yes [5] | Yes [5] | Yes [5] | Yes [5] |
| Deletable | No [4] | No [4] | No [4] | No [4] |
| Drop New Segment | No | Yes [6] | No | No |
| Commercial | | | | |
| Take | Yes | No | No | No |
| Float | Yes | No | No | No |
| Un-Float | No | Yes | No | No |
| Un-Take | No | No | Yes [3] | No |
| Edit Duration | Yes | Yes | No | Yes [1, 2] |
| Edit Title | No | No | No | No |
| Reorderable | Yes [5] | Yes [5] | No | Yes [1, 2] |
| Expand E.C. | No | No | No | No |
| Edit E.C. Titles | No | No | No | No |
| Edit E.C. Thumbnail | No | No | No | No |
| Reorder E.C. Items | No | No | No | No |
| Associate E.C. | No | No | No | No |
| Copyable | Yes | Yes | Yes | Yes |
| Deletable | No [4] | No [4] | No [4] | No [4] |
| Drop New Segment | No | Yes [6] | No | No |

[1]. Attempting to do this may cause a prompt to ask the production staff member if they really want to make this change.
[2]. In one embodiment, changing the duration of an actual segment will change the start time of all following segments just like it would for an estimated segment.
[3]. In one embodiment, an undo of a take can only be done once. Another undo cannot be done until another take is done. This effectively makes the undo buffer size one item.
[4]. In one embodiment, segments are not deletable. Segments can be changed, floated, and/or killed, but not deleted.
[5]. In one embodiment, an estimated or floated segment cannot be placed above the current segment.
[6]. In one embodiment, a new segment cannot be added above the current segment.

In various embodiments, an estimated segment may be taken to become the current segment or floated to become a floated segment; a floated segment may be un-floated to become an estimated segment; the current segment may be performed to become an actual segment; and an actual segment may be broadcasted or killed.

In various embodiments, the set of segment data/information may comprise a variety of data/information in addition to or instead of the segment state. For example, each set of segment data/information may comprise a segment identifier, a show identifier of the show or show episode the segment is a part of, the start time (e.g., timestamp) of the segment, the duration of the segment, a segment type, a topic identifier, a segment title, an array of related E.C. identifiers, a breaking news flag, a scheduling synchronization key, video format identifier, segment subject matter, segment key word(s) and/or the like. The segment identifier may be configured to determine/identify the segment uniquely, uniquely within the associated show, or uniquely within the associated show episode. In various embodiments, the segment identifier may be further configured to identify the video data/information associated with the segment. In one embodiment, the start time may be a UNIX timestamp (seconds since Jan. 1, 1970 UTC) that represents the start time of the segment. A variety of other time formats may also be used. The start time of the segment reflects the estimated time at which a segment is expected to be aired or the actual time the segment started to be aired, depending on the state of the segment. The duration of the segment reflects the length of the segment. The segment type may indicate whether the segment includes show content, one or more commercials, and/or the like. The topic identifier may indicate one or more topics associated with the segment. For example, a segment may be associated with the topic identifier "guncon" indicating that the topic of gun control is associated with the segment. In various embodiments, the topic identifier may be an alphanumeric code, tag, hashtag, and/or the like. In some embodiments, the topic identifier may be configured to determine/identify subject matter associated with the segment. In various embodiments a set of segment data/information may comprise one or more segment subject matters and/or key words. The segment title may indicate a title for the particular segment. This may be the segment title that is displayed in the rundown viewer/portion of the user interface 2000 (e.g., of the user computing entity 30) in association with the segment tile representing the segment. The segment title may be configured for optimal display on the display device associated with the user computing entity 30 (e.g., television, tablet, phablet, desktop). The array of related E.C. identifiers may comprise data/information determining/identifying various numbers of E.C. objects. In some instances, the array of E.C. identifiers may be empty, while in other instances the array of E.C. identifiers may comprise data/information determining/identifying one or more corresponding E.C. objects. In one embodiment, the maximum number of E.C. objects that may be identified in the array of E.C. identifiers, and therefore the maximum number of E.C. objects that may be associated with a given segment may vary to accommodate various needs and circumstances. In one embodiment, the breaking news flag may indicate whether the segment is a breaking news segment or not. If the breaking news flag is set to "true," the segment is a breaking news segment. If the breaking news flag is set to "false," the segment is not a breaking news segment. In some embodiments, a set of segment data/information may include additional flags, such as a developing story flag, a new information flag, and/or the like. The flags included in the segment data/information may be reconfigured to be true or false at any point during the planning and/or production of the segment or show episode. The scheduling synchronization key may comprise the necessary information for synchronizing one or more sets of segment data/information with the corresponding story in scheduling module 290, as will be described below. For example, the scheduling synchronization key may comprise a path to the location where the data/information associated with the corresponding scheduling story is stored or a scheduling story identifier. The video format identifier may comprise data/information configured to determine/identify the format of the video associated with the segment. In other embodiments, a variety of other segment data/information may be associated with a segment as appropriate for the application.

Once an episode of a show has been created in the rundown, the rundown for the episode may be populated with segments, each associated with a set of segment data/information, at step 504. In one embodiment, the segments of a show episode may be automatically created and populated with segment data/information based on information stored in association with the show template. For example, in some embodiments, the show template may comprise one or more default segments for the show. Therefore, once the show template has been selected, the show can be created in the rundown, and the rundown may be automatically populated with one or more segments that may then be edited via the production interface.

Figure 9:
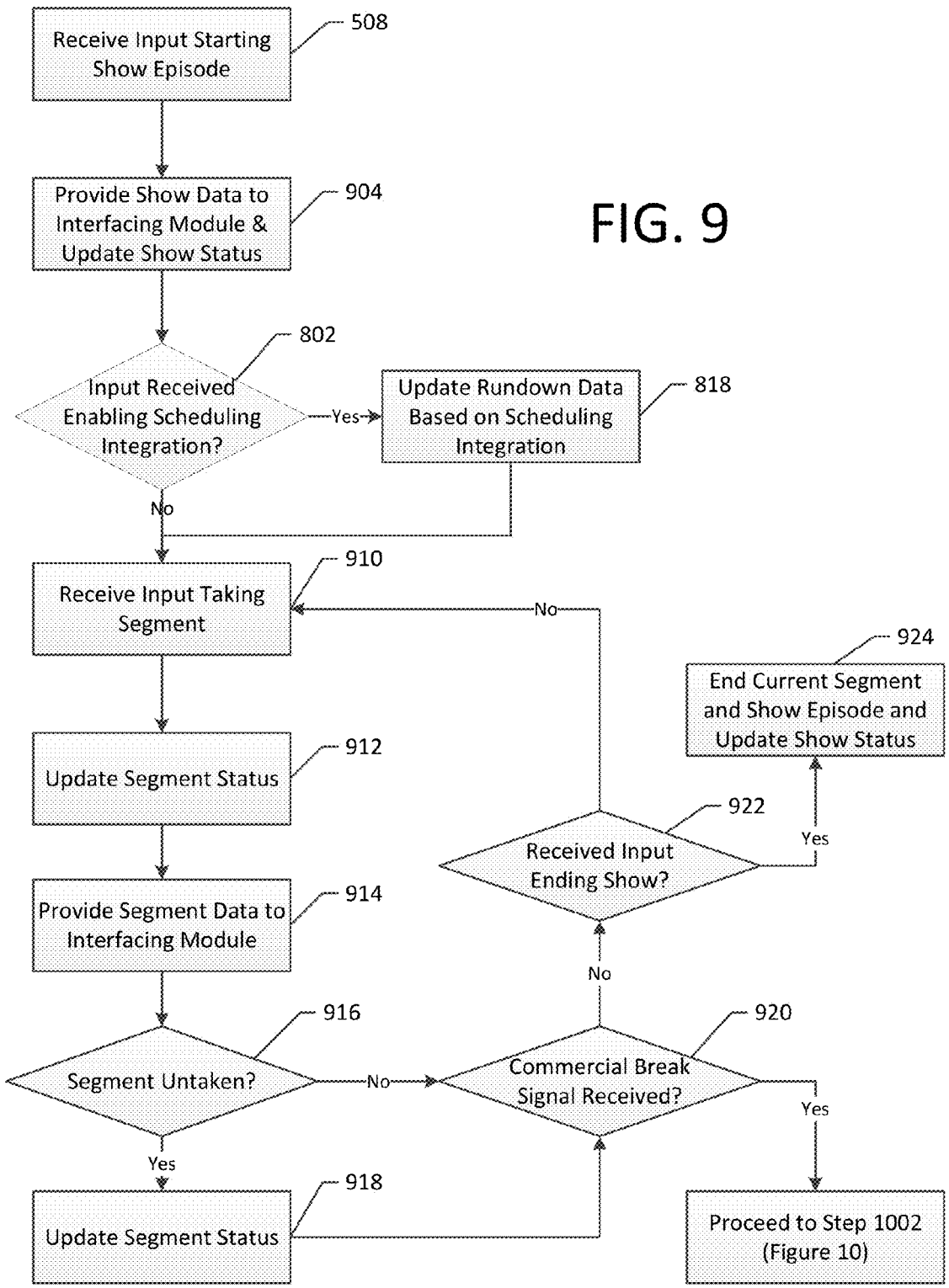

Remaining with FIG. 5, at step 506, one or more E.C. objects may be associated with a segment. This step is performed using the E.C. manager 236, which may be configured to receive input indicating the E.C. object selection and associate the E.C. object with the indicated segment. For example, the E.C. identifier associated with the E.C. object may be added to the array of E.C. identifiers associated with the set of segment data/information of a particular segment. FIG. 9 is a flowchart showing operations that may be performed via the E.C. manager 236 in one embodiment.

At step 902, a production staff member (e.g., operating an appropriate computing entity) may determine/identify a potential E.C. object for a segment. For example, the potential E.C. object may be identified via a browser specifically provided by the E.C. manager or production interface for determining/identifying potential E.C. objects, via a standard web browser (e.g., Firefox, Chrome, Internet Explorer, Safari, and/or the like), and/or via some other method. The potential E.C. objects may be related to a story or a theme or topic associated with the segment. For example, if the segment is to be a discussion of gun control, potential E.C. objects for the segment may include a story related to how the violent mentally ill can buy guns, a video looking at and/or discussing current U.S. gun laws, a photo essay about guns in America, and/or the like.

In various embodiments, potential E.C. objects may be automatically identified based on key words, recommendation engines, and/or other metadata associated with potential E.C. objects, show episodes, and/or segments. For example, as described below, a set of segment data/information associated with a segment may comprise one or more segment subject matter, one or more topic identifiers configured to determine/identify the segment subject matter, and/or one or more segment key words. Similarly, a potential E.C. object may be associated with one or more key words and/or the like. In various embodiments, the E.C. manager 236 may be configured to determine/identify if an E.C. object is related to a segment based on the segment subject matter (e.g., topic identifier, one or more segment key words, and/or the like) and one or more content key words associated with the potential E.C. object. In various embodiments, the E.C. manager 236 may compare the content key words with the segment subject matter (e.g., topic identifier, one or more segment key words, and/or the like) to determine/identify if any of the content key words match and/or are substantially similar to the segment subject matter (e.g., topic identifier, at least one of the one or more segment key words, and/or the like). In one embodiment, each topic identifier may be associated with a list of one or more potential content key words, such that if the content key word(s) associated with a potential E.C. object matched one or more of the potential content key words, the E.C. manager 236 would determine/identify that the E.C. object is related to the segment. It should be understood that a variety of methods may be used to automatically determine/identify that a E.C. object is related to a segment, including but not limited to natural language processing, various string searches, and/or the like. In some embodiments, the E.C. manager 236 may determine/identify that an E.C. object is related to a segment if a particular number of content key words (e.g., three content key words) match or are substantially similar to the segment subject matter (e.g., topic identifier, segment key word, list of key words associated with a topic identifier, and/or the like).

At step 904, a potential E.C. object may be modeled by the E.C. manager 236 thereby creating an abstract representation of the potential E.C. object. The modeling may depend on the type of potential E.C. object being modeled and how various types of content may react in different contexts. For example, a text story may be modeled in a different manner than a photo gallery, video, or social media content. The resulting abstract representation, or E.C. object, comprises a portable data/information set. Thus, an E.C. object may be a modular, portable abstract representation of the content of the associated or corresponding potential E.C. object. The portable data/information set may be used to determine/identify show episodes and/or segments that may be related to the E.C. object, or to complete other programming functions. At step 906, the E.C. manager 236 receives input indicating data/information associated with an E.C. object. In one embodiment, the data/information associated with an E.C. object may be received via manual input provided by a production staff member operating an appropriate computing entity or using automated approaches. The data/information may comprise an E.C. identifier, a URL associated with the E.C. object and/or a source of the E.C. object, a title of the E.C. object, a type of E.C. object, a thumbnail associated with the E.C. object, and a payload associated with the E.C. object, and/or the like. The E.C. identifier may be generated by the E.C. manager 236 or other mechanism and be configured for determining/identifying the particular E.C. object with which it is associated. The URL and/or source associated with the E.C. object may indicate a location on the Internet or some other accessible network address indicating the location where the E.C. object may be accessed and/or retrieved. The title of the E.C. object may be the title for the E.C. object displayed via the user interface 2000 (e.g., of the user computing entity 30). The type of E.C. object may indicate whether the E.C. object is an article, photo, photo gallery, video, video gallery, infographic, map, poll, guest biography, a tweet or other social media E.C. object, a blog post, and/or the like. The thumbnail may be displayed via the user interface 2000 that is part of or in communication with the user computing entity 30 to offer a preview of the E.C. object to a user. In some embodiments, a URL or other network address where a published thumbnail associated with the E.C. object is available may be provided in place of the thumbnail itself. The payload associated with the E.C. object may depend on the type of the E.C. object. For example, if the E.C. object is a video, the payload may comprise the video.

At step 908, the E.C. manager 236 may associate the E.C. object and/or data/information associated with the E.C. object with one or more segments and/or show episodes. For example, in one embodiment, the E.C. manager 236 may generate a unique E.C. identifier configured to determine/identify the E.C. object. This E.C. identifier may then be associated with both the data/information associated with the E.C. object and the selected segment. For example, the E.C. identifier may be added to the E.C. array associated with the set of segment data/information for the selected segment.

At step 910, the E.C. manager 236 may receive input providing and/or updating various data/information associated with one or more E.C. objects. For example, the E.C. manager 236 may receive input changing the title of an E.C. object, reordering two or more E.C. objects associated with a segment, and/or the like.

In various embodiments, the E.C. manager 236 may associate one or more E.C. objects with a segment and/or otherwise manage the E.C. objects associated with a segment at any time during the production process. For example, the E.C. manager 236 may associate an E.C. object with an estimated, floated, current, actual and/or killed segment. Thus, the E.C. manager 236 may be used to associate one or more E.C. objects with one or more segments before the show starts, during the show, before scheduling integration is enabled, while scheduling integration is enabled, after scheduling integration has been disabled, after the segment has ended, after the show has ended, and/or the like.

Returning to FIG. 5, at step 508, input is received indicating the start of the show episode. Thus, input is received that the show is now being broadcasted live. In various embodiments, the input indicating the start of the show episode may be received within a time range around the expected start time of the show episode, but not an extended time range around the expected start time of the show episode. For example, if a show is schedule to start at 3:00 pm, the input indicating the start of the show episode maybe received at shortly before or shortly after 3:00 pm, but perhaps not at 1:05 pm.

After receiving the input starting the show, or possibly in response thereto, if there is a current show episode and/or current segment, that show episode or segment is ended. In one embodiment, in response to the show episode being started, the rundown manager 234 may pass the start time for the show episode to the interfacing module 250. For example, the rundown manager 234 may pass the start time for the show episode to the interfacing module 250 as a UNIX timestamp indicating the moment that the input starting the show was received. In one embodiment, the production module 230 will wait for input indicating that the first segment of the show should be taken. In one embodiment, receiving input starting the show may cause the first segment to be automatically taken. When the segment is taken, the segment state is updated from an estimated segment to a current segment. Thus, taking the segment fixes the start time of the segment. In one embodiment, only segments associated with the current show are available to be taken.

At step 510, the rundown for the in progress live show episode (e.g., current show) may be synchronized with the scheduling module 290. In various embodiments, the scheduling module 290 is configured for scheduling the filming of the video data/information associated with the show episode, for instance. In various embodiments, the scheduling module 290 may be configured to organize the show episode into stories. Stories may be associated with show content or commercials. In various embodiments, the scheduling module 290 may be configured to run on the provider system 200 or another computing device in communication with the provider system 200. Certain aspects of the stories maintained via the scheduling module 290 may represent key scheduling data/information that may be synchronized with the segment data/information associated with the rundown data—for example, story titles, story order, the state of a story (whether it will be used or not) and whether the story represents a commercial break. This information may be highly dynamic for news production and is often changing constantly. As such, it would be difficult for a human to maintain synchronization between the scheduling module 290 and the rundown data/information. Thus, by enabling the scheduling integration, the rundown data/information may reflect the scheduling data/information being used by the video production crew. In various embodiments, enabling the scheduling integration automates the process of populating and updating the rundown for a live show. In various embodiments, the synchronization process may be automated through execution of numerous business rules, the application of intelligent logic, and/or the like in real time. This may allow production staff members to focus on the editorial content of the show episode, rather than the scheduling aspects of the show episode. The production staff (e.g., operating an appropriate computing entity) may monitor the schedule managed by the scheduling module 290 to determine/identify when the schedule is populated enough to drive the rundown for that episode. At that point, the production staff (e.g., operating an appropriate computing entity) may choose to enable the scheduling integration. As previously noted, such concepts may be performed in a semi-automatic or fully-automatic manner as well. Once the scheduling integration is enabled, the estimated segments already existing in the rundown may be automatically floated and new segments may be created that correspond to stories listed in the schedule managed by the scheduling module 290. In one embodiment, while the scheduling integration is enabled, the production staff (e.g., operating an appropriate computing entity) may only be able to change the title, breaking news flag, and take status of a segment in the rundown. The production staff (e.g., operating an appropriate computing entity) may not be able to change the position of the segment within the show, the float status of the segment, or the duration of the segment while the scheduling integration is enabled.

Figure 8:
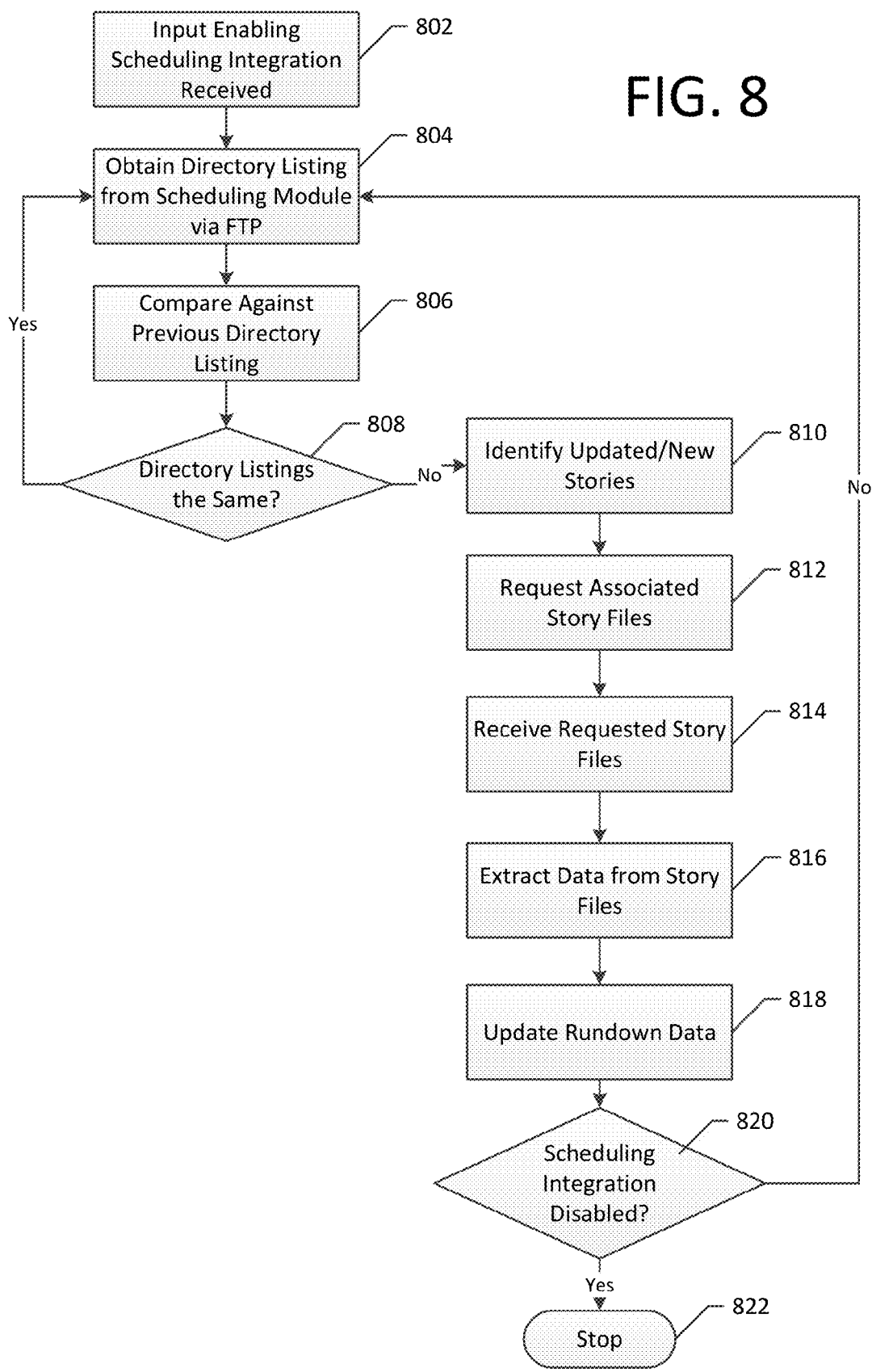

FIG. 8 is a flowchart illustrating how the scheduling integration may be performed in one embodiment. A step 802, the production module 230 receives input indicating the production staff would like to enable scheduling integration. At step 804, the production module 230 queries the scheduling module 290 to gather information about the current schedule for the show episode. For example, the production module 230 may query the scheduling module 290 via a File Transfer Protocol (FTP) site associated with the scheduling module 290. For instance, the production module 230 may issue an "LS" command for the portion of the scheduling directory related to the current show episode. After issuing the command, or perhaps in response thereto, the production module 230 may receive a directory listing from the scheduling module 290. The directory listing from the scheduling module 290 may include information related to one or more story files each associated with a story. Each story within the scheduling module 290 may be associated with a unique story identifier. For example, in one embodiment, the unique story identifier may be an eight digit story identifier. In various embodiments, each story may further be associated with a story type indicator. The story type indicator may be used to determine/identify which stories are content stories, which stories are commercials, and/or the like. In various embodiments, only information related to content stories will be considered during the scheduling integration. The production module 230 may process the received directory listing to determine/identify the different stories comprising the schedule information. Based on the received directory listing and the identified stories, the production module 230 may request the story files corresponding to the identified stories. Once the story files are downloaded, data/information may be extracted from the story files and used to populate the rundown with segments and/or update the one or more sets of segment data/information. In various embodiments, each story identifier may correspond to and/or be associated with a segment. In other some embodiments a segment may correspond to and/or be associated with more than one story identifier or a story identifier may correspond to and/or be associated with more than one segment, as appropriate for the application.

In order to reduce latency between updates made within the scheduling module 290 and the rundown, the production module 230 may query the scheduling module 290 at regular intervals (e.g., every 5 seconds, every 10 seconds, every 30 seconds, 10 minutes, 4 hours, and/or the like). At step 806, the new directory listing is received and compared against the previously received directory listing. At step 808, it is determined/identified whether the new directory listing and the previously received directory listing are the same. If they are the same, the production module 230 returns to step 804 to query the scheduling module 290. If the two directory listings are not the same, the production module 230 continues to step 810 to determine/identify the updated and/or new stories based on the information provided by the directory listing.

The production module 230 may iterate through the new received directory listing determining/identifying each of the previously identified stories via their unique story identifiers. Based on the directory listings for each story, the production module 230 may determine/identify which stories have been updated since the previous directory listing was received. The production module 230 may also determine/identify stories that were not present in the previous directory listing.

At step 812, the production module 230 schedules to pull the story files associated with the identified updated and/or new stories and requests the story files. At step 814, the story files are received from the scheduling module 290. At step 816 the relevant story data/information is extracted from the downloaded story files. At step 818, each segment corresponding to an identified updated and/or new story is updated based on the extracted story data/information. In various embodiments, step 818 may include reordering segments, updating a segment title, updating a segment status, update one or more flags associated with a segment, update one or more topic identifiers and/or the like associated with a segment, and/or the like. In some instances, a new segment may need to be created/generated within the show to correspond to one or more new stories. In various embodiments, new segments may be created/generated automatically by the production module 290. For example, the production module 290 may automatically insert/provide a title, estimate the duration of, insert/provide one or more topic identifiers and/or the like for the new segment. In some embodiments, if a story has been removed from the directory listing, the production module 230 may remove one or more segments associated with the removed story may also be removed from the rundown data (e.g., deleted, change the status to float, and/or the like).

In various embodiments, input from a production staff member (e.g., operating an appropriate computing entity) may be received by the production module 230 updating, for example, the title of a segment. In some embodiments, the title of that segment will no longer be updated based on the story data/information and/or scheduling information received from the scheduling module 290. In another example, a production staff member (e.g., operating an appropriate computing entity) may update a segment description. The set of segment data/information associated with that segment will continue to be updated based on the story data/information and/or scheduling information received via the scheduling module 290. However, the segment description for that segment may not be automatically updated based on the story data/information and/or scheduling information received via the scheduling module 290. For example, if information received via the scheduling module 290 indicates an update in the segment description for a segment, a production staff member may be notified (e.g., via an appropriate computing entity) and input may be requested indicating whether the production staff member would like the segment description to be updated based on the received information. Other segment data/information associated with that segment may still be updated based on the scheduling integration.

At step 820, it is determined/identified if the scheduling integration has been disabled. If the scheduling integration has been disabled, the production module 230 stops querying the scheduling module 290. If the scheduling integration has not been disabled, the production module 230 returns to step 804 to query the scheduling module 290 and repeat the process of updating segments corresponding to updated and/or new stories. In various embodiments, once the scheduling integration has been disabled for a show episode, the scheduling integration cannot be enabled during the remainder of that show episode. Thus, once the scheduling integration has been disabled, for the remainder of that show episode the rundown must be manually updated.

In various embodiments, the start times for each estimated segment may be estimated by backward timing. For example, the start time of the last segment is estimated such that, for the estimated duration of the estimated segment, the segment will end in the last second of the show time block. The start times of the other segments associated with the show episode may be estimated based on the estimated start time of the segments that come later in the show episode and their estimated durations. Thus, in one embodiment, the segment start times may be estimated by working backward from the final segment of the show episode to the first.

Returning to FIG. 5, at step 512 the live enhanced news show is produced. This step may comprise receiving input indicating that one or more segments should be taken (e.g., made the current segment) via the rundown manager 234. One or more commercial breaks may occur during the live enhanced news show. One or more segments may be taken and/or one or more commercial breaks may occur before the scheduling integration is enabled, while the scheduling integration is enabled, and/or after the scheduling integration is disabled. FIG. 9 provides a flowchart illustrating the processes and operations that may be performed via the rundown manager 234 to produce a live enhanced news show.

As shown in FIG. 9 and described above, at step 508 the rundown manager 234 receives input indicating the start of the show episode. At step 904, the rundown manager 234 provides the interfacing module 250 with show data/information and possibly other rundown data/information associated with the show episode. At step 802, input enabling the scheduling integration may be received. If input enabling the scheduling integration is not received, the rundown manager may continue to step 910. As discussed above, if input initiating the scheduling integration is received at step 802, the rundown data/information may be updated based on the schedule information managed by the scheduling module 290 at step 818. The rundown manager may then continue to step 910.

At step 910, the rundown manager 234 receives input indicating a segment should be taken. In various embodiments, the taken segment will be the next segment in the rundown (e.g., the segment located directly below the current segment in the rundown). When the segment is taken, the rundown manager updates the segment status from "estimated" to "current," at step 912. Thus, the start time of the segment is now the actual start time of the segment but the duration is still estimated. If there was a current segment at the time the input to take the segment was received, the status of the current segment is updated from "current" to "actual," indicating the start time and duration of that segment are known. At step 914, the set of segment data/information associated with the taken segment is provided to the interfacing module 250. For example, if a rundown comprises segments A, B, and C with segment A being located directly above segment B and segment B being located directly above segment C in the rundown, segment A is the current segment. Input from a production staff member (e.g., operating an appropriate computing entity) may be received indicating segment B should be taken. The status of segment A is updated from current to actual. The status of segment B is then updated from estimated to current and indicating that the video data/information associated with segment B is currently being broadcasted live. In various embodiments, if A is the current segment, it may still be possible to take segment C.

In various embodiments, once a segment is taken, it may be un-taken. At step 916, the rundown manager 234 determines if input un-taking the segment has been received. If the current segment is un-taken, the status of the segment is updated from current to estimated. In one embodiment, only the current segment may be un-taken. If input un-taking the segment has not been received, the rundown manager 234 continues to step 920. If the segment has been un-taken, the rundown manager 234 continues to step 918 and updates the segment status from "current" to "estimated." The rundown manager 234 then continues to step 920.

Figure 10:
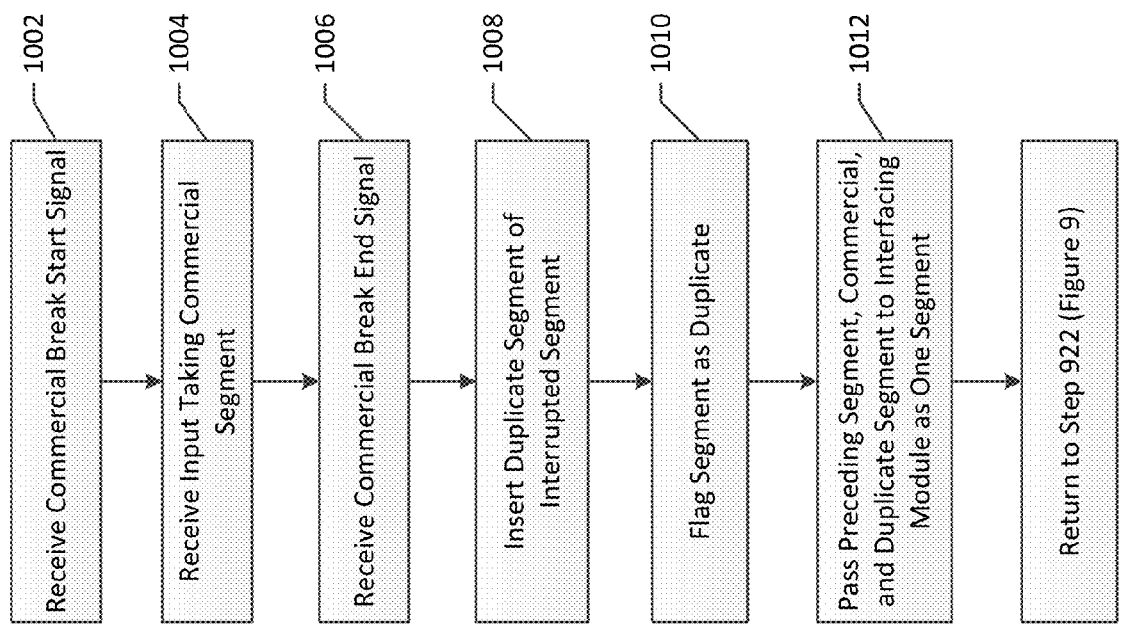

At step 920, the rundown manager 234 determines if a commercial break start signal has been received. If a commercial break start signal has not been received, the rundown manager 234 may continue to step 922. If a commercial break start signal has been received, the rundown manager continues to step 1002, shown in FIG. 10. FIG. 10 provides a flowchart of processes and operations the rundown manager 234 may perform in relation to a commercial break. For example, at step 1002, the commercial break start signal is received by the rundown manager 234. At step 1004, the rundown manager 234 may receive input taking a commercial segment. In other embodiments, the commercial segment may be automatically taken. For example, the commercial segment may be created and taken. In another example, the commercial segment has already been created, but is floated. The commercial segment may then be un-floated and taken. As noted above, the set of segment data/information associated with each segment includes a segment type. For a commercial segment, the segment type may be "commercial" or some other indication that the segment comprises one or more advertisements. In various embodiments, a commercial segment may be associated with one or more E.C. objects.

At step 1006, the rundown manager 234 receives the commercial break end signal. In various embodiments, the commercial break start and end signals may be accurate to a video frame. At step 1008, after the commercial break end signal is received, a duplicate of the segment that was interrupted by the commercial break is inserted immediately after the commercial segment and the duplicate segment is taken. The duplicate segment may be a complete replica of the interrupted segment other than start time, duration, and segment status. At step 1010, the duplicate segment is flagged as a duplicate segment, indicating to the rundown manager 234 that the segment should be handled as a duplicate segment.

At step 1012, the set of segment data/information for the segment interrupted by the commercial, the commercial segment, and the duplicate segment are combined and passed to the interfacing module 250. For example, if Segment 1 is the current segment when the commercial break start signal is received, the inserted duplicate segment is Segment 1a. The set of segment data/information passed to the interfacing module 250 comprises the start time of Segment 1 and a duration that equals the combined duration of Segment 1, the duration of the commercial segment, and the duration of Segment 1a. The rundown module 234 may then continue to step 922 shown in FIG. 9.

At step 922, the rundown manager 234 determines if input has been received ending the show episode. If input has not been received ending the show episode, the rundown manager 234 returns to step 910, where input taking the next segment is received. If input has been received ending the show episode, the rundown manager 234 continues to step 924. At step 924, the rundown manager 234 ends the current segment. Thus, the status of the current segment is updated from "current" to "actual," indicating that the start time and the duration of the segment are known and not estimated. Thus, when the show episode is ended, all segments that were aired will be associated with the segment status "actual." If the scheduling integration is enabled, it will be disabled. The show episode is also ended and the status of the show episode is updated to indicate the episode has been produced.

Once the show has been ended, the segments within the show cannot be taken or floated. However, the rundown for the episode may be copied to create another show episode (e.g., a repeat broadcasting of the show episode), a segment may be copied into another show, and/or a segment may be selected to appear in the featured segment frame of the rundown viewer/portion of the user interface 2000 (e.g., of the user computing entity 30), which will be described in more detail below. Once a show episode has been produced, the enhanced show episode can be aired at a selected time in an automated manner. For example, after input indicating the start time for the show has been received, or possibly in response thereto, the start times for each segment may be automatically determined/identified based on the known duration of each segment. In contrast to estimating the start times for the estimated segments associated with a show episode before the show is produced, the start times for the segments associated with a pre-produced show may be determined/identified via forward timing. The pre-produced enhanced show episode may then be automatically aired based on the determined/identified start times for each segment. Thus, when a segment of the pre-produced enhanced show episode finishes, the next segment may be automatically taken or the next segment may be taken in accordance with the start time associated with the segment. Additional E.C. objects may be associated with a pre-produced segment or show episode before, during, or after the rebroadcasting of the segment or show episode. Similarly, E.C. objects may be unassociated with a pre-produced segment or show episode before, during, or after the rebroadcasting of the segment or show episode.

Therefore, a show episode may be re-aired or replayed and the pre-populated show episode rundown and E.C. objects associated with segments of the show episode may be automatically or manually aligned with the re-aired or replayed show episode. The E.C. objects associated with a segment may be modified at any time. In various embodiments, a show episode may be re-aired or replayed including all of the originally aired segments. A show episode may also be re-aired or replayed with one or more additional segments added that were not included in the originally aired show episode or with one or more segments that were included in originally aired show episode removed.

Figure 11:
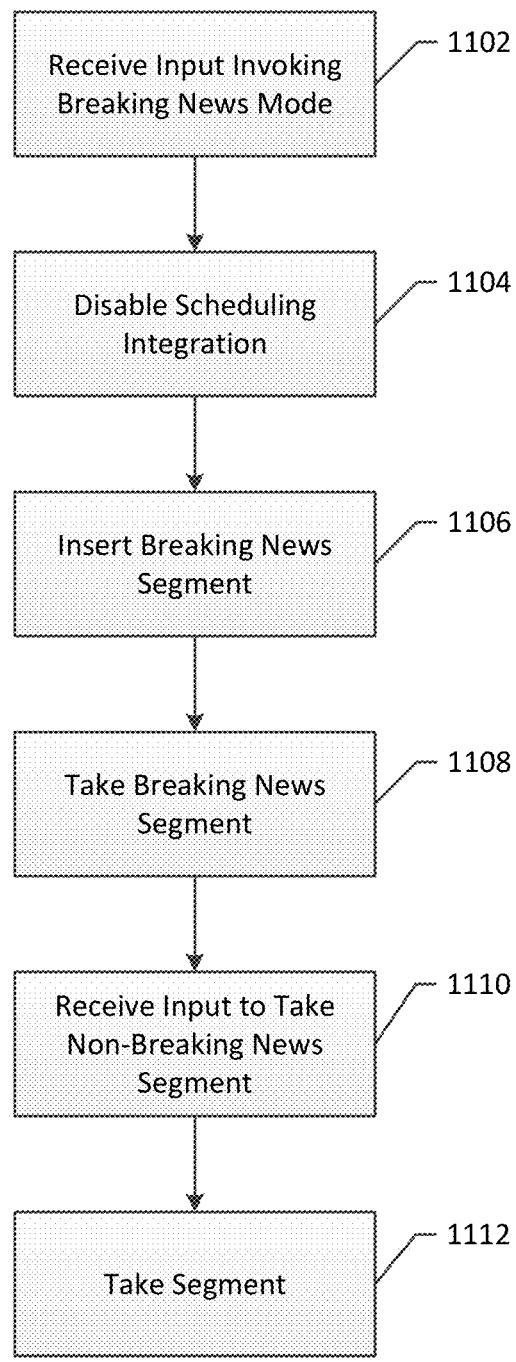

In various embodiments, during the airing of a live or pre-produced enhanced show episode, breaking news may occur. When breaking news occurs, the production module 230 may receive input to function in breaking news mode. FIG. 11 is a flowchart illustrating the processes performed in response to input indicating breaking news in one embodiment.

At step 1102, input is received invoking breaking news mode. For example, the production interface provided by the production module 230 may comprise a "breaking news" button, field, tile, icon, image, indicator, control, function, and/or similar words used herein interchangeably or the like that may be selected by a production staff member (e.g., operating an appropriate computing entity) to provide input invoking the breaking news mode. After the input invoking the breaking news mode has been received, or perhaps in response thereto, at step 1104, the rundown manager 234 automatically disables the scheduling integration, if the scheduling integration was enabled. In various embodiments, the option to enable scheduling integration is only available for live shows. Thus, if the show episode being interrupted by the breaking news is a pre-produced show episode, the scheduling integration cannot be enabled and therefore need not be disabled. At step 1106, a breaking news segment is inserted into the rundown directly after the current segment. The set of segment data/information associated with the breaking news segment has a breaking news flag set to "true." The title of the breaking news segment may be automatically set to "Breaking News," in some embodiments. In various embodiments, production staff (e.g., operating an appropriate computing entity) may provide input editing the title of the breaking news segment to adapt to various needs and circumstances.

At step 1108, the breaking news segment may be automatically taken. The associated set of segment data/information is then provided to the interfacing module 250. In other embodiments, the breaking news segment may be taken when input taking the segment is received. In various embodiments, the set of segment data/information associated with the breaking news segment may include an E.C. array comprising zero, one, or a plurality of E.C. identifiers. Each E.C. identifier may be configured to determine/identify an associated E.C. object. One or more E.C. objects may be associated with a breaking news segment while the breaking news segment is airing live or after the segment has been produced. At step 1110, input is received indicating a new segment that has the breaking news flag set to "false" should be taken. At step 1112, the indicted segment is taken and the associated set of segment data/information is passed to the interfacing module 250.

After the production module 230 exits breaking news mode, (e.g., by a non-breaking news segment being taken and/or the like), the scheduling integration is still disabled. As noted, above, in various embodiments, the scheduling integration can only be enabled once per show episode. Thus, in such embodiments, the remainder of the show must be performed without scheduling integration. Therefore, for the remainder of the show episode, the rundown data/information associated with the show episode must be manually updated. In various embodiments, the scheduling integration may never be enabled and the rundown data/information may always be manually updated.

In other embodiments, the breaking news mode may be manually controlled. For example, the breaking news flag associated with an estimated segment may be changed to true, indicating the segment is a breaking news segment. When the breaking news segment is taken, the scheduling integration may be automatically or manually disabled, and the production module 230 may enter breaking news mode. The production module 230 may maintain breaking news mode until a segment with the breaking news flag set to false is taken.

In various embodiments, the production module 230 may be further configured to maintain and update story objects. A story object may be associated with a variety of data/information including a title, a sub-title, a description, related categories and/or topics, an array of associated show episodes, segments, and/or E.C. identifiers, and/or the like. For example, a story object may be associated with title "Newtown School Shooting." The story object may be associated with the categories or topics of gun control, school shootings, etc. Additionally, the story object may be associated with segments from several different shows wherein the Newtown school shooting was discussed. E.C. objects associated with the associated segments or show episodes and other related E.C. objects may also be associated with the story object. Thus, segments and E.C. associated with segments that may be related to another segment may be easily identified. The show episodes, segments, E.C. objects, and other content associated with a story object may be automatically or manually identified and may be curated by a production staff member (e.g., via an appropriate computing entity).

Additionally, the story object may be associated with a social media replay. For example, social media posts related to a given story and/or E.C. objects modeling the social media post may be stored by the provider system 200. The stored social media posts and/or E.C. objects may also be associated with a timestamp, topic, and/or the like and may originate from a spectrum of social media platforms. Thus, the social media replay may provide a production staff member (e.g., via an appropriate computing entity) access to a wide variety of reactions to an event or the like through a variety of non-traditional media outlets, based at least in part on their timestamps. The social media replay associated with a story object may be curated by one or more production staff members (e.g., via an appropriate computing entity). Thus, tweets, Facebook posts, pictures, image galleries, status updates, blogs, and/or the like posted by various individuals, organizations, and entities during and/or in response to an event may be archived in a comprehensive and accessible manner for later replay. Thus, in some embodiments, a social media replay E.C. object may comprise a snapshot of one or more social media outlets at a particular point in time. The social media posts associated with a social media replay associated with story object may be automatically or manually identified and may be curated by a production staff member (e.g., via an appropriate computing entity) using the timestamps of the same.

By maintaining story objects, the production module 230 may easily access a broad variety of related E.C. objects, show segments, and/or other content that may be relevant to a specific topic or a related topic. For example, the example story object and associated social media replay associated with the title "Newtown School Shooting" may be used to provide users with an enhanced media presentation remembering and/or memorializing the one year anniversary of the Newtown school shooting or a social media presentation analyzing public reactions to school shootings, and/or the like. Thus, the story objects and associated social media replays maintained by the production module 230 may be a valuable production tool.

Ticker Module 240

In various embodiments, the ticker module 240 may be configured to receive, aggregate, and provide ticker data/information to the client module 35 of the user computing entity 30. In various embodiments, the ticker module 240 may receive one or more Rich Site Summary (RSS) files, Extensible Markup Language (XML) files, and/or various other files. The ticker module may then parse each file to extract ticker data/information. The extracted ticker data/information may be aggregated with other ticker data/information extracted from other files. The ticker data/information is provided to the interfacing module 250 such that the ticker data/information is available to the client module 35 of the user computing entity 30.

Figures 12, 13:
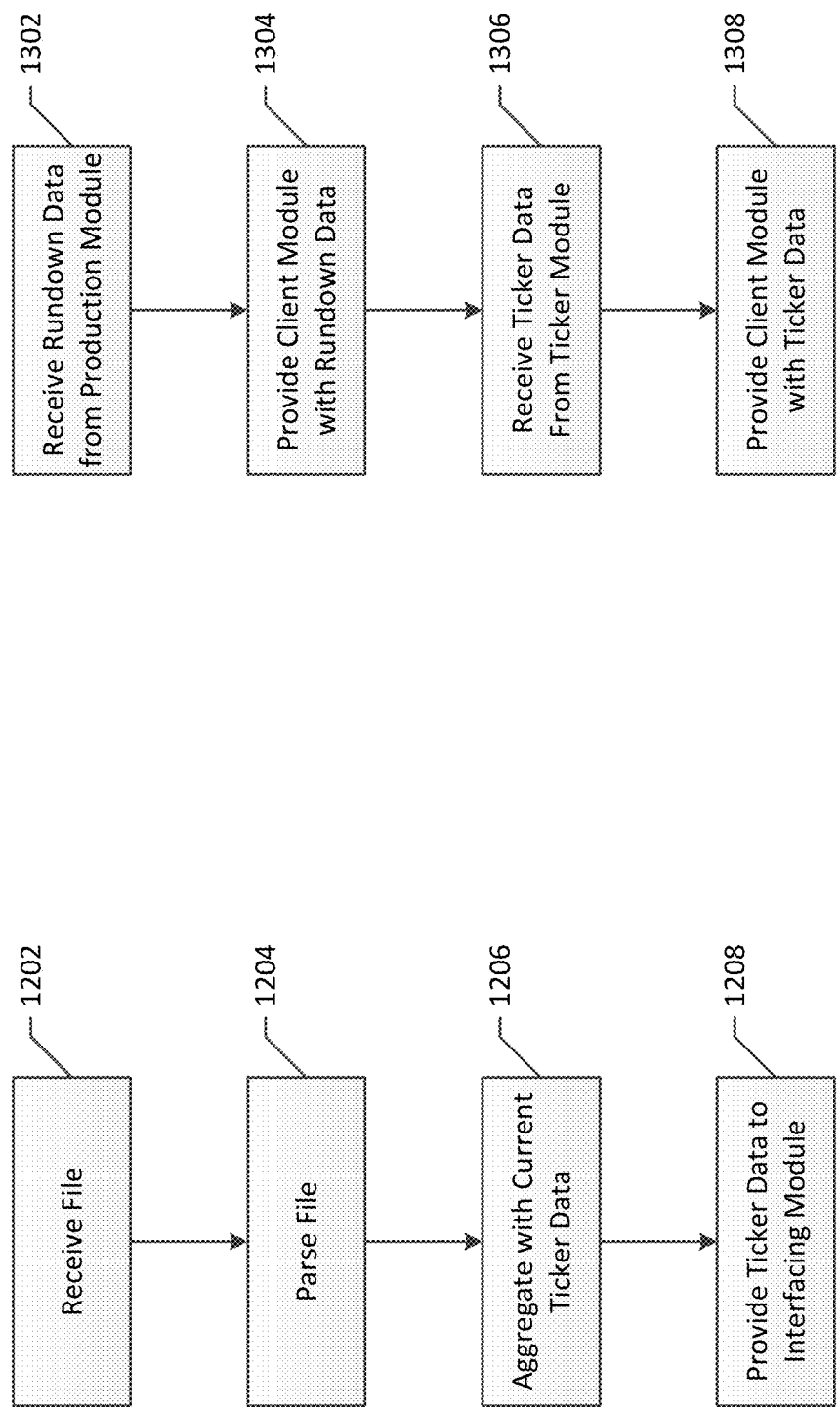

FIG. 12 provides a flowchart illustrating the processes performed by the ticker module 240. In the illustrated embodiment, the ticker module 240 receives a file at step 1202. The file is parsed at step 1204 and the ticker data/information is extracted. The extracted ticker data/information is aggregated with the current ticker data/information at step 1206. At step 1208, the current ticker data/information is provided to the interfacing module 250. The interfacing module 250 may then provide the current ticker data/information to the client module 35 of the user computing entity 30. In some embodiments, the current ticker data/information is provided to the interfacing module 250 and/or the client module 35 via an IP-based RSS feed, for instance. In various embodiments, the ticker data/information can be pushed to or pulled by the client module 35 of the user computing entity 30 by the interfacing module 250.

In various embodiments, the extracted ticker data/information will be included in the current ticker data/information for a preset period of time or until input is received indicating that a particular set of ticker data/information should be removed from the current ticker data/information. In some embodiments, the ticker module 240 is configured such that only a preset number of ticker data/information sets may be included in the current ticker data/information. For example, in one embodiment, only ten sets of ticker data/information (e.g., ten headlines) may be included in the current ticker data/information. Therefore, when the eleventh set of ticker data/information is added to the current ticker data/information, the oldest or a user-selected set of ticker data/information is removed from the current ticker data/information. In various embodiments, the current ticker data/information may comprise headlines and/or interactive elements such as video clips, text articles, images, graphics, tweets or other social media updates and/or the like. Such ticker data/information may provide a continuous loop of the ticker data/information for display via a ticker viewer/portion 2400 of the user interface 2000 (e.g., of the user computing entity 30). In various embodiments, the ticker data/information provided by the ticker module 240 may be synchronized and/or generally aligned with ticker information concurrently being broadcasted via the traditional linear broadcast television feed.

In various embodiments, the ticker module 240 may be configured to provide push notifications to client module 35. For example, a particular set of ticker data/information relating to particular story, headline, and/or the like may be flagged for a push notification. Thus, when the particular set of ticker data/information is extracted and aggregated to the current ticker data/information, the particular set of ticker data/information may be flagged for a push notification. The flagging may occur automatically based on various algorithms (e.g., key words in common with key words of a current or recent breaking news segment, associated with particular key words, associated with a particular subject, and/or the like) or may be manually flagged by a production staff member (e.g., operating a provider system 200, and/or the like). When the particular set of ticker data/information is the interfacing module 250 and/or the client module 35, the flag may indicate to the client module 35 that if the user is not actively engaged with the client module 35 (e.g., if the client module 35 is not the active window on the user computing entity 30, the user computing entity 30 is currently in a sleep, hibernate, low energy consumption state, and/or the like), the client module 35 may provide the particular set of ticker data/information to the user via a push notification (e.g., desktop notification/alert, lock screen notification/alert, and/or the like). In various embodiments, the user (e.g., operating the user computing entity 30) may be able to select the notification/alert and be provided with E.C. object, a particular show segment, and/or the like related to the particular set of ticker data/information (e.g., via the client module 35). As should be understood, push notifications and alerts may be provided based on ticker data/information, breaking news data/information, and/or the like via various methods as appropriate for the application.

Interfacing Module 250

In various embodiments, the interfacing module 250 may be configured to provide an API or other communication interface between the production module 230 and the client module 35. The interfacing module may be further configured to provide an API between the ticker module 240 and the client module 35. Thus, the interfacing module 250 may be configured to manage one or more socket hosts associated with the provider system 200 that may each be configured for providing rundown data/information and/or ticker data/information to each connected user computing entity 30.

FIG. 13 provides a flowchart of some of the processes that may be performed by the interfacing module 250 in accordance with one embodiment. At step 1302, the interfacing module 250 receives rundown data/information from the production module 230. As detailed above, the rundown data/information may comprise show data/information, one or more sets of segment data/information, and/or data/information associated with one or more E.C. objects (e.g., E.C. object data). At step 1304, the interfacing module 250 may push the rundown data/information to the client module 35 for display via the rundown viewer/portion 2300 of the user computing entity 30.

At step 1306, the interfacing module may receive current ticker data/information from ticker module 240. The interfacing module 250 may push the ticker data/information to the client module 35 for display via a ticker viewer/portion 2400 of the user computing entity 30 at step 1308.

In various embodiments, a user may provide input to the client module 35 requesting to view a previously aired show or segment (e.g., via a touchscreen, mouse, remote control, and/or the like). In such an instance, the interfacing module 250 may receive a request from the client module 35 for rundown data/information associated with the user-selected show or segment. The interfacing module 250 may provide the client module 35 with the requested rundown data/information. In various embodiments, the ticker data/information provided to the client module 35 of the user computing entity 30 may be independent of the segment or show being displayed via the user interface 2000 (e.g., of the user computing entity 30). Thus, the ticker data/information provided to the client module 35 may only depend on the current ticker data/information maintained by the ticker module 240.

In various embodiments, the interfacing module 250 may receive regular updates regarding of the rundown data/information associated with a show episode as the show episode is being planned and/or produced. For example, in one embodiment, the interfacing module 250 may receive an update every 10 seconds including any changes or updates made to the rundown data/information associated with the show episode made since the last update was received. The interfacing module 250 may be configured to store the received updates on the provider system 200 and/or other associated memory storage device. In various such embodiments, the rundown data/information updates may be stored in association with a timestamp. Therefore, it may be possible for a production staff member (e.g., via an appropriate computing entity) to replay the evolution of the rundown data/information associated with a show episode forward or backward in time. In various embodiments, more than one production staff member (e.g., via an appropriate computing entity) may be able to update the rundown data/information associated with a show episode at the same time. In such embodiments, the rundown data/information updates may also be stored in association with a user identifier configured to determine/identify the production staff member that made each update.

Video Module 260

In various embodiments, the video module 260 may be configured to run on the provider system 200. The video module 260 may be configured to receive video data/information. In some embodiments, the video module 260 may be configured to receive edited video; in other embodiments, the video module 260 comprises a video editor. The video module 260 may comprise an encoder 262 and a packager 264. The video module 260 may be further configured to transmit a digital or analog video file or video stream to the CDN 10.

FIG. 14 provides a flowchart of processes and operations that may be performed by the video module 260. At step 1402, the video module 260 receives a video stream or video file comprising video data/information. At step 1404, the encoder 262 encodes the video stream or video file. In various embodiments, the encoder 262 may encode the video stream or file using any of a variety of standards for video compression, as will be recognized. In one embodiment, the encoder 262 may encode the video stream or file using H.264/MPEG-4 AVC, H.262/MPEG-2, and/or other video compression formats and standards.

The packager 264 may then tag the video stream or file with determining/identifying information, at step 1406. For example, the video stream may be tagged with a show identifier, segment identifier, start time (timestamp), duration, segment type (content, commercials), topic identifier, segment title, and/or other data/information that may be used to determine/identify the video stream as being associated with a particular show episode or rundown segment. For example the segment and/or show identifier may be used to identify one or more sets of segment data/information associated with the video data/information of the video stream or file. In various embodiments, the video stream or file may be further tagged with contextual information including one or more relevant categories, key words, locations, individuals, characterization of the quality or sentiment of the video, and/or the like. In various embodiments, the video stream or file may be tagged with an ID3 tag or other tag that may be detectable by the user computing entity 30 and provided to the client module 35. In some embodiments, ID3 frames comprising the determining/identifying data/information may be tagged onto the front of a segment of streaming video or onto the beginning of the video file. In various embodiments, the video stream or file may be tagged at various points within the video stream or file to indicate segment start and stop point or times within the video stream or file. It should be understood that a variety of methods may be used to tag a segment of streaming video or video file with the determining/identifying data/information.

At step 1408, the video module 260 provides the encoded and packaged video stream or file to the CDN 10. The CDN 10 may then provide the video stream or file to the client module 35 for displaying the video to a user via a video viewer/portion 2600 of the user interface 2000 (e.g., of the user computing entity 30).

In various embodiments, the video data/information for an entire show episode may be handled as a single video stream or file by the video module 260. Therefore, if a user wishes the access, via the user interface 2000 (e.g., of the user computing entity 30), a particular segment of the show episode, the portion of the video stream or file associated with the segment is identified via the timestamp associated with the segment start time. In other embodiments, the video stream or file associated with each segment is handled by the video module 260 as an individual video stream or file.

Content Broker 270

In various embodiments, the content broker 270 may be configured to operate on the provider system 200 and/or an associated computing entity. In various embodiments, the client module 35 may cause display of one or more E.C. tiles each representing an E.C. object to the E.C. viewer/portion 2700 of the user via the user interface 2000 (e.g., of the user computing entity 30). The client module 35 may then receive input from a user selecting an E.C. tile. The client module 35 may then submit a request to the content broker 270 to retrieve the user-selected E.C. object (e.g., in response to a user selecting the same via a touchscreen, mouse, remote control, and/or the like). The content broker 270 may be configured to receive a request for a user-selected E.C. object and retrieve the user-selected E.C. object from an E.C. host system 20 where the E.C. object is stored, hosted, or otherwise available. In some embodiments, the content broker 270 may be further configured to normalize the retrieved E.C. object. The content broker may then provide the E.C. object and/or the normalized E.C. object to the client module 35 of the user computing entity 30.

FIG. 15 provides a flowchart of processes and operations that may be performed by the content broker 270 in accordance with one embodiment. At step 1502, the content broker 270 receives a request for an E.C. object from the client module 35 (e.g., in response to a user of the user computing entity 30 selecting the same via a touchscreen, mouse, remote control, and/or the like). In various embodiments, the request may comprise the E.C. identifier or other data/information associated with the E.C. object. At step 1504, the content broker 270 requests and receives the E.C. object from the E.C. host system 20. In various embodiments, the E.C. object is requested and/or received via a URL or other network address associated with the E.C. object.

At step 1506, the content broker 270 may normalize the E.C. object. In various embodiments, the E.C. object may be normalized such that the E.C. object can be displayed via a template that may depend on the E.C. type indicator associated with the E.C. object, parameters associated with the user computing entity 30, the parameters associated with the client module 35 (e.g., version), and/or the like. In various embodiments, normalizing the E.C. object may comprise reformatting the E.C. object and/or editing the E.C. object for optimal length or viewing by the user via the user interface 2000 (e.g., of the user computing entity 30). At step 1508, the content broker provides the E.C. object to the client module 35 so that the E.C. object may be displayed via the user interface 2000 (e.g., of the user computing entity 30) provided by the client module 35.

User Interface 2000

In various embodiments, the client module 35 of the user computing entity 30 may be configured to provide a user interface 2000 with various viewers, portions, and/or similar words used herein interchangeably. The user interface 2000 (e.g., of the user computing entity 30) may be viewed via a web browser, separate application, interface, dedicated window or screen, and/or the like, depending on the user computing entity 30 and/or the embodiment. The user interface may be configured to allow a user to interact with one or more components of an enhanced media presentation, or, in the example provided herein, an enhanced news show. The user may be able to select an enhanced news show from a set of available enhanced news shows for viewing. The enhanced news show may then be displayed via the user interface 2000 (e.g., of the user computing entity 30).

An example user interface 2000 (e.g., of the user computing entity 30) view is shown in FIG. 16. The example user interface 2000 (e.g., of the user computing entity 30) shown in FIG. 16 is divided into four viewers/portions: a video viewer/portion 2600, a rundown viewer/portion 2300, an E.C. viewer/portion 2700, and a ticker viewer/portion 2400. The video viewer comprises a video display area 2610 of the video viewer/portion 2600 configured for displaying a video (e.g., streaming video) to the user and a video control area 2630 configured for providing information related to the streaming video and controls for interacting with the streaming video (e.g., comprising video data)—received from the CDN. The rundown viewer/portion 2300 comprises a data/information picker 2310 and a rundown frame 2320. The data/information picker 2310 allows the user to choose which rundown frame 2320 the user would like to view. For example, in one embodiment, the user may use the data/information picker to display the rundown frame 2320 from yesterday, today, or tomorrow or view a coming soon rundown frame or a featured segment rundown frame. Thus, the data/information picker 2310 allows the user to select a date or category for which the associated rundown frame 2320 may be displayed. The rundown frame 2320 is configured for displaying one or more show tiles and/or segment tiles configured to represent show episodes and associated segments corresponding to the user-selected rundown frame 2320, for instance. The E.C. viewer/portion 2700 comprises one or more E.C. tiles (e.g., represented via E.C. thumbnails) or E.C. minimized tiles 2720 (e.g., represented via E.C. thumbnails), each configured to represent an E.C. object. The ticker viewer/portion 2400 may be configured to display the various headlines or the like comprising the current ticker data/information and/or add other functionality to the user interface 2000 (e.g., of the user computing entity 30).

In various embodiments, the layout of the user interface 2000 (e.g., of the user computing entity 30) may be based on the user computing entity 30. The parameters of the display device associated with the user computing entity 30 may be particularly important in determining/identifying the appropriate layout of the user interface 2000 (e.g., of the user computing entity 30), for example. FIG. 17 provides an example of one way in which the layout of the user interface 2000 may depend on the parameters of the display device associated with the user computing entity 30. For example, the viewable region of the display device may be divided into columns. In the example shown in FIG. 17, each column may comprise 80 pixels. Thus, if the display device has a viewable region that is 1280 pixels wide, the viewable region may be divided into 16 columns, wherein each column is 80 pixels wide, as shown by 1702. Similarly, if the display device has a viewable region that is 960 pixels wide, the viewable region may be divided into 12 columns, wherein each column is 80 pixels wide, as shown by 1704. In various embodiments, the rundown viewer/portion 2300 is displayed in the 4 leftmost columns of the viewable region and the width of the video viewer/portion 2600 is determined/identified based on the number of columns remaining after the 4 left most columns are allocated to the rundown viewer/portion 2300.

FIGS. 18A and 18B offer another example of how the layout of the user interface may depend on the user computing entity 30. In the embodiments shown in FIGS. 18A and 18B, the user computing entity is a tablet that may be used in either a landscape or portrait orientation. Landscape user interface view 2010 shows how a user interface may be configured for a tablet in the landscape orientation. Portrait user interface view 2020 shows how a user interface may be configured for a tablet in the portrait orientation. The user interface views 2010 and 2020 both comprise the video viewer/portion 2600, rundown viewer/portion 2300, ticker viewer/portion 2400, and E.C. viewer/portion 2700. In the embodiments shown in FIGS. 18A and 18B, the E.C. viewer/portion 2700 comprises E.C. tiles, rather than the E.C. minimized tiles 2720 shown in FIG. 16. Similar to the user interface 2000 (e.g., of the user computing entity 30) shown in FIGS. 16 and 17, in the landscape user interface view 2010 the video viewer/portion 2600 is presented above the E.C. viewer/portion 2700 and to the right of the rundown viewer 2300. However, in the portrait user interface view 2020, the video viewer/portion 2600 is presented above both the E.C. viewer/portion 2700 and the rundown viewer 2300. In some embodiments, particularly where the viewable region of the display associated with the user computing entity 30 is small (e.g., when the user computing entity 30 is a smartphone, PDA, phablet, and/or the like), the user interface may not display the video viewer/portion 2600, the rundown viewer 2300, the ticker viewer/portion 2400, and the E.C. viewer/portion 2700 at the same time. For example, the video viewer/portion 2600 may take up the entire viewable region until input is received indicating the user would like to view the contents of the rundown viewer 2300 and/or the E.C. viewer/portion 2700. In another embodiment, the ticker viewer/portion 2400 may be shown with the video viewer/portion 2600, but the rundown viewer 2300 and E.C. viewer/portion 2700 are not viewable until input is received indicating the user would like to view the contents of the rundown viewer 2300 and/or the contents of the E.C. viewer/portion 2700. Such may be activated by touching the screen, mousing over an area, hovering over an area, selecting a configurable icon or button, and/or the like. In one embodiment, a user interface comprising the E.C. viewer/portion 2700 and/or the rundown viewer 2300 can be displayed on a user computing entity, such as a tablet, while the video is displayed via a television set attached to a set top box. As should be appreciated, a variety of layouts may be used to provide the user interface to the user via the user computing entity 30 and the layout may depend on the parameters of the user computing entity 30, the version of the client module 35, and/or the like to adapt to various needs and circumstances.

In some embodiments, the first time the user interface 2000 (e.g., of the user computing entity 30) is displayed and/or every time the user interface 2000 (e.g., of the user computing entity 30) is opened, a user may be asked to sign up, log in (or this may occur automatically), and/or otherwise authenticate his/her identity. For example, a user may be asked to enter a user account associated with his/her television provider to ensure that the user is subscribed to a television service that offers the enhanced news channel or the like. In various embodiments, a user may set up a user account that may be used to store user preferences and/or the like that may be used to control the user interface 2000 or other portions of the user's experience of the enhanced media presentation. In other embodiments, no user authentication is requested.

In various embodiments, user login may be required for accessing live segment. However, in such embodiments, a user may access various E.C. objects (e.g., E.C. objects for the top news stories), selected previously aired show segments, and/or the like without providing login information. For example, in one embodiment, a user operating a user computing entity 30 may login to access content via the CDN 10, but content available via the provider system 200 may be available regardless of whether the user logs in or not. It should be understood that, in various embodiments, logging in may have various effects on the user's experience of the user interface 2000 and, in one embodiment, the user interface 2000 does not provide a log in option.

In some embodiments, the first time the user interface 2000 (e.g., of the user computing entity 30) is displayed and/or every time the user interface 2000 (e.g., of the user computing entity 30) is opened, a dialog box or the like may be displayed. In various embodiments, the dialog box or the like may cause display of a message and one or more buttons that may be configured, when selected to facilitate closing the dialog box or the like and displaying an enhanced news show. In one embodiment, the message may state something along the lines of: "Congratulations! Thanks to [your TV provider], you can now experience the bigger picture with CNN's new extended live view." The message may be accompanied by a "Go Live" button, configured to, when selected by the user (e.g., operating a user computing entity 30), cause display of the live segment. In various embodiments, other messages may also be displayed the first time and/or every time the user interface 2000 is opened. However, as noted above, in some embodiments, such a message may not be displayed.

In one embodiment, when the user interface 2000 is opened, accessed, and/or similar words used herein interchangeably, the video stream or file (e.g., comprising video data) for the live segment will received from the CDN 10 and begin to buffer, and rundown data/information will be received from the interfacing module 250. When the video stream or file is appropriately buffered, the video may be displayed in the video display area 2610 (e.g., at least a portion of the video data/information may be displayed in the video display area 2610). The rundown frame 2320 of the rundown viewer/portion 2300 may then be populated with show tiles. Segment tiles may also be displayed in the rundown frame 2320 of the rundown viewer/portion 2300 as the segment data/information is received. The E.C. objects associated with the current segment may be identified based on the set of segment data/information associated with the current segment. Thus, the corresponding E.C. tiles 2710 and/or E.C. minimized tiles 2720 may be displayed in the E.C. viewer/portion 2700 when at least part of the set of segment data/information associated with live segment is received.

As noted above, in some embodiments, when the user interface 2000 is first opened, the live segment is displayed. When the user interface 2000 is displaying a live show episode, the live video stream (e.g., comprising video data) is received via the CDN 10. Additionally, the rundown data/information is received via the interfacing module 250. As described above, the rundown data/information comprises show and one or more sets of segment data/information each associated with a segment of one or more show episodes. Thus, the rundown data/information includes all the data/information needed to populate the rundown frame 2320 with the appropriate show and/or segment tiles. The set of segment data/information associated with each segment may further include a segment status. At any given time, at most one segment associated with the one or more show episodes may have the status of "current," "live," and/or the like, indicating that that video data/information associated with that segment is currently being broadcast live. Therefore, the client module 35 may use the segment status to determine/identify the live segment and the set of segment data/information associated therewith. Based on the set of segment data/information associated with the live segment, the client module 35 may determine/identify E.C. objects that are to be displayed in association with the live segment. For example, the set of segment data/information associated with the live segment may include an array of E.C. identifiers configured to determine/identify the E.C. objects associated with the live segment. Based on the E.C. identifiers and/or the identified E.C. objects, the appropriate E.C. tiles 2710 and/or minimized tiles 2720 may be displayed.

When the current segment is completed and a new segment becomes the live segment, the interfacing module 250 will push the updated segment statuses to the client module 35, and the CDN 10 will continue to transmit the live video data/information. The new live segment may be identified by the client module 35 via the segment status associated with the new live segment. The new live segment may be further associated with an array of E.C. identifiers configured to determine/identify the E.C. objects associated with the new live segment. The corresponding E.C. tiles 2710 or minimized tiles 2720 may then be displayed based on the E.C. identifiers associated with the new live segment.

As the video data/information for the live segment is being broadcast live, in some embodiments, the client module 35 may not coordinate the display of the video data/information and the identification of the live segment. For example, the live video stream received via the CDN 10 and the segment indicated as live via the rundown data/information received from the interfacing module 250 may be assumed to correspond. In other embodiments, the live video stream may contain a time marker or tag embedded in the video stream determining/identifying the associated segment via the segment title, segment identifier, and/or the like. In such embodiments, the time marker or tag may be used to determine/identify the live segment from the segments listed in the rundown data/information received via the interfacing module 250. In still other embodiments, the live segment is identified via the segment status information received via the interfacing module 250. The set of segment data/information associated with the live segment may include a UNIX timestamp of the start time of the segment, a segment identifier, and/or the like. In such embodiments, the video stream may be requested from the CDN 10 based on the timestamp, segment identifier, and/or the like associated with the live segment.

In various embodiments, if the user is watching programming on demand, rather than live programming, the user may select a segment. For example, the client module 35 may receive rundown data/information from the interfacing module 250 corresponding to the date or category selected via the data/information picker 2310. The rundown data/information may be used to populate the rundown frame 2320 with the appropriate show and/or segment tiles. The client module 35 may then receive input indicating the user has selected a segment tile. In another example, the client module 35 may receive input indicating the user has selected a show tile. If the user selects a show tile, the client module will continue as if the user had selected the first segment tile associated with the user-selected show episode. Based on the set of segment data/information associated with the user-selected segment, the client module 35 may request the associated video data/information from the CDN 10.

In some embodiments, the video data/information for an entire show episode may be contained within a single video stream or file which may be associated with and/or tagged with a show or show episode identifier. As noted above, the set of segment data/information may include a show or show episode identifier that may correspond to the show or show episode identifier associated with the corresponding video data/information. Thus, the show or show episode identifier may be used to request the video stream or file from the CDN 10. As discussed above, in various embodiments, the set of segment data/information may include a UNIX or other timestamp indicating the starting time of the segment. Based on the timestamp associated with the set of segment data/information, the client module 35 may be able to determine/identify the point in the video stream or file corresponding to the start of the user-selected segment. Thus, if the user-selected segment is associated with a timestamp indicating the segment starts 5 minutes and 30 seconds into the show episode, the client module 35 may determine/identify the point in the video stream or file that corresponds to 5 minutes and 30 seconds into the video stream or file as the beginning of the video data/information associated with the user-selected segment. In various embodiments, the video stream or file may contain one or more embedded time markers. The client module 35 may be configured to determine/identify the embedded time markers. In such embodiments, the client module 35 may use the time markers, possibly in addition to the timestamp associated with the set of segment data/information, to determine/identify the portion of the video stream or file corresponding to the user-selected segment and/or start thereof. For example, a time marker may be embedded at a point in the video stream or file corresponding to 5 minutes and 30 seconds into the show episode. If the user-selected segment is associated with a timestamp indicating the segment starts 5 minutes and 30 seconds into the show episode, the client module 35 may determine/identify the corresponding time marker as the beginning point of the video data/information associated with the user-selected segment. Thus, the time markers may indicate where in the video stream or file one segment ends and the next segment begins. The time marker may include information determining/identifying the segment that begins or ends at that time marker (e.g., via a segment identifier, segment title, or the like). Therefore, when displaying a video stream or file and a time marker indicating the end of the current segment and/or the beginning of the next segment is reached, the client module 35 may be configured to determine/identify the next segment based on information determining/identifying the next segment included in the embedded time marker. In another embodiment, the client module 35 may be configured to determine/identify the next segment based on the ordering of the segments within the rundown data/information received via the interfacing module 250. The time marker embedded in the video stream or file and/or the duration associated with the current segment may be used to determine/identify when the current segment ends and the next segment begins. After, the next segment has been identified, or perhaps in response thereto, the associated E.C. objects may be identified (e.g., via the E.C. identifiers associated with the set of segment data/information associated with the next segment). The corresponding E.C. tiles 2710 or minimized tiles 2720 may then be displayed.

In various embodiments, the video data/information associated with each segment is contained within a distinct video stream or file. Each video stream or file may be associated with and/or tagged with a segment identifier configured to determine/identify the segment with which the video data/information is associated. As noted above, the set of segment data/information may include a segment identifier. The segment identifier associated with the set of segment data/information may correspond to the segment identifier associated with the corresponding video stream or file. Thus, the video stream or file associated with the user-selected segment may be requested based on the segment identifier associated with the user-selected segment. The E.C. objects associated with the user-selected segment may be identified based on the set of segment data/information associated with the user-selected segment. For example, the set of segment data/information may include an array of E.C. identifiers, each determining/identifying an E.C. object associated with the segment. In various embodiments, when the video stream or file has finished playing, the client module 35 may request the video stream or file associated with the next segment based on the ordering of the segments within the rundown data/information received via the interfacing module 250. For example, the client module 35 may determine/identify the next segment based on the rundown data/information received via the interfacing module 250. The client module 35 may then determine/identify the video identifier associated with the next segment. The video stream or file may then be requested from the CDN 10 using the segment identifier. The E.C. objects associated with the next segment may also be identified based on the set of segment data/information associated with the next segment.

In various embodiments, video data/information associated with a show episode and/or segment may be provided via the CDN 10. The rundown data/information and/or E.C. objects associated with the show episode and/or segment may be provided via the interfacing module 250 such that the data/information provided by the interfacing module 250 is synchronized with video data/information being provided via the CDN 10. For example, automatic content recognition (ACR) and/or the like may be used to synchronize the video data/information received via the CDN 10 and the data/information received via the interfacing module 250. This method of experiencing an enhanced media presentation (e.g., enhanced news shown) may be particularly relevant for embodiments where the rundown data/information and/or E.C. objects are offered as a companion experience to a traditional television show aired via a linear broadcast. In such embodiments, a user may not need to log in and/or have his/her identity authenticated in order to access the rundown data/information and/or E.C. objects.

The client module 35 may be configured to provide functionality to the user interface 2000 (e.g., of the user computing entity 30). The functionality of the user interface 2000 (e.g., of the user computing entity 30) will be discussed below with regard to the client module 35.

Client Module 35

In various embodiments, the client module 35 may be configured to run on the user computing entity 30 to provide the user with a user interface 2000. In another embodiment, the client module 35 may be configured to run on the provider system 200 or an associated computing device and to provide the user with a user interface 2000 via the user computing entity 30. As noted above, the user interface 2000 may be configured to allow the user to experience and/or interact with one or more enhanced media presentations (e.g., enhanced news shows).

Together FIGS. 19, 20, 22, 23, 25, 29, 31, 35, and 37 show procedures and operations that may be performed by the client module 35 in order to provide a user with an enhanced media presentation, such as an enhanced news show. At step 1802, shown in FIG. 19, the client module 35 establishes a connection between the user computing entity 30 and the provider system 200. For example, the user computing entity 30 may connect to the provider system 200 via a socket host connection. The connection between the user computing entity 30 and provider system 200 may occur over a wired or wireless network 50. In one embodiment, the connection between the user computing entity 30 and the provider system 200 may occur via the Internet, for instance.

At step 1804, the client module 35 can receive rundown data/information and/or ticker data/information from the interfacing module 250. At step 1806, the client module 35 can receive streaming video or a video file (e.g., comprising video data) via the CDN 10. As noted above, the video stream or file may be received via broadcast or over-the-air methods, via a cable provider network, via a satellite television provider network, via an IP-based distribution network, and/or the like. In various embodiments, the client module 35 may request a particular video stream or file or a particular portion of a video stream based on at least a portion of the received rundown data/information. In some embodiments, the client module 35 may receive a live video stream by default unless a particular video stream or file is requested by the client module 35.

At step 1808, the rundown data/information, video stream or file, and ticker data/information are displayed to the user. As noted above, the rundown data/information may comprise show and one or more sets of segment data/information. The show and segment data/information may comprise data/information used to populate the rundown frame 2320 of the user interface 2000 (e.g., of the user computing entity 30) with show and/or segment tiles representing the show episodes and associated segments for the date or category selected via the data/information selector 2310. Each set of segment data/information may further comprise an array of E.C. identifiers that may be used to populate the E.C. viewer/portion 2700 of the user interface 2000 (e.g., of the user computing entity 30). For example, the E.C. identifiers may be used to determine/identify and/or generate one or more E.C. tiles or minimized tiles, each associated with an E.C. object associated with one of the E.C. identifiers. The ticker data/information may be used to populate the ticker viewer/portion 2400 of the user interface 2000 (e.g., of the user computing entity 30). For example, the ticker viewer/portion 2400 may display a set of streaming headlines. The video stream or file may be used to populate the video portion 2610 of the video viewer/portion 2600 of the user interface 2000 (e.g., of the user computing entity 30). In one embodiment, the client module 35 may be configured to receive the rundown data/information, the video stream or file, and ticker data/information in order to optimize the loading of the data/information and/or to minimize video lag times.

Figure 21A:
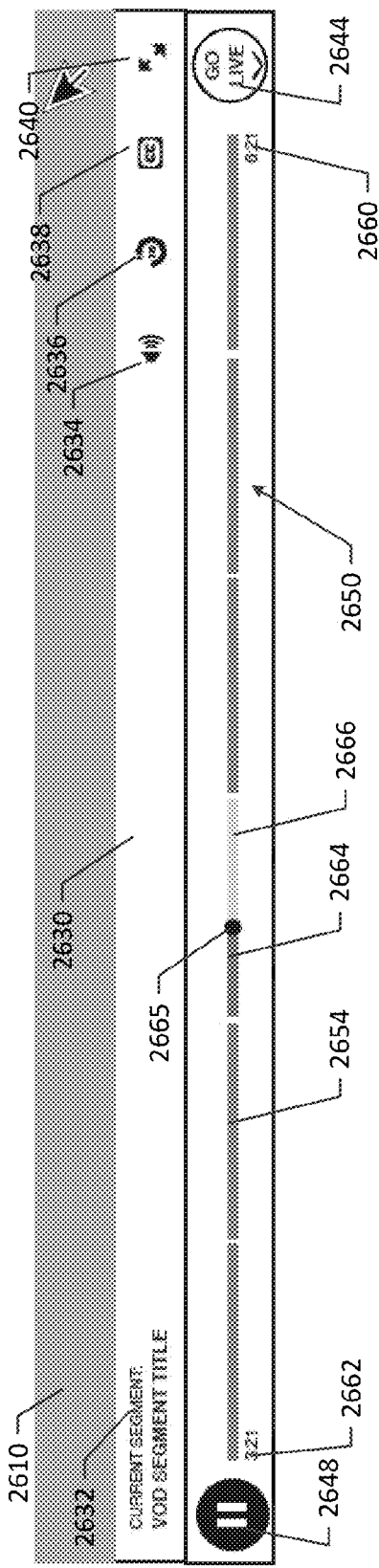
Figure 21B:
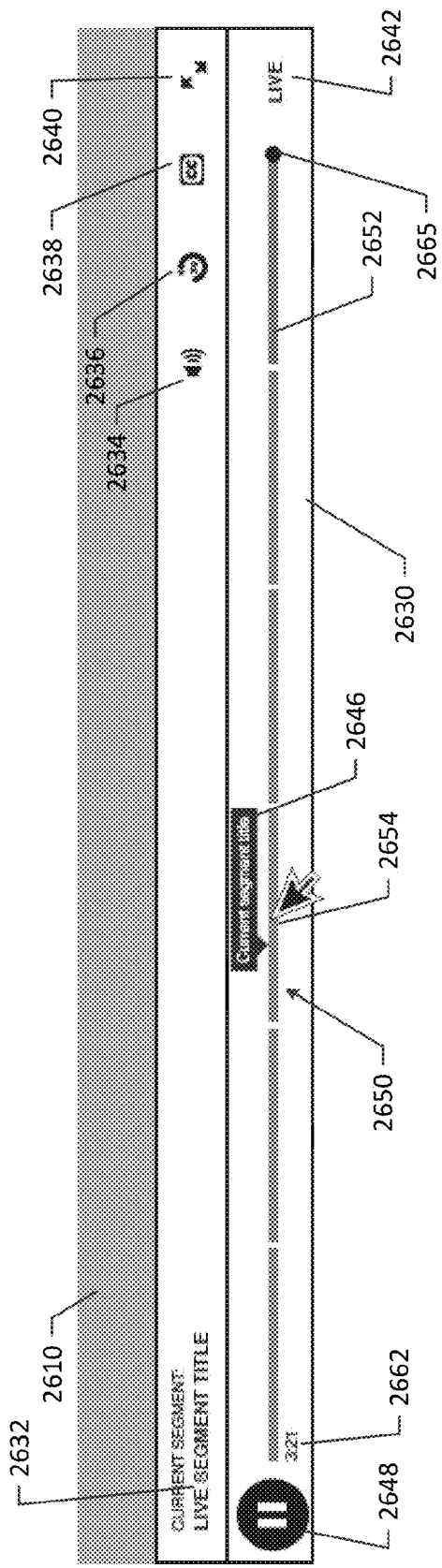
Figure 23:
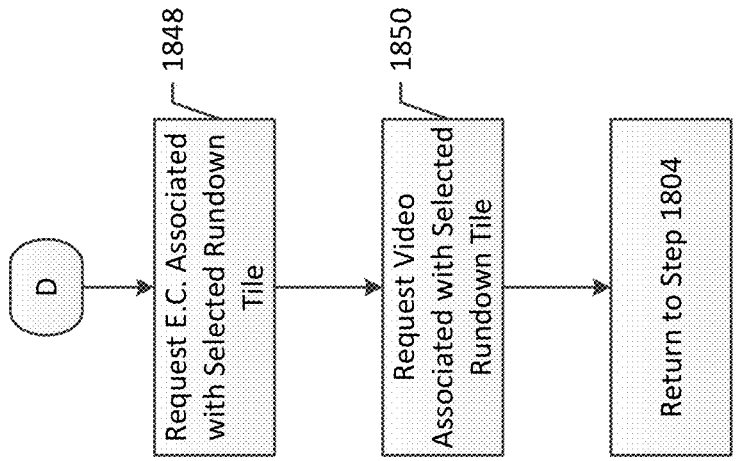
Figure 22:
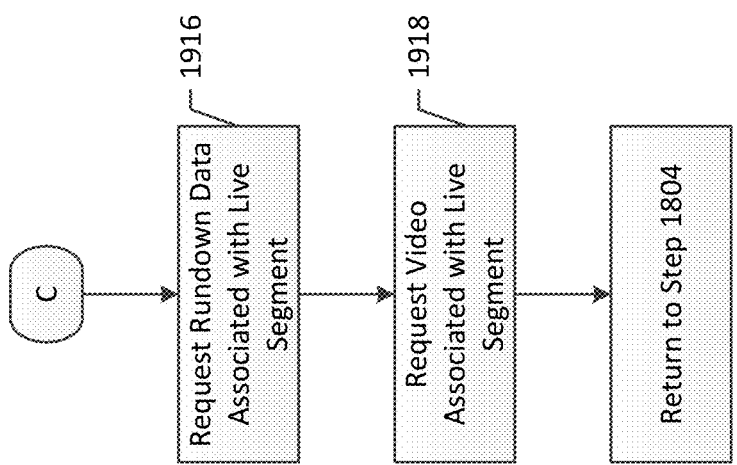

At step 1810, the client module 35 may determine/identify if video control input has been received. If video control input has not been received, the client module 35 continues to step 1812. If video control input has been received, client module 35 continues to step 1828, shown in FIG. 20. For example, a user may move a mouse to the video control area 2630 of the user interface 2000 (e.g., of the user computing entity 30) or otherwise provide input to control the video displayed in the video viewing portion 2610. In one embodiment, the video control area 2630 may be hidden input is received indicating the user would like to access the video controls. For example, the user may move the mouse to the bottom of the video viewer/portion 2600 or the like. FIGS. 21A and 21B illustrate examples of the video control area 2630 for both a segment or show episode being watched as on demand programming and being watched live.

FIG. 21A illustrates the video controls that may be available when a user is watching a segment as on demand programming, and FIG. 21B illustrates the video controls that may be available when a user is watching a live segment, according to one embodiment. As shown in FIG. 21A, the video control area 2630 may comprise a "Go Live" button 2644, a segment title 2632, a volume control button 2634, a 30 second rewind button 2636, a closed captioning button 2638, a full screen button 2640, a pause/play button 2648, a current timestamp 2662, a segment length timestamp 2660, a segment timeline 2650 comprising one or more segment bars 2654, a current segment bar 2664, current location indicator 2665, and an unwatched portion 2666 of the current segment bar 2664. The "Go Live" button 2644 is configured such that if the user provides input selecting the "Go Live" button 2644, the client module 35 will display the segment currently being aired live. If no segment is currently being aired live (e.g., no live show is currently being broadcasted or the like), the "Go Live" button 2644 may not be displayed or may be dimmed out, indicating the "Go Live" button 2644 is not functional at that moment. The segment title 2632 displays the title of the segment as defined in the set of segment data/information and/or other information related to the currently displayed segment. The volume control button 2634 may be configured to allow a user to control the volume of audio associated with the video stream. For example, when input selecting the volume control button 2634 is received, a slider may be displayed allowing the user to provide input indicating the desired volume level. The 30 second rewind button 2636 may be configured such that when input is received indicating the user has selected the 30 second rewind button 2636, the last 30 seconds of the video stream displayed in the video portion 2610 is replayed. The closed captioning button 2638 may provide the user with a mechanism to provide input indicating the user would like closed captioning for the audio associated with the video stream to be displayed with the video stream in the video portion 2610 or that the user would like to turn off the closed captioning for the video stream such that the closed captioning is not displayed with the video stream. If user input selecting the full screen button 2640 is received, the video viewing portion 2610 may be expanded to fill the entire screen, window, and/or display region of the display device associated with the user computing entity 30. The pause/play button 2648 may be configured to, when selected by a user, cause the video stream displayed in the video viewing portion 2610 to be paused or to continue playing, as appropriate. The current timestamp 2662 may indicate the position within the segment of the video data/information currently being displayed in the video portion 2610. For example, in FIG. 21A, the video data/information currently being displayed is 3 minutes and 21 seconds into the current segment. The segment length timestamp 2660 displays how long the current segment is. For example, in FIG. 21A, the current segment is 6 minutes and 21 seconds long. The segment timeline 2650 provides a visual representation of the segments within a show episode and comprises a segment bar 2654 for each segment within the current show episode. For example, in FIG. 21A, the current show episode may comprise six segments. In one embodiment, the relative length of each segment bar 2654 may indicate the relative lengths of the segments. For example, a segment bar 2654 representing a segment that is 3 minutes long may be half the length of a segment bar representing a segment that is 6 minutes long, and/or the like. In another embodiment, each segment bar 2654 may be approximately the same length regardless of the relative lengths of the segments represented by the segment bars. Current segment bar 2664 is a segment bar representing the current segment being displayed via the video portion 2610. The current location indicator 2665 visually indicates the location within the current segment bar 2664 that represents the position within the current segment corresponding to the video data/information currently being displayed. The current segment bar 2664 may further comprise an unwatched portion 2666 located to the right of the current location indicator 2665 that may be indicated by a different line color, line texture, and/or the like. The unwatched portion 2666 may represent the portion of the current segment that remains to be watched or that exists beyond the current position within the segment. In various embodiments, a user may provide input by selecting a point on the segment timeline 2650 to change the video data/information displayed in the video display portion 2610 to the moment indicated by the selected point on the segment timeline 2650.

As shown in FIG. 21B, when watching a live segment, the video control area 2630 may comprise many of the same features as when displaying a programming on demand segment. For example, as shown in FIG. 21B, the video control area 2630 for a live segment may comprise the volume control button 2634, the 30 second rewind button 2636, the closed captioning button 2638, the full screen button 2640, the pause/play button 2648, the current timestamp 2662, and the segment timeline 2650 comprising one or more segment bars 2654 and the current position indicator 2655. Additionally, when displaying a live segment, the visible control area 2630 may comprise a live indicator 2642 in place of the "Go Live" button 2644 and a live segment bar 2652 in place of the current segment bar 2664. A live segment bar 2652 is similar to a current segment bar except that the live segment bar 2652 does not comprise an unwatched portion 2666. Because the segment is live, the duration of the segment is currently unknown and the unwatched portion has not yet been aired. As noted above, a user may provide input by selecting a point on the segment timeline 2650 to move the video data/information displayed in the video display portion 2610 to the moment indicated by the selected point on the segment timeline 2650. By not showing the unwatched portion of the live segment 2652, the user is unable to select a moment in the show that has not yet been aired and may not have been filmed yet. As shown in FIG. 21B, in the illustrated embodiment, if a user moves the mouse or remote control, for example, to hover over a segment bar 2654, the title of the segment 2646 may be displayed. In embodiments that include such a feature, the feature may be available for live and programming on demand show episodes. As should be understood from the above, a variety of video controls may be incorporated into the video control area 2630 and/or the video viewer/portion 2600.

Returning to FIG. 20, at step 1830 the client module 35 determines if volume input has been received. If volume input has been received (e.g., via the volume control button 2634), the volume is adjusted accordingly at step 1832 and the client module returns to step 1804. If volume input has not been received, the control module 35 continues to step 1834.

At step 1834, the client module 35 determines if input pausing the video has been received (e.g., via the pause/play button 2648). If pause input has been received, the client module 35 may pause the video at step 1836. The client module 35 may then continue to pause the video until at step 1838 it is determined/identified that play input has been received. After play input is received, or possibly in response thereto, the client module 35 may continue playing the video from that point at which the video was paused and return to step 1804. If, at step 1834, the client module 35 determines that pause input has not been received, the client module 35 continues to step 1840.

At step 1840, the client module 35 determines if scrub input has been received. As noted above, a user may provide input by selecting a point along the segment timeline 2650 to display the video corresponding to the selected point on the segment timeline 2650. The user may also drag the current location indicator 2655 along the segment timeline 2650 to select a point on the segment timeline 2650. If it is determined/identified at step 1840 that such input has been received, the playback position is adjusted accordingly at step 1842, and the client module 35 returns to step 1804. If it is determined/identified that scrub input has not been received, the client module 1840 continues to step 1844.

At step 1844, the client module 35 determines if input selecting the 30 second rewind button has been received. If input selecting the 30 second rewind button has been received, the playback position of the video is adjusted backward by 30 seconds at step 1846. The client module 35 may then return to step 1804. As should be understood, several other inputs may be received via the video controls displayed in the video control area 2630 and the client module 35 may be configured to receive various other inputs and respond accordingly. For example, the client module 35 may be configured to turn closed captioning on and/or off in response to a user providing input selecting the closed captioning button 2638 and/or the like. The client module 35 may then return to step 1804 or some other appropriate point.

Returning to FIG. 19, if the client module 35 determines that video control input was not received at step 1810, the client module 35 continues to step 1812. At step 1812, the client module 35 determines if input indicating the "Go Live" button 2644 or the like was selected indicating the user would like the live segment to be displayed. If it is determined/identified that go live input was received, the client module 35 continues to step 1916 shown in FIG. 22. At step 1916, the client module 35 requests the rundown data/information associated with the live segment from the interfacing module 250. The client module may then request or access the video stream associated with the live segment via the CDN 10 at step 1918. The client module 35 may then return to step 1804 to receive the rundown data/information from the interfacing module 250 and then continue to step 1806 to receive the video stream from the CDN 10.

Figure 19:
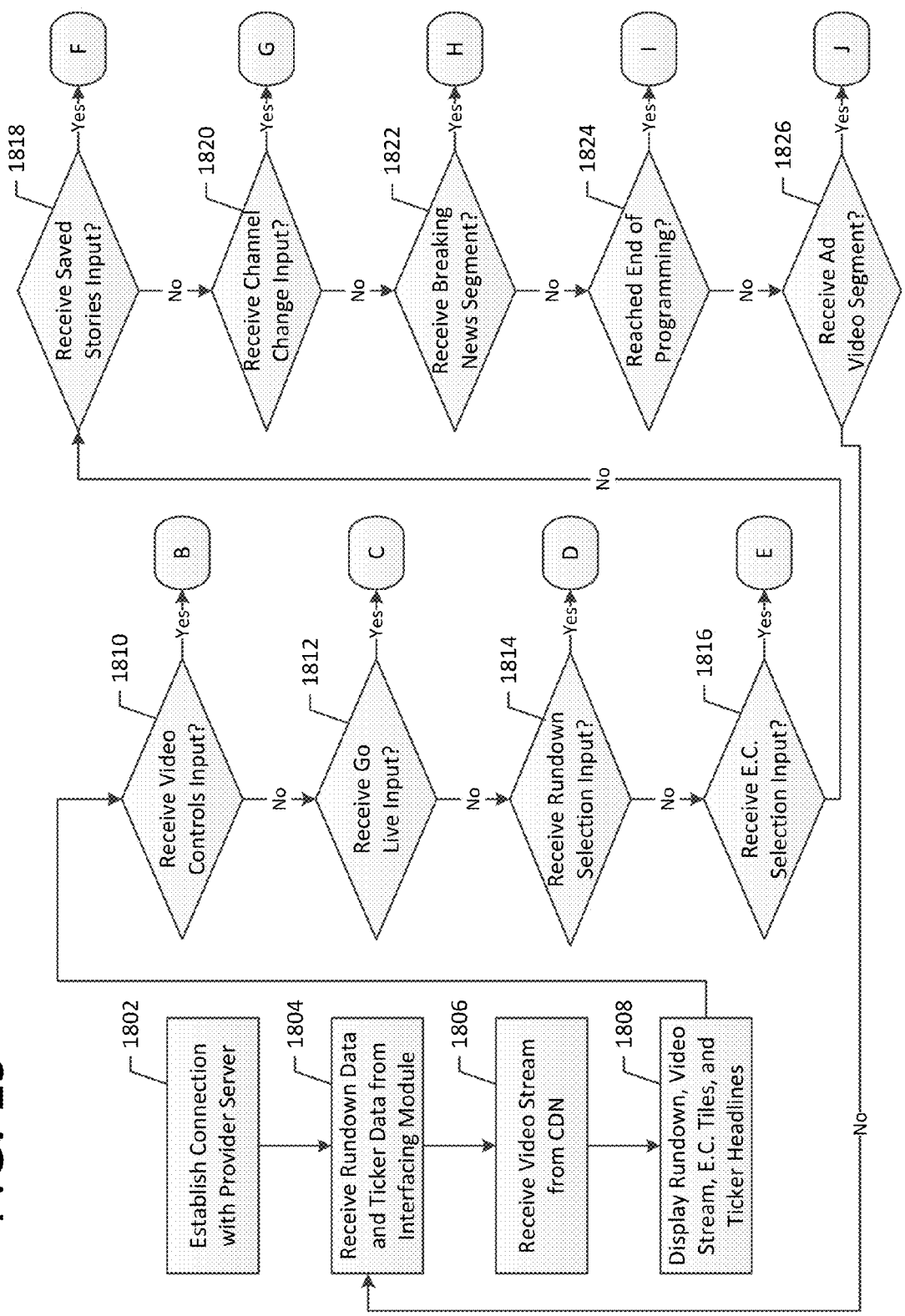

As shown in FIG. 19, if it is determined/identified that go live input was not received, the client module 35 may continue to step 1814 to determine/identify if rundown selection input has been received. If it is determined/identified that rundown selection input has been received, the client module 35 continues to step 1848 shown in FIG. 23. In various embodiments, rundown selection input may comprise a user providing input by selecting a rundown tile button, field, icon, image, indicator, control, function, and/or similar words used herein interchangeably (e.g., a show or segment tile) from the rundown frame 2320.

Figure 24:
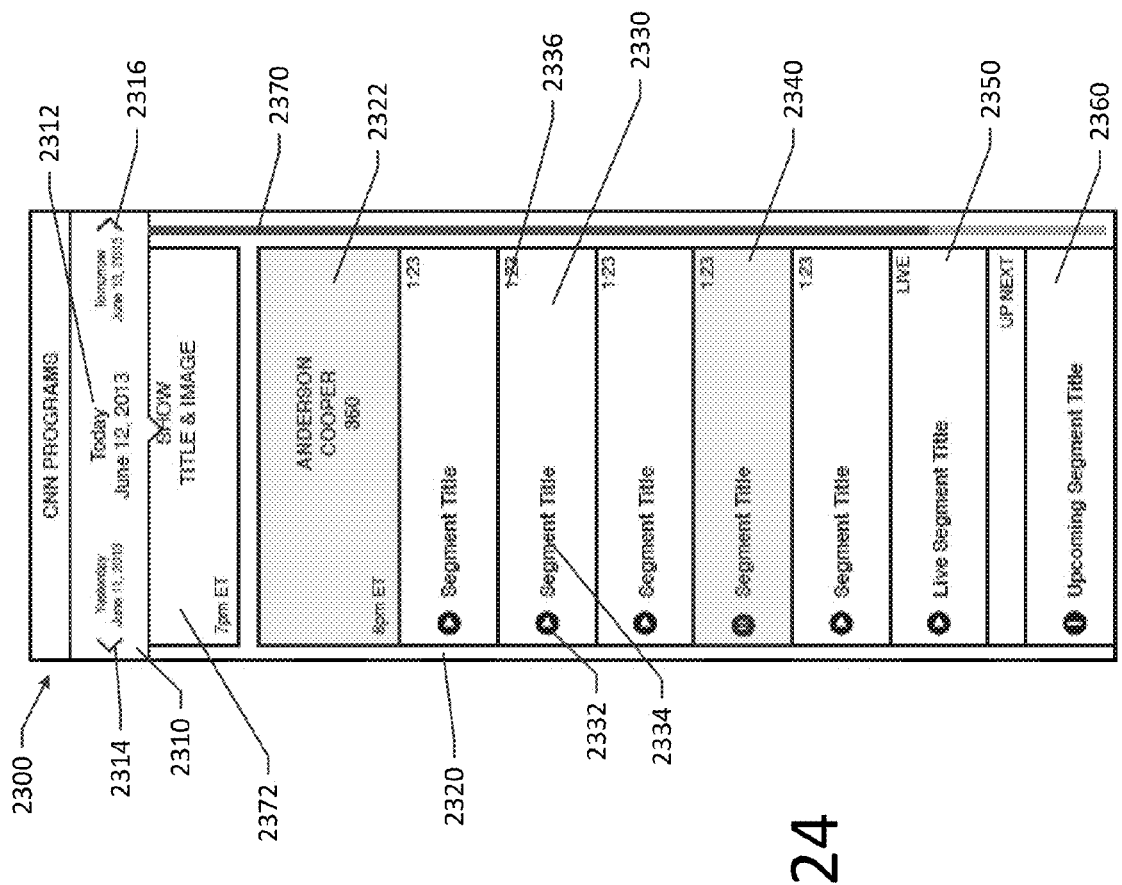
Figure 25:
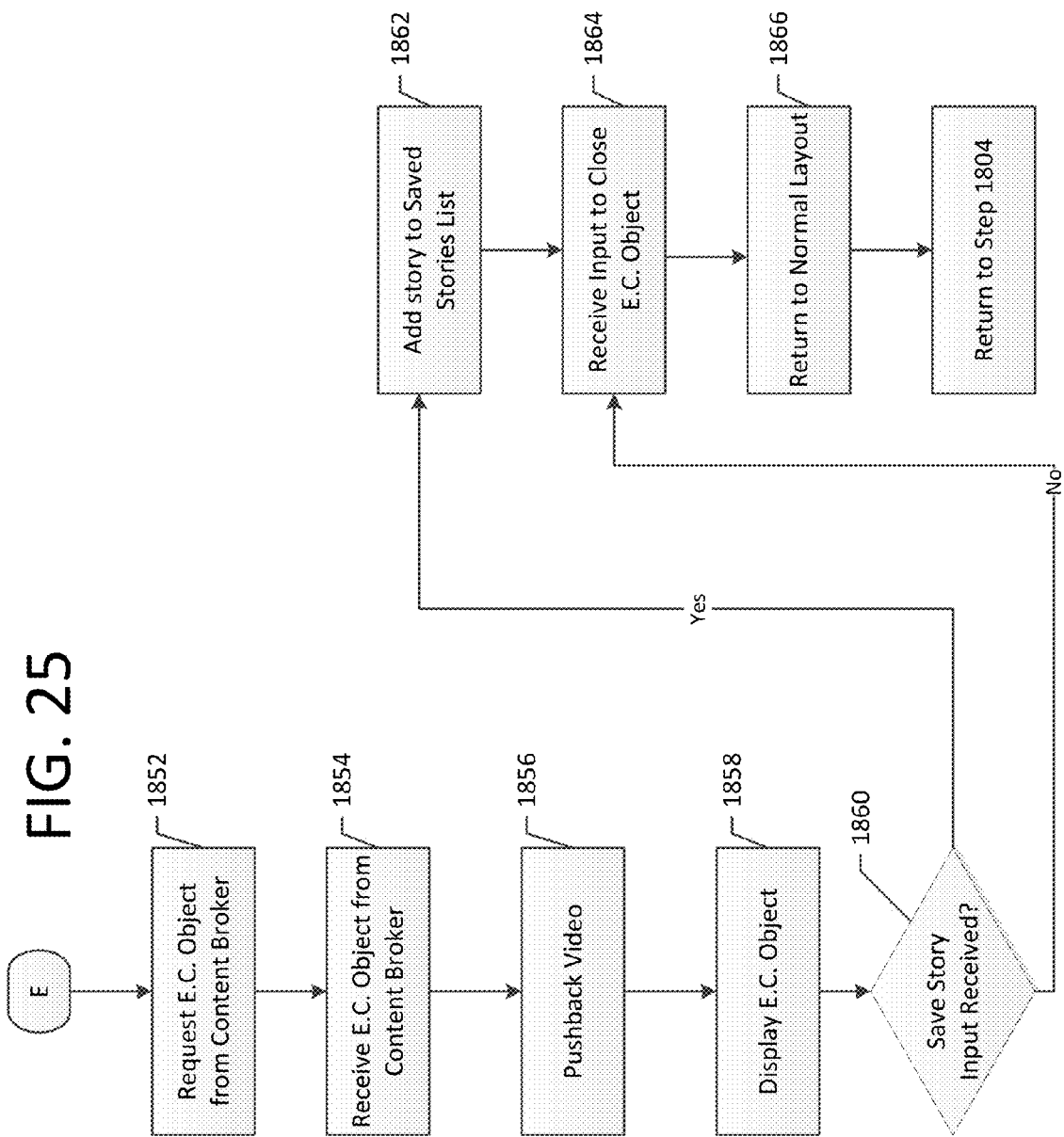

FIG. 24 illustrates a rundown viewer/portion 2300 in one embodiment. As noted above, the rundown viewer/portion 2300 comprises the data/information picker 2310 and a rundown frame 2320. The data/information picker 2310 allows a user to select the date or category for which the rundown tiles displayed in the rundown frame 2320 correspond. For example, a user may select to view a rundown corresponding to shows that were aired on a previous day (e.g., yesterday), have been or will be aired today, or will be aired tomorrow. In some embodiments, a user may also select to view a rundown corresponding to show episodes that will be aired at some point in the future and/or featured shows and/or segments that have already been aired. The data/information picker 2310 may provide a variety of other dates and/or categories a user may select from. The rundown tiles 2330 displayed in the rundown frame 2320 correspond to the date or show category selected via the data/information selector 2310. The data/information picker 2310 may display the current date or category 2312, and the dates or categories available to the left or right of the current date or category 2312, which are available via left selector button 2314 and/or right selector button 2316.

The rundown frame 2320 may be populated with one or more show tiles, such as previous show tile 2372 and current show tile 2322. Each show tile may comprise an image representing the show or the particular show episode, a title associated with the show and/or show episode, an airing time for the show episode, and/or the like. In one embodiment, the show tiles displayed correspond to shows for which a show episode is airing or was aired on the date or in the category selected via the data/information picker 2310. In one embodiment, the show tile 2322 may be displayed in the E.C. viewer/portion 2700, rather than in the rundown frame 2320. The rundown frame 2320 may also be populated by one or more segment tiles 2330. Each segment tile may comprise a segment title 2334, a segment length 2336, and a segment pause/play button 2332. The segment currently being displayed may be highlighted, such as with current segment 2340. For a segment that is live, the live segment tile 2350 may indicate that the segment is live in place of indicating the length of the segment. For a segment that has not been aired yet, the corresponding segment tile, such as upcoming segment tile 2360 may indicate that the segment is coming up and the segment pause/play button may be dimmed out or may otherwise indicate that the segment cannot be played at this time.

Returning to FIG. 23, rundown selection input may be received via a user selecting a date or category via the data/information selector 2310 and/or selecting a show tile 2322 or segment tile 2330. If a date or category is selected via the data/information selector 2310, the client module 35 may retrieve the appropriate rundown data/information from memory and/or interfacing module 250 to populate the rundown. For example, if a user selects yesterday via the data/information picker 2310, the rundown may be populated by show tiles for all or some of the show episodes aired yesterday. Input may be received indicating user selection of a particular show tile 2322. The client module 35 may then retrieve the sets of segment data/information corresponding to the segments of the selected show episode that aired yesterday and display the appropriate segment tiles 2330. Input may then be received indicating user selection of a segment tile 2330. At step 1848, the client module 35 may request the E.C. data/information associated with the E.C. objects identified by the E.C. identifier array associated with the set of segment data/information of the user-selected segment. In some embodiments, the client module 35 and/or interfacing module 250 may filter types of E.C. objects that are not supported by the user computing entity 30 or client module 35. In one embodiment, the client module 35 and/or the interfacing module 250 may filter E.C. objects based on viewer preferences, parental controls, and/or the like. At step 1850 the client module 1850 may request or access the video stream associated with the selected segment tile via CDN 10. In various embodiments, the video stream may be requested or accessed based on a timestamp, segment identifier, and/or the like associated with the user-selected segment. In one embodiment, the live video stream may be received via CDN 10 while the programming on demand video data/information may be received via a wired or wireless network 50. If the video stream or file is being received via IP-based video distribution, the quality of the video may be adjusted to minimize video lag time. The client module 35 may then return to step 1804 to receive the requested rundown data/information (e.g., E.C. data).

As shown in FIG. 19, if rundown selection input is not received at step 1814, the client module 35 continues to step 1816. At step 1816, the client module 35 determines if E.C. selection input has been received. If it is determined/identified that E.C. selection input has been received, the client module 35 continues to step 1852 shown in FIG. 25.

Figure 26:
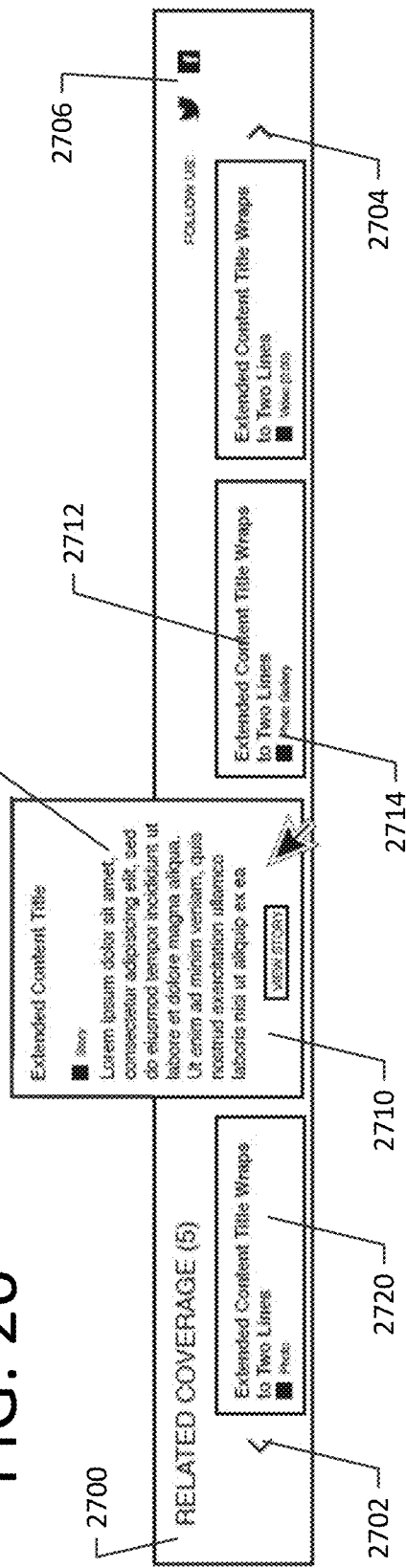

FIG. 26 illustrates how, in one embodiment, input selecting an E.C. object may be received. FIG. 26 shows an example E.C. viewer/portion 2700. The E.C. viewer/portion 2700 is populated by one or more minimized E.C. tiles 2720, forward and backward scroll controls 2702 and 2704, and social media buttons 2706. Each minimized E.C. tile 2720 may comprise an E.C. object title 2712 and an E.C. object type indicator 2714. The E.C. object title 2712 is the title associated with the E.C. data/information associated with the E.C. object. The E.C. object type indicator 2714 indicates the type of E.C. object is represented by the E.C. tile 2710 or minimized E.C. tile 2720. The minimized E.C. tiles 2720 displayed in the E.C. viewer/portion 2700 may correspond to the E.C. identifiers stored in association with the set of segment data/information for the current segment. In one embodiment, if a user mouses over a minimized E.C. tile 2720, an E.C. tile 2710 may be displayed. In other embodiments, another form of input indicating a user would like to view the E.C. tile 2710 associated with a particular E.C. minimized tile may be received. In still other embodiments, such as the embodiment shown in FIG. 18A, E.C. tiles 2710 may be displayed by the E.C. viewer/portion 2700 at all times, rather than minimized E.C. tiles 2720. An E.C. tile 2710 may comprise an E.C. object title 2712, an E.C. object type indicator 2714, and an E.C. thumbnail 2716. The E.C. thumbnail may be configured to provide a preview of the content of the E.C. object represented by the E.C. tile 2710. In various embodiments, the forward and backward scroll controls 2702 and 2704 may be configured to allow a user to scroll through additional E.C. tiles 2710 or minimized E.C. tiles 2720. For example, a segment may be associated with eight E.C. objects. However, in the embodiment shown in FIG. 26, only four minimized E.C. tiles 2710 are displayed at one time. Therefore, the forward and backward scroll controls 2702 and 2704 may be used to view the other four minimized E.C. tiles 2710 that are not currently displayed. The social media buttons 2706 may be configured to allow a user to share a segment via a social media network (e.g., twitter, Facebook, and/or the like) or for a user to follow a particular show or show personality on a social media network or the like. In various embodiments, receiving E.C. selection input may comprise a receiving input indicating a user selection of an E.C. tile 2710 or minimized E.C. tile 2720.

FIG. 27 illustrates E.C. tiles 2710 for a variety of different E.C. object types. For example, E.C. tile 2721 corresponds to an E.C. object with an E.C. object type indicator 2714 of "photo." Thus, the E.C. thumbnail 2716 associated with the E.C. tile 2721 may be a thumbnail image of the photo that comprises the E.C. object. The E.C. object may further comprise a caption and/or other information or resources related to the photo. E.C. tile 2722 corresponds to an E.C. object with an E.C. object type indicator 2714 of "story." Thus, the E.C. thumbnail 2716 associated with the E.C. tile 2722 may show the first sentence or first few sentences or a brief summary of the story or article comprising the associated E.C. object. E.C. tile 2723 corresponds to an E.C. object with an E.C. object type indicator 2714 of "photo gallery." Thus, the associated E.C. object may comprise a plurality of photos, their corresponding captions, and/or the like. The thumbnail 2716 shown as part of E.C. tile 2723 may cause display of a small version of one or more photos from the associated photo gallery. E.C. tile 2724 corresponds to an E.C. object with an E.C. object type indicator 2714 of "video." The E.C. tile 2724 may cause display of the length of the video on the E.C. tile. The thumbnail 2716 for E.C. tile 2724 may show a thumbnail version of the video preview image associated with the video comprising the E.C. object. In various embodiments, the E.C. object represented by E.C. tile 2724 may further comprise a caption and/or other information related to the video. E.C. tile 2725 corresponds to an E.C. object with an E.C. object type indicator 2714 of "biography." Thus, the E.C. object corresponding to the E.C. tile 2725 may comprise information, one or more images, and/or one or more infographics related to a guest on an episode of a show, a person or group of people who may be discussed on the associated show episode of the show, and/or other person, place or thing related to the associated segment of the show episode. E.C. tile 2725 comprises a thumbnail 2716 corresponding to a screen shot or other preview version of the associated E.C. object. E.C. tile 2727 corresponds to an E.C. object associated with an E.C. object type indicator 2714 of "video gallery." Thus, the corresponding E.C. object is a collection of two or more videos and may further comprise associated captions and/or other information. Similar to the thumbnail 2716 of E.C. tile 2723, the thumbnail for E.C. tile 2727 may display a small version of one or more video preview images from the associated video gallery. E.C. tile 2728 corresponds to an E.C. object with an E.C. object type indicator of "iReport: Video." In the illustrated embodiment, the length of the corresponding video is also displayed on the E.C. tile 2728. The thumbnail 2716 comprising E.C. tile 2728 is a thumbnail sized video preview image corresponding to the video of the E.C. object. The E.C. tile 2729 corresponds to an E.C. object associated with an E.C. object type indicator 2714 of "map." The E.C. object may comprise a map, an interactive map, a map related infographic, and/or related information and/or captions. The thumbnail 2716 associated with E.C. tile 2729 may be a thumbnail image of the corresponding map. E.C. tile 2730 is an example of a social media content E.C. object. Particularly, the E.C. tile 2730 displays a tweet that may correspond to the current segment. E.C. tile 2730 also provides controls for a user to retweet, reply to, and/or favorite the tweet and/or to follow the account to which the tweet was posted (a variety of other social media types may also be used). In various embodiments, controls may be provided for completing one or more of various social media content related actions. E.C. tile 2731 is an example of a social media follow E.C. object. Particularly, the E.C. tile 2731 provides an invitation for a user to follow a particular social media account and a mechanism by which input may be received indicating that the user would like to follow the indicated social media account. In various embodiments, the social media account associated with the social media follow E.C. object 2731 is related to the current segment. Thus, a wide variety of E.C. objects may be associated with a given segment.

Figure 28:
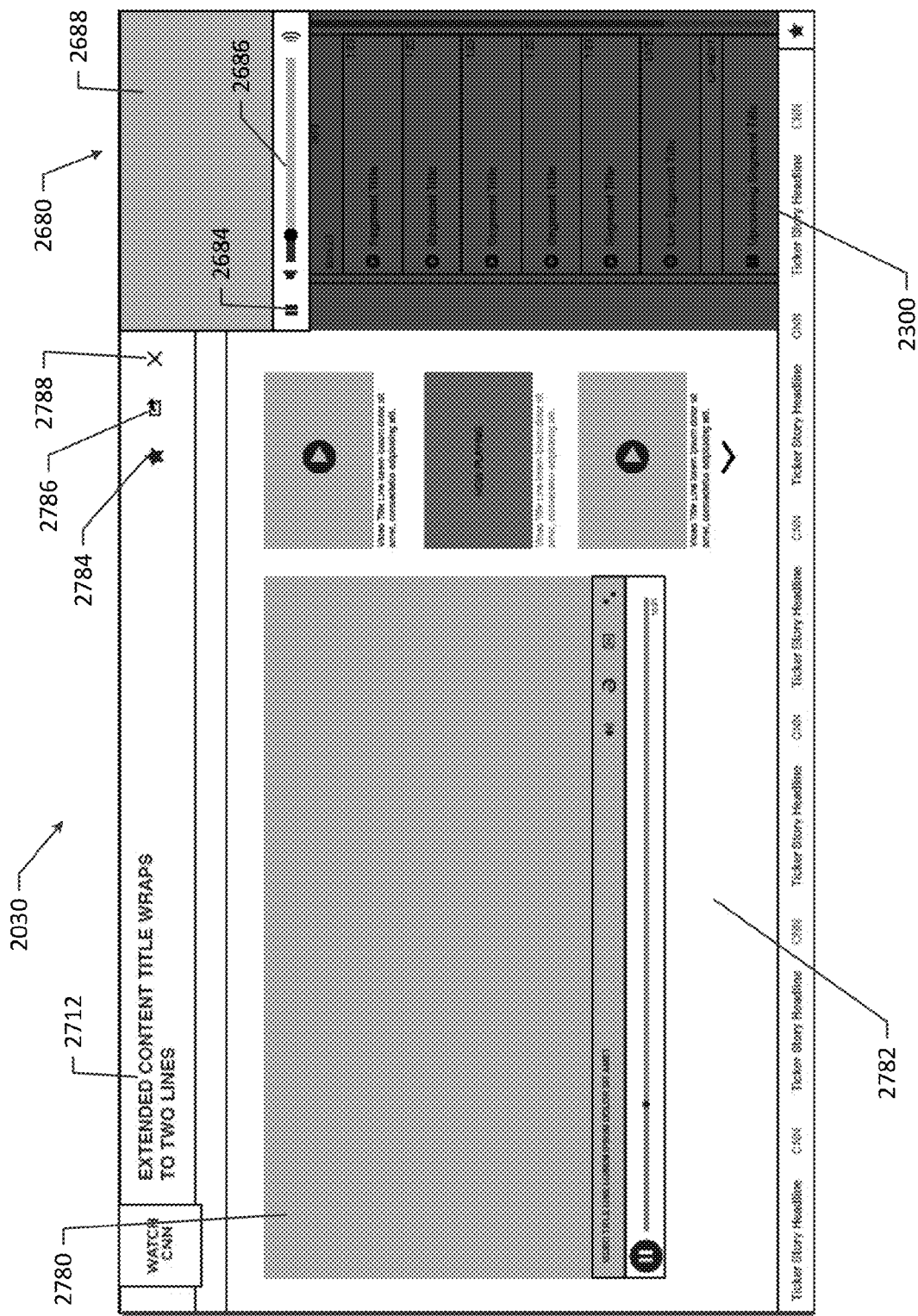
Figure 29:
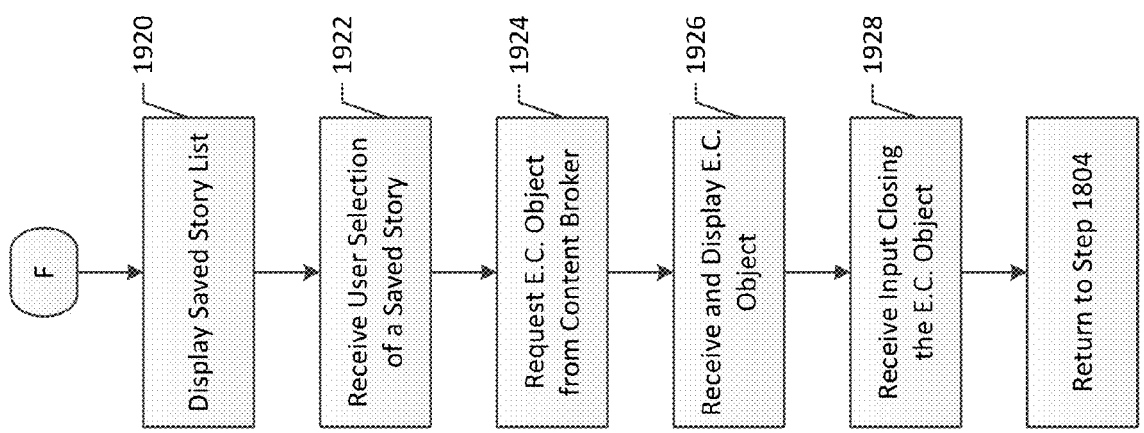

Returning to FIG. 25, at step 1852, the client module 35 requests the user-selected E.C. object from the content broker 270. At step 1854, the E.C. object is received from the content broker 270. In various embodiments, the received E.C. object can be normalized (e.g., formatted for optimal viewing on the particular user computing entity 30, formatted to fit a particular template associated with the E.C. object type indicator 2714, and/or the like). At step 1856, the video data/information displayed in the video viewing portion 2610 of the video viewer/portion 2600 is moved to a pushed back video viewer 2680, as shown in FIG. 28. At step 1858, the E.C. object is displayed.

FIG. 28 illustrates an E.C. object view 2030 of the user interface 2000, according to one embodiment. In the E.C. object view 2030, the video viewer/portion 2600 is pushed back to the pushed back video viewer/portion 2680, the rundown viewer/portion 2300 is greyed out, and the main portion of the display device associated with the user computing entity 30 displays the user-selected E.C. object 2780 in an E.C. object viewer/portion 2782. Pushed back video viewer/portion 2680 comprises pushed back video portion 2688 for displaying the video associated with the current segment, play/pause button 2684 configured for receiving user input indicating the user would like to pause or play the video associated with the current segment, and volume control 2686 configured to receive user input indicating the user would like to adjust the volume of the video associated with current segment. In various embodiments, the video associated with current segment will continue to play when the video is pushed back. In one embodiment, if the E.C. object comprises one or more videos, the video associated with the current segment may be paused when the video is pushed back. In the embodiment shown in FIG. 28, the pushed back video viewer 2680 covers part of the rundown viewer 2300. The remainder of the rundown viewer 2300 has been dimmed out or greyed out, indicating that the rundown is currently disabled. The remainder of the display associated with the user computing entity 30 displays the E.C. object 2780. Thus, a user may read an article associated with a live television show while watching the live television show, pause the live television show to watch a video associated with the live television show. Via social media E.C. objects, a user may also be able to comment on, blog, and/or vlog (video blog) about a live television show while watching or pausing the live television show. In various embodiments, a user may be able to provide comments associated with an E.C. object (e.g., a user may provide input via a user computing entity 30 that is then provided with to the provider system 200 and stored in association with the E.C. object) and/or view comments associated with the E.C. object provided by other users.

In the illustrated embodiment, the E.C. object title 2712 is displayed, and a save story button 2784, share story button 2786, and close E.C. object button 2788 are provided. The save story button 2784 may be configured to receive input indicating the user would like to save the E.C. object 2780 to the saved story list, which is described below. The share story button 2786 is configured for receiving input indicating the user would like to share the E.C. object 2780 via email and/or social media. The close E.C. object button 2788 may be configured to receive input indicating the user would like to close the E.C. object 2780 and return to the default layout view of the user interface 2000, wherein the default layout view may depend on the user computing entity 30. At step 1860, shown in FIG. 25, it is determined/identified if input indicating the E.C. object 2780 should be saved to the saved story list has been received. For example, input may be received indicating the user has selected the save story button 2784. If it is determined/identified that input indicating the E.C. object 2780 should be saved to the saved story list is received, the client module 35 continues to step 1862. At step 1862, the E.C. object identifier and/or other data/information associated with the E.C. object 2780 are saved to the saved stories list, and the client module 35 continues to step 1864. If it is determined/identified at step 1860 that input indicating the story should be saved to the saved story list was not received, the client module 35 continues to step 1864.

At step 1864, input indicating the user would like to close the E.C. object 2780 is received. For example, the user may select the close E.C. object button 2788. At step 1866, the client module 35 changes the user interface 2000 (e.g., of the user computing entity 30) from the E.C. object view 2030 to the default layout of the user interface 2000. The client module 35 then returns to step 1804 in FIG. 19.

As shown in FIG. 19, if E.C. selection input is not received at step 1816, the client module 35 continues to step 1818. At step 1818, the client module 35 determines if saved stories input has been received. If it is determined/identified that saved stories input has been received, the client module 35 continues to step 1920 shown in FIG. 29.

Figure 30:
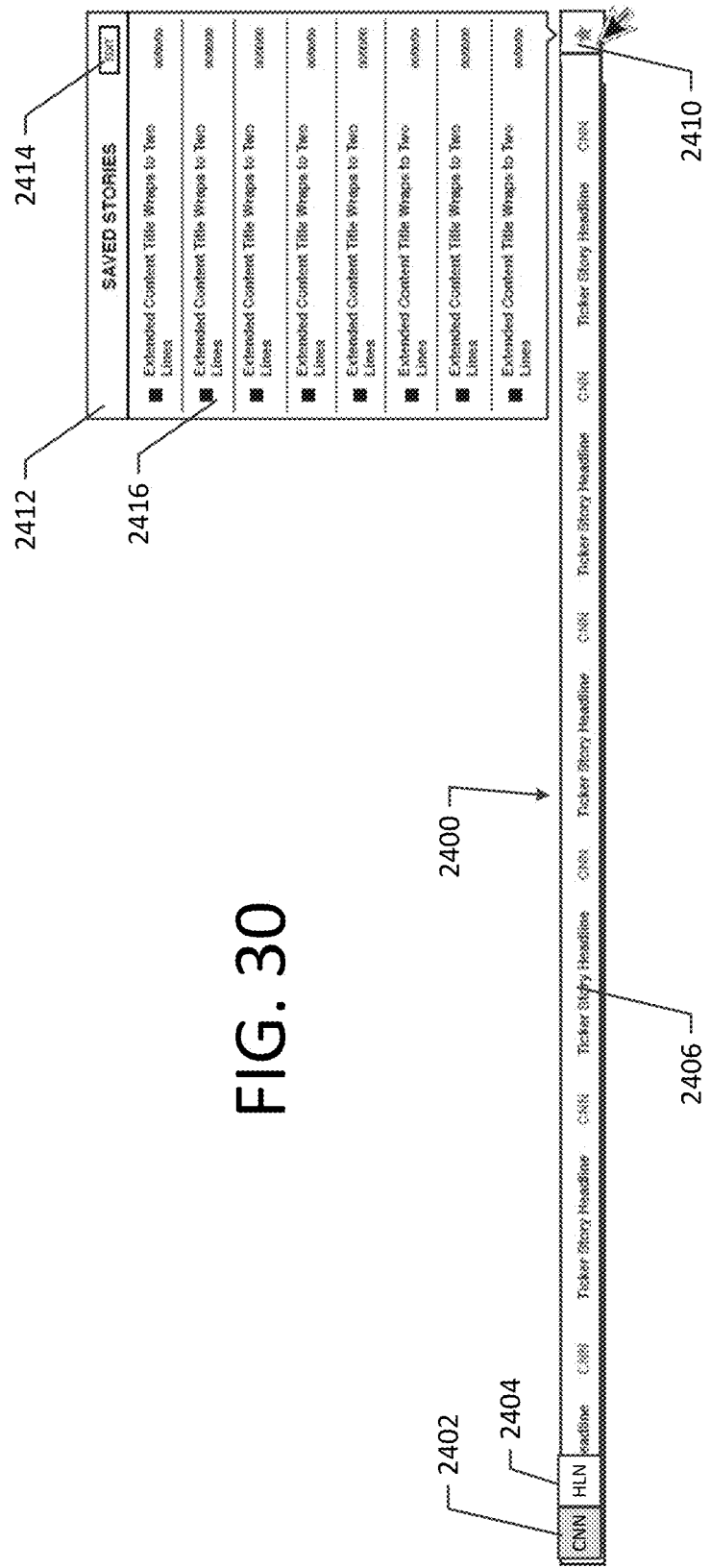
Figure 31:
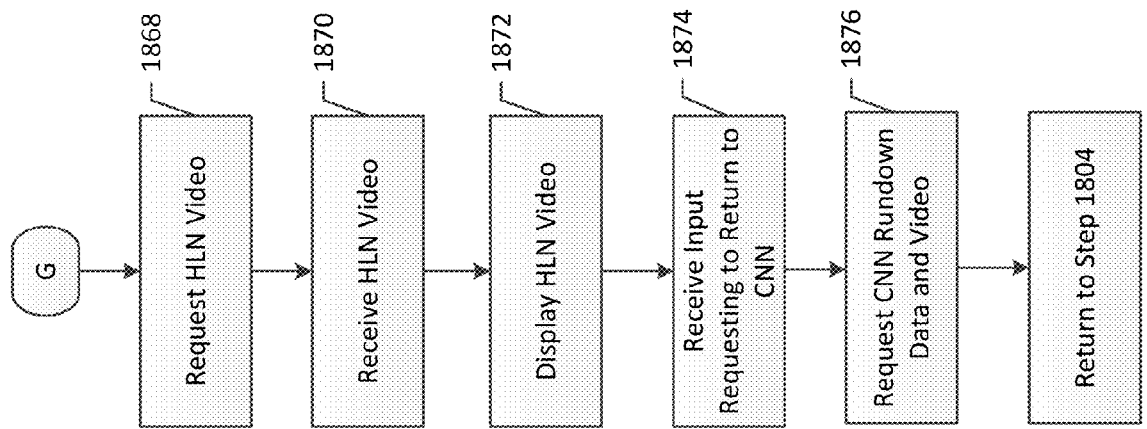

In one embodiment, saved stories input may be received via selection of the saved stories button 2410, as shown in FIG. 30. FIG. 30 shows the ticker viewer/portion 2400 according to one embodiment. The ticker viewer/portion 2400 comprises one or more ticker headlines or interactive elements 2406, channel buttons 2402 and 2404, and saved stories button 2410. As noted in FIG. 29, at step 1920, after the saved stories input is received (e.g., input indicating the user selected (e.g., operating the user computing entity 30) the saved stories button 2410 is received), or possibly in response thereto, the saved stories list 2412 is displayed. The saved stories list 2412 may comprise an edit button 2414 that maybe used to edit the saved stories list (e.g., reorder the saved stories, remove saved stories from the saved stories list, and/or the like) and a list of zero, one, or more saved stories 2416. At step 1922, input indicating user selection of a saved story is received. For example, a user may use a mouse or other input device to select a save story 2416 from the list of saved stories 2412.

At step 1924, the E.C. object associated with the saved story is requested from the content broker 270. At step 1926, the E.C. object associated with the saved story is received from the content broker 270 and displayed as discussed above with respect to E.C. object 2780. At step 1928, input indicating the user would like to close the E.C. object associated with the user-selected saved story 2416 is received. The user interface 2000 (e.g., of the user computing entity 30) returns to the default layout view, and the client module 35 returns to step 1804.

Returning to FIG. 19, if it is determined/identified that saved stories input was not received at step 1818, the client module 35 continues to step 1820. At step 1820 the client module determines if channel change input, for example, has been received. If channel change input has been received, the client module 35 continues to step 1868 shown in FIG. 31.

Figure 32:
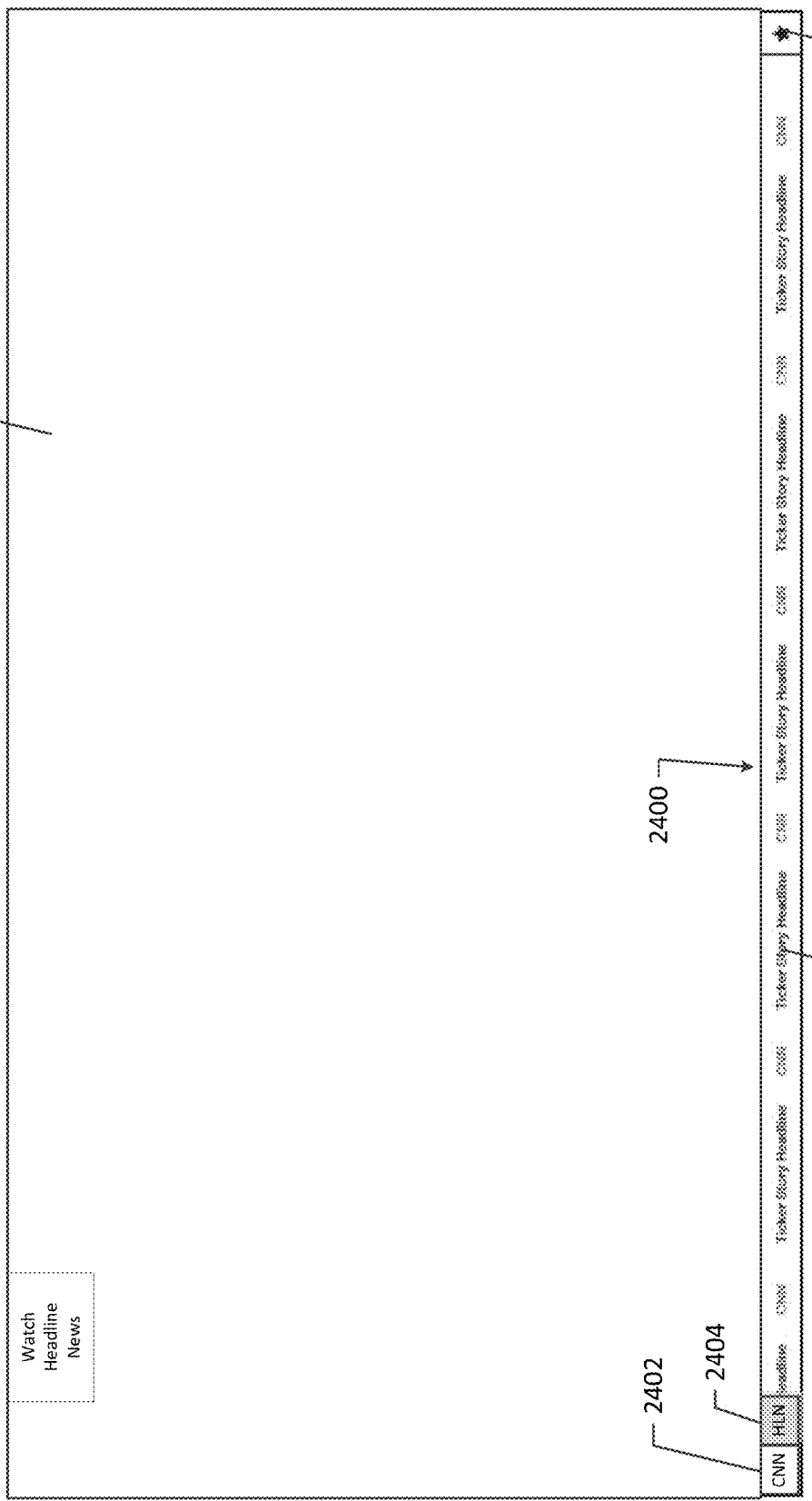

As shown in FIG. 30, the ticker viewer/portion 2400 comprises channel buttons 2402 and 2404. In the illustrated embodiment, the CNN button 2402 is selected and the Headline News (HLN) button 2404 is not selected. In various embodiments, a user viewing an enhanced news show episode on CNN may select the HLN button 2404 to switch the Headline News channel. In this example, we will assume that Headline News is not offering an enhanced news show. As noted above, when it is determined/identified that channel change input has been received (e.g., input indicating user selection of the HLN button 2404 has been received), the client module 35 continues to step 1868 shown in FIG. 31. At step 1868, the client module 35 requests or accesses the HLN video stream or file from the CDN 10. At step 1870, the user computing entity 30 receives or tunes to the HLN video stream and displays the HLN video at step 1872. As the HLN show episode is not an enhanced news show, no rundown data/information need be requested or received. FIG. 32 shows a non-enhanced channel view 2040 of the user interface 2000. In the non-enhanced channel view, the video viewing area 2690 dominates the browser, window, and/or viewable region of the display device associated with the user computing entity 30. In other embodiments, additional channel buttons associated with additional enhanced or non-enhanced channels may be provided.

The ticker viewer/portion 2400, including channel buttons 2402 and 2404, may also be displayed in the non-enhanced user interface view 2040. In various embodiments, the ticker viewer/portion 2400 may provide additional functionality to the user interface 2000 (e.g., of the user computing entity 30) in the standard or default user interface 2000 (e.g., of the user computing entity 30) and/or the non-enhanced user interface view 2040. For example, in some embodiments, a user may be able to click on a ticker headline or interactive element 2406 to open an article, video, segment of a show episode or the like associated with the headline or interactive element. In another example, a user may be able to drag the streaming headlines or interactive elements 2406 backwards to read a missed headline and/or the like. In one embodiment, the ticker viewer/portion 2400 may also comprise a settings, preferences, and/or help button. In various embodiments, the ticker headlines or interactive elements 2406 may be displayed such that text is readable within 3 feet, 10 feet, or the like of the display device associated with the user computing entity 30.

At step 1874, input indicating the user would like to return to the CNN channel, for instance, is received. For example, input indicating the user selection of CNN channel button 2402 may be received. At step 1876, the client module 35 requests the appropriate rundown data/information from the interfacing module 250 and requests the appropriate video stream from the CDN 10. The client module 35 then returns to step 1804 to receive the requested rundown data/information.

Returning to FIG. 19, if it is determined/identified that channel change input was not received at step 1820, the client module 35 may continue to step 1822. At step 1822, it is determined/identified if rundown data/information indicating a breaking news segment has been received. For example, the client module 35 may receive rundown data/information comprising a set of segment data/information wherein the associated breaking news flag is set to "true." If it is determined/identified at step 1822 that a breaking news segment has been received, the client module 35 continues to step 1890 shown in FIG. 33.

At step 1890, the client module determines if the current segment is a live segment. If the current segment is a live segment, the client module continues to step 1892 and displays the breaking news segment and associated video data/information. Once the breaking news segment is over, or if input indicating the user would like to view a segment other than the breaking news segment is received, the client module 35 returns to step 1804. If the current segment is not a live segment (e.g., the current segment is a programming on demand segment), the client module 35 continues to step 1894. At step 1894, a breaking news view 2050 of the user interfacing module 2000 is displayed. An example breaking news view 2050 is shown in FIG. 34.

Figure 34:
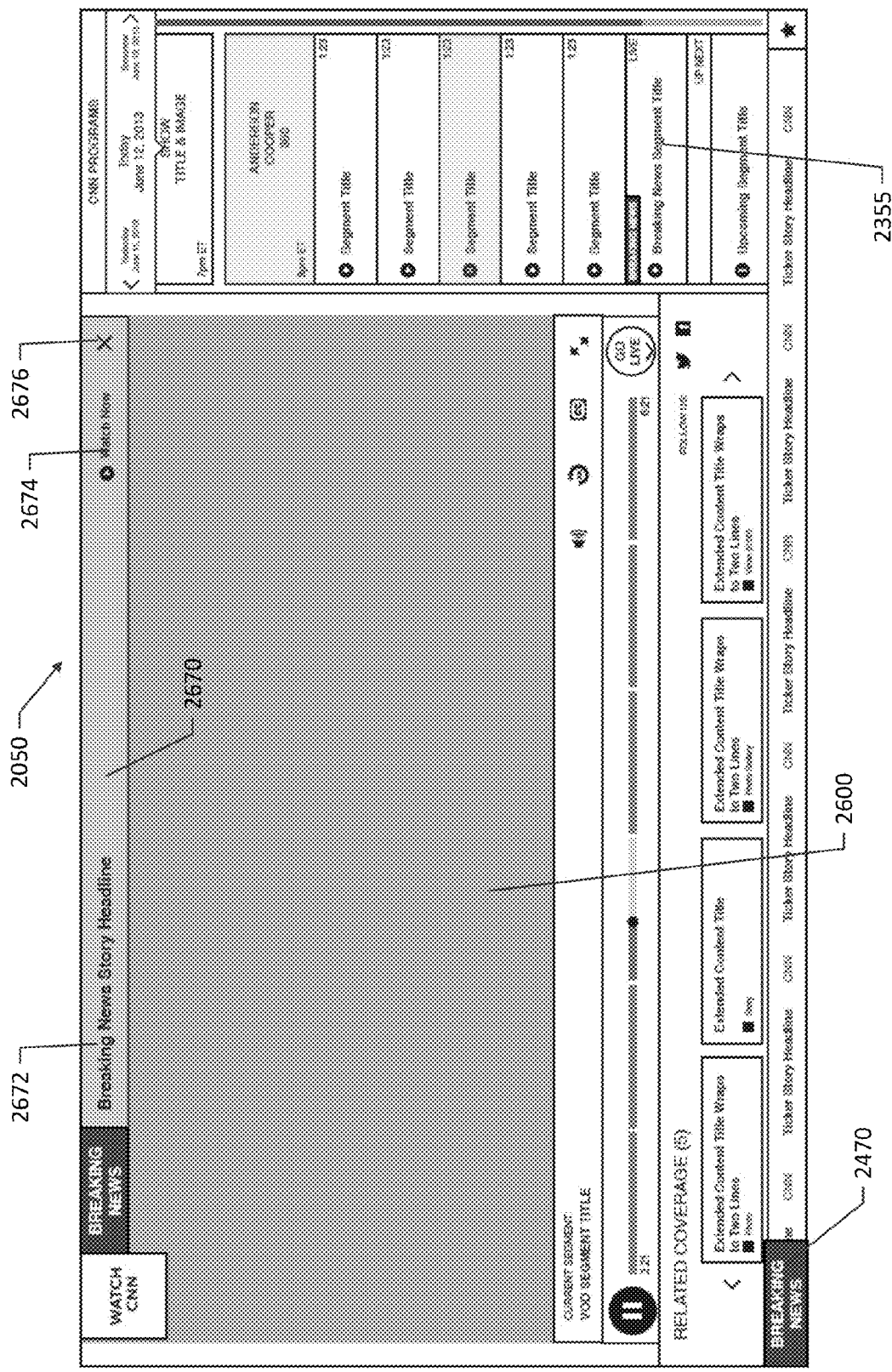
Figure 35:
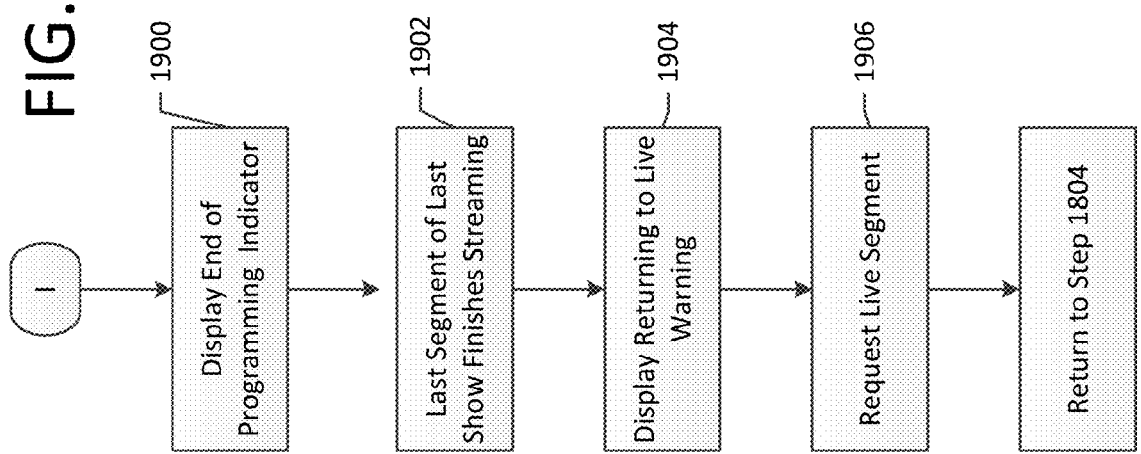

The breaking news view 2050 illustrated in FIG. 34 comprises a breaking news banner 2670. The breaking news banner 2670 displays the breaking news headline 2672, a watch now button 2674, and a dismiss button 2676. The breaking news view 2050 may also include a breaking news indicator in the ticker viewer/portion 2400 and a breaking news segment 2355 may be inserted into the rundown shown in the rundown frame 2320 of the rundown viewer/portion 2300.

Figure 33:
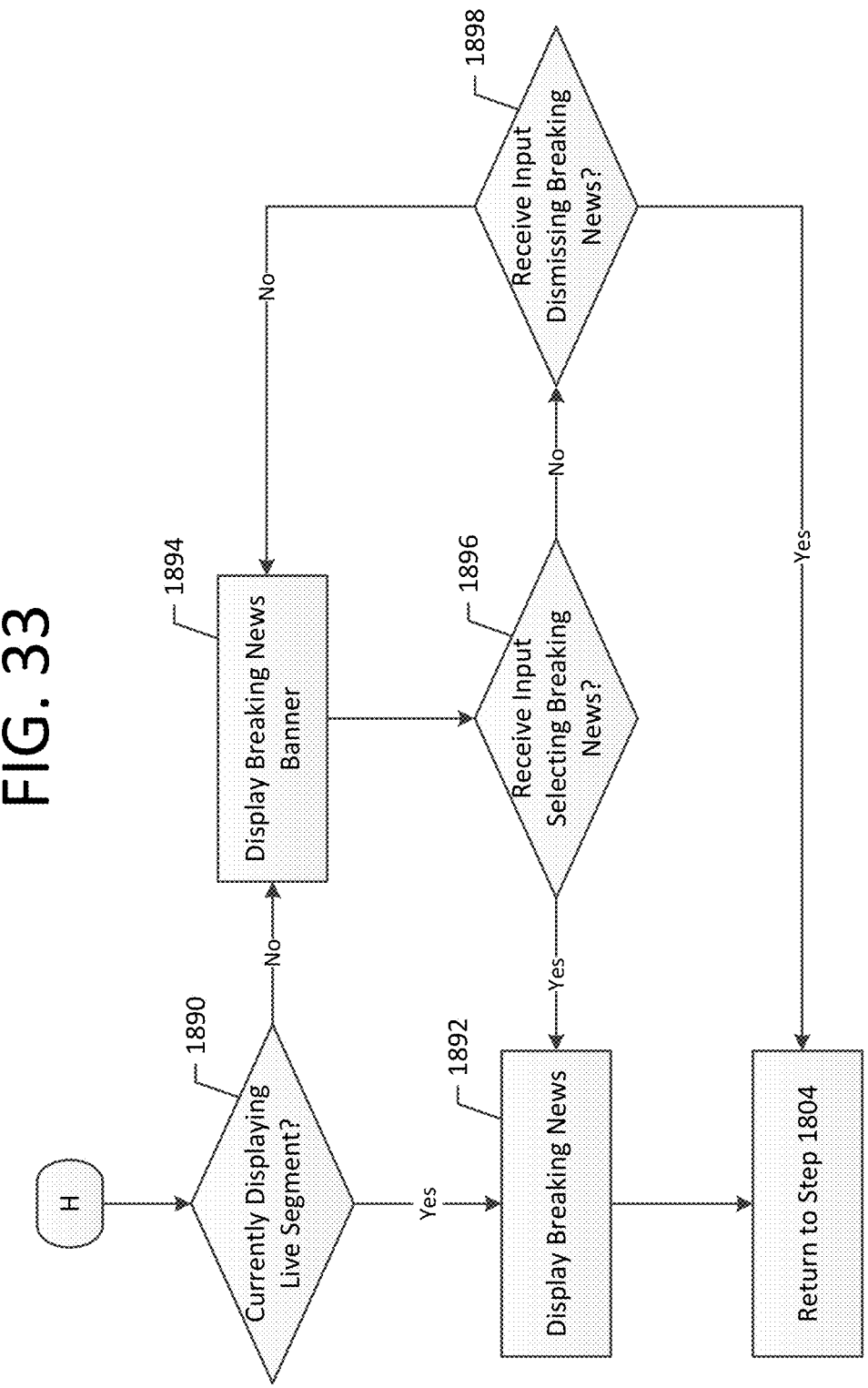

As shown in FIG. 33, after the breaking news banner is displayed at step 1894, the client module 35 continues to step 1896. At step 1896 it is determined/identified if input indicating the user would like to watch the breaking news has been received. For example, input indicating the user has selected the watch now button 2674 may be received. If input indicating the user would like to watch the breaking news is received, the client module 35 continues to step 1892 and displays the breaking news. As a user is watching the breaking news, one or more E.C. objects may be associated with the breaking news segment. The corresponding E.C. tiles 2710 or minimized E.C. tiles 2720 can be displayed as data/information associated with the one or more E.C. objects associated with the breaking news segment as received from the interfacing module 250.

If input indicating the user would like to watch the breaking news is not received, the client module 35 continues to step 1898. At step 1898 it is determined/identified if input indicating the user would like to dismiss the breaking news banner has been received. For example, input indicating the user selected (e.g., operating the user computing entity 30) the dismiss button 2676 may be received. If input indicating the user would like to dismiss the breaking news banner has been received, the client module 35 will return to step 1804 and display the default layout of user interface 2000 (e.g., of the user computing entity 30).

As shown in FIG. 19, if it is determined/identified at step 1822 that rundown data/information indicating a breaking news segment has not been received, the client module 35 continues to step 1824. At step 1824, it is determined/ identified if the end of programming has been reached. If it is determined/identified that the end of programming has been reached, the client module 35 continues to step 1900 shown in FIG. 35.

Figure 36:
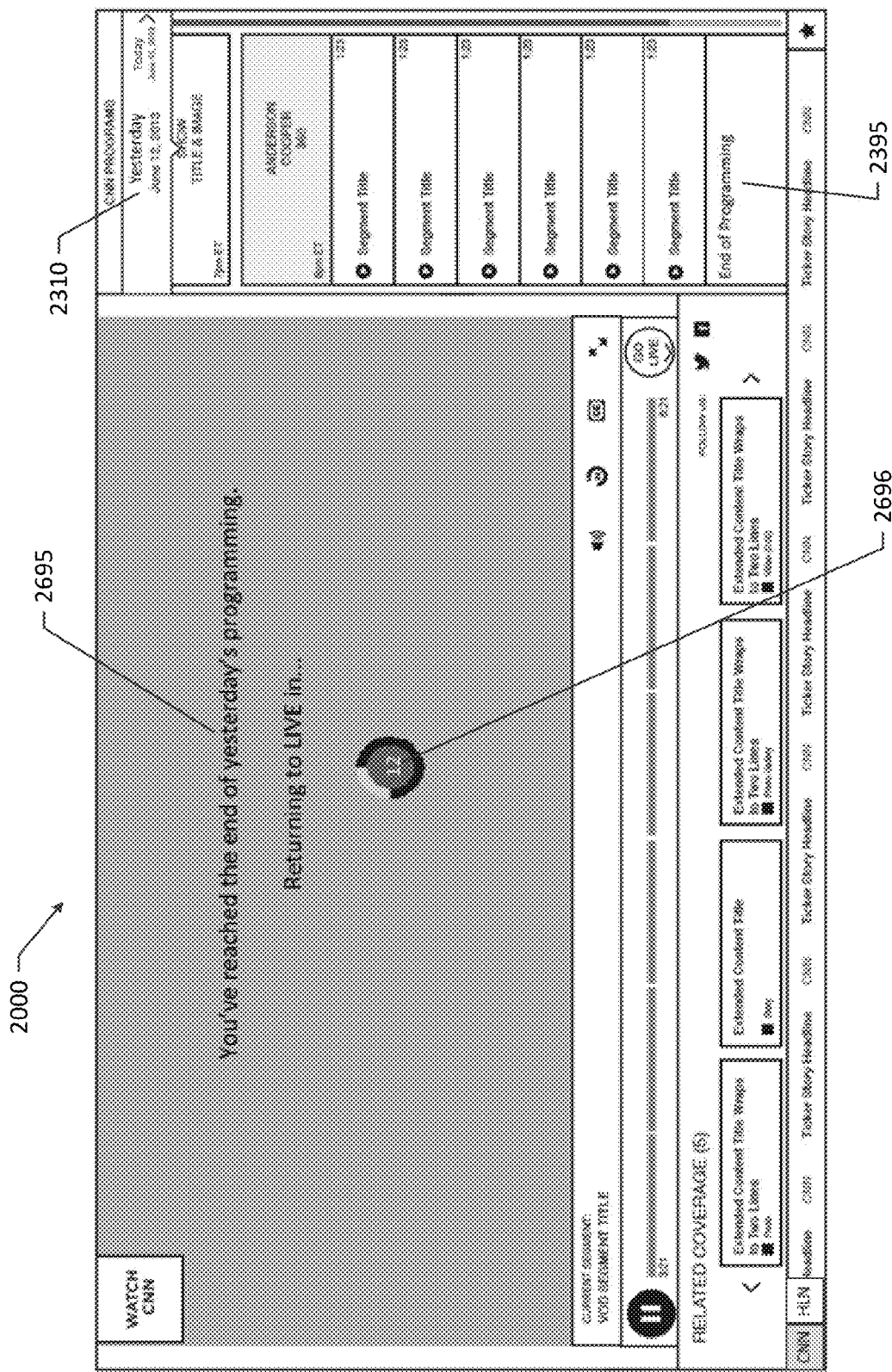

At step 1900, an end of programming indicator may be shown. For example, as shown in FIG. 36, a user may have selected to view segments from episodes aired yesterday via the data/information picker 2310. When there are no further segment tiles 2330 to display in the rundown frame 2320, an end of programming indicator 2395 may be shown. For example, if the user is watching the last show episode for which a show tile exists in the rundown frame 2320, when the user starts watching the last segment of the show, there will not be a show or segment tile available for the "Up Next" tile position at the bottom of the rundown frame 2320. Thus, the end of programming indicator 2395 may be displayed in the empty Up Next tile position. At step 1902, shown in FIG. 35, the video data/information associated with the segment tile located just above the end of programming indicator 2395 finishes being displayed. At step 1904, the returning to live warning 2695 is displayed via the video viewer/portion 2600. For example, as shown in FIG. 36 the message "You've reached the end of yesterday's programming. Returning to live in . . . " may be displayed in the video viewer/portion 2600 with a countdown timer 2696. When the countdown timer 2696 reaches zero, the client module 35 requests the live segment (e.g., the rundown data/information and video data/information associated with the segment that is currently being aired live), at step 1906. The client module 35 then returns to step 1804 and the rundown data/information associated with the live segment is received.

As shown in FIG. 19, if it is determined/identified at step 1824 that the end of programming has not been reached, the client module 35 continues to step 1826. At step 1826, it is determined/identified if a commercial segment has been received. If it is determined/identified that a commercial segment has been received, the client module 35 continues to step 1877 shown in FIG. 37.

As noted above, each segment is associated with a set of segment data/information. The set of segment data/information may comprise a segment type. In other embodiments, the interfacing module 250 may communicate to the client module 35 that a specific segment is a commercial segment via another method. During a live or pre-produced show, it is possible that a received segment may be associated with a segment type indicating that the segment is a commercial. In various embodiments, the interfacing module 250 may push commercial segments to the client module 35 periodically, regularly, and/or in response to certain triggers. In other embodiments, the commercial segments may be included as a segment associated with a show episode or may be embedded in a segment of a show (e.g., see the example discussed above in relation to FIG. 10).

Figure 37:
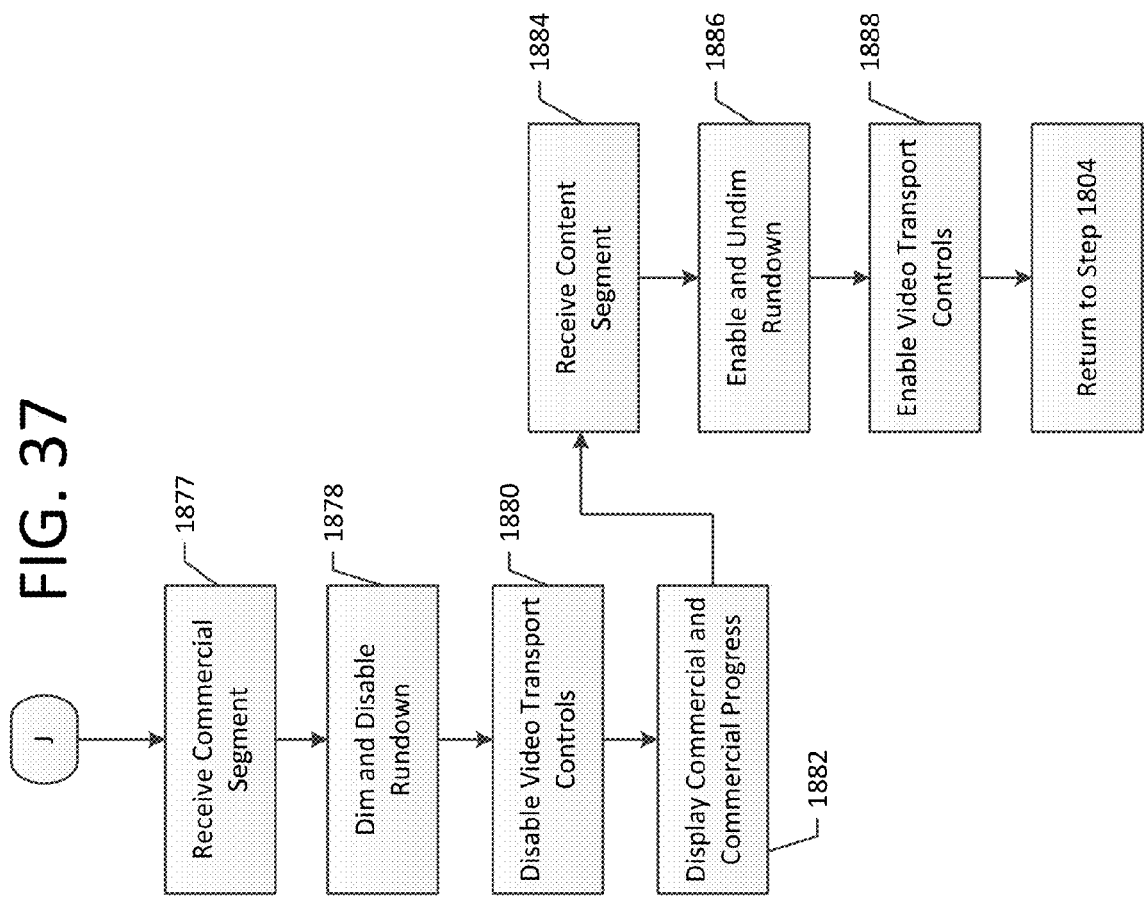

As shown in FIG. 37, a commercial segment is received at step 1877. At step 1878, the client module 35 disables and dims out the rundown. At step 1880, the client module disables the video controls. In some embodiments, the volume control may not be disabled. In various embodiments, the scrubbing controls, play/pause controls, and/or other video transport controls are disabled and all other video controls (e.g., volume controls, closed captioning controls, full screen controls, and/or the like) remain enabled. At step 1882, the video data/information associated with the commercial segment is displayed and the progress of the commercial may be indicated on the user interface 2000 (e.g., of the user computing entity 30).

Figure 38:
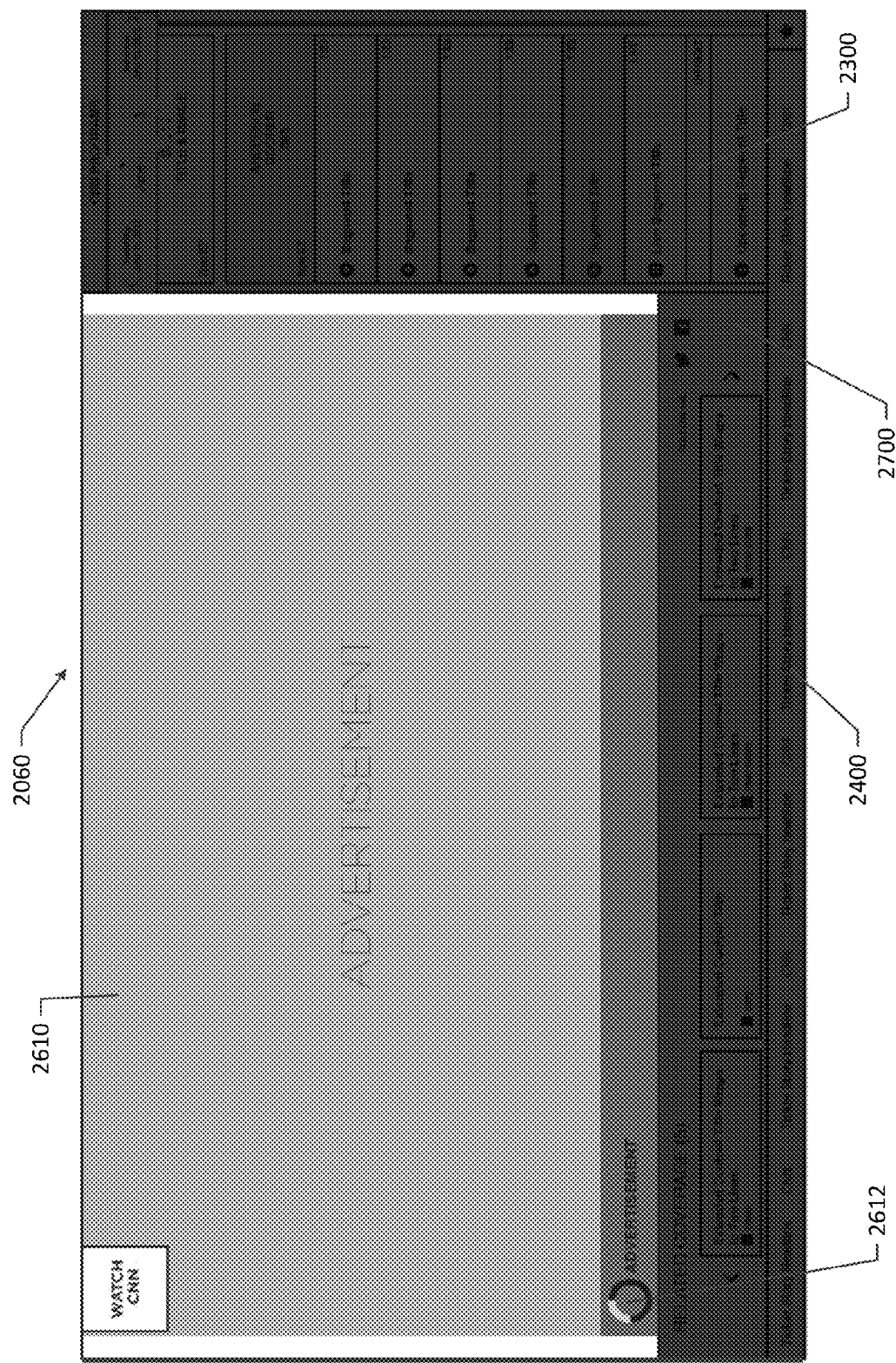

FIG. 38 shows an example commercial view 2060 of a user interface 2000 (e.g., of the user computing entity 30). The video data/information associated with the commercial segment may be displayed in the video viewer/portion 2600. The commercial progress indicator 2612 may also be displayed in the video viewer/portion 2600 or elsewhere on the screen. In some embodiments, while the video data/information associated with the commercial segment is being displayed, the rundown, the E.C. tiles 2710 or minimized tiles 2720, and/or the ticker or various combinations thereof, may be disabled. In embodiments in which the E.C. tiles 2710 or minimized tiles 2720 remain enabled during the commercial segment, if an E.C. object is selected, the client module 35 may react in a similar manner as described in relation to FIGS. 25 and 28. Thus, the video data/information associated with the commercial segment may be displayed in the pushed back viewer 2680 while the E.C. object is displayed. In some embodiments, E.C. tiles 2710 or minimized tiles 2720 associated with the commercial may be displayed in the E.C. viewer/portion 2700 during the commercial.

Once a segment is received that is not a commercial segment, the client module 35 may display the default layout of the user interface 2000 (e.g., of the user computing entity 30). For example, as shown in FIG. 37, at step 1884, a non-commercial and/or content segment is received and/or becomes the current segment. At step 1886, the rundown is enabled. If the ticker and/or E.C. viewer/portion 2700 were disabled during the commercial segment, they will also be enabled. At step 1888 the video controls are also enabled. The client module 35 then returns to step 1804.

As shown in FIG. 19, if at step 1826 it is not determined/ identified that a commercial segment has not been received, the client module will return to step 1804 to continue receiving rundown data/information and ticker data/information from the interfacing module 250 and continue receiving the video stream from the CDN 10. As described herein, production module 230, ticker module 240, interfacing module 250, video module 260, content broker module 270, and client module 35 are separate modules operating on the provider system 200 (or, in some embodiments, on the user computing entity 30 in the case of the client module 35). In various embodiments, the functionality of the modules 230, 240, 250, 260, 270 and/or 35 may be implemented via various methods other than those disclosed herein. For example, in some embodiments, the client module 35 may be stored and run locally on a user computing entity 30. In another example, modules 230 and 240 may be combined into a single module and/or may operate on a computing system separate from and in communication with the provider system 200. Thus, modules 230, 240, 250, 260, 270 and 35 are described as separate modules herein in order to describe various functions of the various embodiments, rather than to be limiting.

V. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for providing an enhanced media presentation, the method comprising:
receiving rundown data associated with one or more segments of an enhanced media presentation, the rundown data identifying a segment identifier for each segment configured to identify (a) the segment and (b) the video data associated with the segment;
receiving video data associated with a first segment, the video data comprising at least one tag identifying the first segment;
causing display of a user interface comprising a rundown portion and a video portion, wherein the user interface is configured to allow an end user to interactively experience a broadcasted enhanced media presentation;
causing (a) at least a portion of the rundown data to be displayed in the rundown portion of the user interface, and (b) at least a portion of the video data to be displayed in the video portion of the user interface, wherein (a) the at least a portion of the rundown data, and the at least a portion of the video data are displayed by the user interface simultaneously, (b) the at least a portion of the rundown data is displayed in a manner such that the rundown data corresponding to the first segment is configured to indicate that the video data for the first segment is being currently displayed, and (c) the at least a portion of the rundown data is displayed as a plurality of segment tiles, each segment tile corresponding to one of the one or more segments;
receiving updated rundown data indicating a second segment is now currently being displayed, wherein the second segment is not one of the one or more segments and a second segment tile corresponding to the second segment was not previously displayed by the user interface; and
causing display of the second segment tile in the rundown portion of the user interface in a position corresponding to a relative position of the second segment with respect to the one or more segments.

2. The method of claim 1 further comprising:
receiving ticker data, the ticker data comprising one or more headlines; and
causing display of a least a portion of the ticker data in a ticker portion of a user interface,
wherein the at least a portion of the ticker data is displayed simultaneously with the at least a portion of the rundown data, the at least a portion of the video data, and the at least a portion of the object data.

3. The method of claim 2 wherein the ticker portion of the user interface comprises one or more selectable channel buttons, the method further comprising:
responsive to receiving user input selecting one of the one or more selectable channel buttons, requesting video data for a media presentation being live on a channel represented by the user-selected channel button.

4. The method of claim 2 wherein the ticker portion is located along the bottom of the user interface.

5. The method of claim 1 wherein the at least a portion of the rundown data comprises one or more rundown tiles, and the at least a portion of the video data comprises a video associated with at least one of the one or more rundown tiles.

6. The method of claim 1,
wherein:
the rundown data identifies content object data associated with one or more content objects providing media content related to a topic associated with each segment, and
the user interface further comprises a content portion, and
the method further comprises:
causing at least a portion of the content object data to be displayed in the content portion of the user interface, wherein the at least a portion of the content object data comprises at least one content object tile associated with a content object, the content object associated with the same at least one of the one or more rundown tiles;
receiving input indicating user selection of a content object from the content object data;
requesting the content object based at least in part on the content object data;
receiving the content object;
causing the display of the content object in a content object portion of the user interface, the content object portion of the user interface covering the video portion;
causing the display of the at least a portion of the video data in a pushed back video portion of the user interface, wherein the pushed back video portion of the user interface is a sub-portion of the rundown portion.

7. The method of claim 6 wherein the rundown portion is approximately 320 pixels wide and located to the right of the content portion.

8. The method of claim 1 further comprising receiving the video data via at least one of over the air content distribution network, a linear content distribution network, a cable content distribution network, a satellite content distribution network, or an Internet Protocol (IP) based content distribution network and receiving the rundown data via an IP network.

9. The method of claim 1 wherein the video portion comprises at least half of the user interface.

10. The method of claim 6 wherein the content portion is located below the video portion.

11. An apparatus comprising at least one processor and at least one memory including program code, the at least one memory and the program code configured to, with the processor, cause the apparatus to at least:
receive rundown data associated with one or more segments of an enhanced media presentation, the rundown data identifying a segment identifier for each segment configured to identify (a) the segment and (b) the video data associated with the segment;
receive video data associated with a first segment, the video data comprising at least one tag identifying the first segment;
cause display of a user interface comprising a rundown portion and a video portion, wherein the user interface is configured to allow an end user to interactively experience a broadcasted enhanced media presentation;
cause (a) at least a portion of the rundown data to be displayed in the rundown portion of the user interface, and (b) at least a portion of the video data to be displayed in the video portion of the user interface, wherein (a) the at least a portion of the rundown data, and the at least a portion of the video data are displayed by the user interface simultaneously, (b) the at least a portion of the rundown data is displayed in a manner such that the rundown data corresponding to the first segment is configured to indicate that the video data for the first segment is being currently displayed, and (c) the at least a portion of the rundown data is displayed as a plurality of segment tiles, each segment tile corresponding to one of the one or more segments;

receive updated rundown data indicating a second segment is now currently being displayed, wherein the second segment is not one of the one or more segments and a second segment tile corresponding to the second segment was not previously displayed by the user interface; and cause display of the second segment tile in the rundown portion of the user interface in a position corresponding to a relative position of the second segment with respect to the one or more segments.

12. The apparatus claim 11, wherein the memory and program code are further configured to, with the processor, cause the apparatus to:

receive ticker data, the ticker data comprising one or more headlines; and cause display of a least a portion of the ticker data in a ticker portion of the user interface, wherein the at least a portion of the ticker data is displayed simultaneously with the at least a portion of the rundown data, the at least a portion of the video data, and the at least a portion of the object data.

13. The apparatus of claim 12 wherein the ticker portion of the user interface comprises one or more selectable channel buttons, and wherein the memory and program code are further configured to, with the processor, cause the apparatus to, responsive to receiving user input selecting one of the one or more selectable channel buttons, request video data for a media presentation being live on a channel represented by the user-selected channel button.

14. The apparatus of claim 12 wherein the ticker portion is located along the bottom of the user interface.

15. The apparatus of claim 11 wherein the at least a portion of the rundown data comprises one or more rundown tiles, and the at least a portion of the video data comprises a video associated with at least one of the one or more rundown tiles.

16. The apparatus claim 11, wherein:

the rundown data identifies content object data associated with one or more content objects providing media content related to a topic associated with each segment, and the user interface further comprises a content portion, and the memory and program code are further configured to, with the processor, cause the apparatus to:

cause at least a portion of the content object data to be displayed in the content portion of the user interface, wherein the at least a portion of the content object data comprises at least one content object tile associated with a content object, the content object associated with the same at least one of the one or more rundown tiles;

receive input indicating user selection of a content object from the content object data;

request the content object based at least in part on the content object data;

receive the content object;

cause the display of the content object in a content object portion of the user interface, the content object portion of the user interface covering the video portion;

cause the display of the at least a portion of the video data in a pushed back video portion of the user interface, wherein the pushed back video portion of the user interface is a sub-portion of the rundown portion.

17. The apparatus of claim 16 wherein the rundown portion is approximately 320 pixels wide and located to the right of the content portion.

18. The apparatus of claim 16 wherein the content portion is located below the video portion.

19. The apparatus claim 11, wherein the memory and program code are further configured to, with the processor, cause the apparatus to receive the video data via at least one of over the air content distribution network, a linear content distribution network, a cable content distribution network, a satellite content distribution network, or an Internet Protocol (IP) based content distribution network and receive the rundown data via an IP network.

20. The apparatus of claim 11 wherein the video portion comprises at least half of the user interface.

21. A computer program product for providing an enhanced media presentation, the computer program product comprising at least one non-transitory computer-readable storage medium having computer-readable program code portions stored therein, the computer-readable program code portions comprising:

an executable portion configured to receive rundown data associated with one or more segments of an enhanced media presentation, the rundown data identifying a segment identifier for each segment configured to identify (a) the segment and (b) the video data associated with the segment;

an executable portion configured to receive video data associated with a first segment, the video data comprising at least one tag identifying the first segment;

an executable portion configured to cause display of a user interface comprising a rundown portion and a video portion, wherein the user interface is configured to allow an end user to interactively experience a broadcasted enhanced media presentation;

an executable portion configured to cause (a) at least a portion of the rundown data to be displayed in the rundown portion of the user interface, and (b) at least a portion of the video data to be displayed in the video portion of the user interface, wherein (a) the at least a portion of the rundown data, and the at least a portion of the video data are displayed by the user interface simultaneously, (b) the at least a portion of the rundown data is displayed in a manner such that the rundown data corresponding to the first segment is configured to indicate that the video data for the first segment is being currently displayed, and (c) the at least a portion of the rundown data is displayed as a plurality of segment tiles, each segment tile corresponding to one of the one or more segments;

an executable portion configured to receive updated rundown data indicating a second segment is now currently being displayed, wherein the second segment is not one of the one or more segments and a second segment tile corresponding to the second segment was not previously displayed by the user interface; and an executable portion configured to cause display of the second segment tile in the rundown portion of the user interface in a position corresponding to a relative position of the second segment with respect to the one or more segments.

22. The computer program product of claim 21, the computer-readable program code portions further comprising:
an executable portion configured to receive ticker data, the ticker data comprising one or more headlines; and
an executable portion configured to cause display of a least a portion of the ticker data in a ticker portion of the user interface,
wherein the at least a portion of the ticker data is displayed simultaneously with the at least a portion of the rundown data, the at least a portion of the video data, and the at least a portion of the object data.

23. The computer program product of claim 22 wherein the ticker portion of the user interface comprises one or more selectable channel buttons, and the system is further configured to, responsive to receiving user input selecting one of the one or more selectable channel buttons, request video data for a media presentation being live on a channel represented by the user-selected channel button.

24. The computer program product of claim 22 wherein the ticker portion is located along the bottom of the user interface.

25. The computer program product of claim 21 wherein the at least a portion of the rundown data comprises one or more rundown tiles, and the at least a portion of the video data comprises a video associated with at least one of the one or more rundown tiles.

26. The computer program product of claim 21, wherein:
the rundown data identifies content object data associated with one or more content objects providing media content related to a topic associated with each segment, and
the user interface further comprises a content portion, and the computer-readable program code portions further comprising:
an executable portion configured to cause at least a portion of the content object data to be displayed in the content portion of the user interface, wherein the at least a portion of the content object data comprises at least one content object tile associated with a content object, the content object associated with the same at least one of the one or more rundown tiles;
an executable portion configured to receive input indicating user selection of a content object from the content object data;
an executable portion configured to request the content object based at least in part on the content object data;
an executable portion configured to receive the content object;
an executable portion configured to cause the display of the content object in a content object portion of the user interface, the content object portion of the user interface covering the video portion;
an executable portion configured to cause the display of the at least a portion of the video data in a pushed back video portion of the user interface, wherein the pushed back video portion of the display is a sub-portion of the rundown portion.

27. The computer program product of claim 26 wherein the rundown portion is approximately 320 pixels wide and located to the right of the content portion.

28. The computer program product of claim 26 wherein the content portion is located below the video portion.

29. The computer program product of claim 21, the computer-readable program code portions further comprising an executable portion configured to receive the video data via at least one of over the air content distribution network, a linear content distribution network, a cable content distribution network, a satellite content distribution network, or an Internet Protocol (IP) based content distribution network and receive the rundown data via an IP network.

30. The computer program product of claim 21 wherein the video portion comprises at least half of the user interface.

* * * * *